US012769186B2

(12) United States Patent
Rho et al.

(10) Patent No.: US 12,769,186 B2
(45) Date of Patent: Oct. 20, 2026

(54) CAMERA MODULE AND ELECTRONIC DEVICE INCLUDING SAME

(71) Applicant: Samsung Electronics Co., Ltd., Suwon-si (KR)

(72) Inventors: Hyungjin Rho, Suwon-si (KR); Jiyeon Jo, Suwon-si (KR); Jeongkil Shin, Suwon-si (KR); Jaekyu Shim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 46 days.

(21) Appl. No.: 19/058,654

(22) Filed: Feb. 20, 2025

(65) Prior Publication Data

US 2025/0231464 A1 Jul. 17, 2025

Related U.S. Application Data

(63) Continuation of application No. PCT/KR2025/000960, filed on Jan. 16, 2025.

(30) Foreign Application Priority Data

Jan. 16, 2024 (KR) ........................ 10-2024-0006669
Mar. 12, 2024 (KR) ........................ 10-2024-0034628

(51) Int. Cl.

*G03B 13/36* (2021.01)
*G02B 27/64* (2006.01)
*G03B 5/00* (2021.01)

(52) U.S. Cl.

CPC ........... *G03B 13/36* (2013.01); *G02B 27/646* (2013.01); *G03B 5/00* (2013.01); *G03B 2205/0069* (2013.01)

(58) Field of Classification Search

CPC .. G03B 13/36; G03B 5/00; G03B 2205/0069; G03B 3/10; G03B 17/17; G02B 27/646;

(Continued)

(56) References Cited

U.S. PATENT DOCUMENTS 10,488,631 B2 11/2019 Bachar et al.
2015/0002683 A1 1/2015 Hu et al.

(Continued)

FOREIGN PATENT DOCUMENTS

CN 114859500 A 8/2022
JP 5923558 B2 5/2016

(Continued)

OTHER PUBLICATIONS

International Search Report dated Apr. 21, 2025, issued in International Application No. PCT/KR2025/000960.

*Primary Examiner* — Shahbaz Nazrul
(74) *Attorney, Agent, or Firm* — Jefferson IP Law, LLP

(57) ABSTRACT

A camera module is provided. The camera module includes a reflection member, a carrier including a seating portion on which the reflection member is disposed and a guide portion extending in a direction away from the reflection member, a camera housing including an accommodating portion having a guide groove formed thereon such that at least a portion of the guide portion is accommodated therein, the carrier being disposed on the camera housing, a guide structure disposed between the guide portion and the guide groove and having at least three points configured to come into contact with at least one of the guide portion, a first magnet disposed on a first surface of the carrier, a second magnet disposed on a second surface perpendicular to the first surface of the carrier, a first coil disposed on the camera housing and facing the first magnet, a second coil disposed on the camera housing and facing the second magnet, a lens structure through which light reflected from the reflection member (Continued)

transmits, and an image sensor to which the light having transmitted the lens structure enters.

20 Claims, 39 Drawing Sheets

(58) Field of Classification Search
CPC ........ H04N 23/51; H04N 23/52; H04N 23/54; H04N 23/55; H04N 23/68
See application file for complete search history.

(56) References Cited

U.S. PATENT DOCUMENTS

| | | | |
|---|---|---|---|
| 2015/0042870 | A1 | 2/2015 | Chan et al. |
| 2021/0080744 | A1 | 3/2021 | Jeong et al. |
| 2021/0116716 | A1 | 4/2021 | Jeong et al. |
| 2021/0181460 | A1 | 6/2021 | Lee et al. |
| 2021/0286193 | A1 | 9/2021 | Kwon et al. |
| 2022/0091365 | A1 | 3/2022 | Park et al. |
| 2022/0252959 | A1 | 8/2022 | Kim et al. |
| 2022/0390707 | A1 | 12/2022 | Park et al. |
| 2023/0156307 | A1 | 5/2023 | Rho et al. |
| 2023/0296962 | A1 | 9/2023 | Lee |
| 2024/0129610 | A1 | 4/2024 | Byon et al. |
| 2025/0024128 | A1* | 1/2025 | Baik .................... H04N 23/687 |
| 2025/0199328 | A1* | 6/2025 | Seo .......................... G03B 5/00 |
| 2025/0203184 | A1* | 6/2025 | Kwon .................... H04N 23/58 |
| 2025/0314944 | A1* | 10/2025 | Lee .......................... G03B 5/00 |
| 2025/0314945 | A1* | 10/2025 | Lee ...................... G02B 7/1821 |
| 2026/0079324 | A1* | 3/2026 | Lee ...................... G02B 7/1827 |
| 2026/0129295 | A1* | 5/2026 | Kim ....................... H04N 23/68 |

FOREIGN PATENT DOCUMENTS

| | | | |
|---|---|---|---|
| KR | 10-2018-0125989 | A | 11/2018 |
| KR | 10-2021-0013875 | A | 2/2021 |
| KR | 10-2021-0156424 | A | 12/2021 |
| KR | 10-2389192 | B1 | 4/2022 |
| KR | 10-2451232 | B1 | 10/2022 |
| KR | 10-2022-0170225 | A | 12/2022 |
| KR | 10-2495466 | B1 | 2/2023 |

* cited by examiner

CAMERA MODULE AND ELECTRONIC DEVICE INCLUDING SAME

CROSS-REFERENCE TO RELATED APPLICATION(S)

This application is a continuation application, claiming priority under 35 U.S.C. § 365 (c), of an International application No. PCT/KR2025/000960, filed on Jan. 16, 2025, which is based on and claims the benefit of a Korean patent application number 10-2024-0006669, filed on Jan. 16, 2024, in the Korean Intellectual Property Office, and of a Korean patent application number 10-2024-0034628, filed on Mar. 12, 2024, in the Korean Intellectual Property Office, the disclosure of each of which is incorporated by reference herein in its entirety.

TECHNICAL FIELD

The disclosure relates to a camera module and an electronic device including a camera module.

BACKGROUND ART

Various electronic devices, such as a smartphone, a tablet PC, a portable multimedia player (PMP), a personal digital assistant (PDA), a laptop personal computer (PC), and wearable devices such as a wrist watch and a head-mounted display (HMD), may include a camera and may capture images using the camera.

As the number of users taking pictures or videos by using electronic devices increases, the performance of cameras included in the electronic devices is also improving. For example, when images are captured using a camera included in an electronic device, in order to obtain a clear image, correction for shaking (e.g., hand tremors), which may occur when adjusting the focus of a subject or taking a picture of a subject, may be required.

A camera module used in an electronic device may include an auto focus (AF) function for automatically adjusting the focus of a lens on a subject and/or an optical image stabilizer (OIS) function for correcting shaking which occurs in a camera module when photographing a subject. The AF function and the optical image stabilizer function of a camera module can be performed based on an electromagnetic force using a magnet and a coil.

The above information is presented as background information only to assist with an understanding of the disclosure. No determination has been made, and no assertion is made, as to whether any of the above might be applicable as prior art with regard to the disclosure.

DISCLOSURE OF INVENTION

Technical Problem

A camera module may achieve high magnification by using refraction of light. For example, a camera module may include a reflection member such as a prism or a mirror. Light incident to a reflection member may be reflected or refracted, the light path may be refracted, and thus the light may be delivered to an image sensor.

A camera module using a reflection member may be a form in which a ball guide portion, a middle guide portion, a reflector actuator, a lens driving portion, and an image sensor are sequentially arranged inside a camera housing.

Meanwhile, the reflector actuator may include a reflection member and a carrier. In order to correct shaking of an image formed on the image sensor due to hand tremors, the reflection member may be tilted with respect to the image sensor. For example, the carrier, on which the reflection member is disposed, may rotate around one axis of a first axis (a pitch axis) and a second axis (a yaw axis or a roll axis) relative to the image sensor by an actuator (e.g., a coil and a magnet). The middle guide portion may rotate around the other axis of the first axis and the second axis relative to the image sensor through the actuator. The carrier may rotate in the same direction as the rotation direction of the middle guide portion, in conjunction with the middle guide portion.

Meanwhile, the middle guide portion may be a configuration for guiding rotation of the carrier. For example, in case that the carrier is designed to rotate around the first axis, the middle guide portion may guide rotation of the carrier so that the carrier does not rotate around the second axis.

Similarly, the ball guide portion may be a configuration for guiding rotation of the middle guide portion. For example, in case that the carrier is designed to rotate around the second axis different from a rotation axis (e.g., the first axis) of the carrier, the middle guide portion may guide rotation of the carrier so that the carrier does not rotate around the first axis.

The structure of the camera module described above may include a middle guide portion for guiding rotation of the carrier and a ball guide portion for guiding rotation of the middle guide portion. Even if the arrangement of the carrier, the middle guide portion, and the ball guide portion is optimized, there may be a limit to reducing the size of the camera module because one of the elements must be inevitably omitted. In addition, the greater the number of components constituting a camera module is, the more complex the assembly process becomes. Therefore, the production cost thereof may increase.

Aspects of the disclosure are to address at least the above-mentioned problems and/or disadvantages and to provide at least the advantages described below. Accordingly, an aspect of the disclosure is to provide a camera module and an electronic device including a camera module.

Additional aspects will be set forth in part in the description which follows and, in part, will be apparent from the description, or may be learned by practice of the presented embodiments.

Solution to Problem

In accordance with an aspect of the disclosure, a camera module is provided. The camera module includes a reflection member, a carrier including a seating portion on which the reflection member is disposed and a guide portion extending in a direction away from the reflection member, and a camera housing including an accommodating portion having a guide groove formed thereon such that at least a portion of the guide portion is accommodated therein, the carrier being disposed on the camera housing, a guide structure disposed between the guide portion and the guide groove and having at least three points configured to come in contact with at least one of the guide portion, a first magnet disposed on a first surface of the carrier, a second magnet disposed on a second surface perpendicular to the first surface of the carrier, a first coil disposed on the camera housing and facing the first magnet, a second coil disposed on the camera housing and facing the second magnet, a lens structure through which light reflected from the reflection member transmits, and an image sensor which the light having transmitted the lens structure enters.

In accordance with another aspect of the disclosure, an electronic device including a camera module is provided. The electronic device includes a reflection member, a carrier including a seating portion in which the reflection member is disposed and a guide portion extending in a direction away from the reflection member, a camera housing including an accommodating portion having a guide groove formed thereon such that at least a portion of the guide portion is accommodated therein, and the carrier being disposed on the camera housing, a guide structure having at least three points configured to come in contact with at least one of the guide portion and the guide groove, a first magnet disposed on a first surface of the carrier, a second magnet disposed on a second surface perpendicular to the first surface of the carrier, a first coil disposed on the camera housing and facing the first magnet, a second coil disposed on the camera housing and facing the second magnet, a lens structure through which light reflected from the reflection member transmits, and an image sensor which the light having transmitted the lens structure enters.

Advantageous Effects of Invention

According to an embodiment disclosed in the document, a structure capable of implementing an image stabilizer (e.g., an optical image stabilizer (OIS)) function may be included therein. According to a camera module of the disclosure, a middle guide portion for guiding rotation of a carrier and a ball guide portion for guiding rotation of the middle guide portion may be omitted. In an embodiment, the carrier may be partially coupled to an accommodating portion formed in the camera module, and may secure rotational degrees of freedom with reference to a first axis (e.g., a pitch axis and/or the axis Y in FIG. 4C), a second axis (e.g., a yaw axis and/or the axis X in FIG. 4C), and a third axis (e.g., a roll axis and/or the axis Z in FIG. 4C).

In addition, according to an embodiment of the disclosure, the size of the camera module can be reduced according to omission of the middle guide portion and the ball guide portion. In addition, the production cost can be reduced due to simplification of the production process by reduction of components used in the camera module.

In addition, according to an embodiment of the disclosure, the center of a reflection surface of a reflection member disposed on the carrier and the rotation center of the reflection member may coincide with each other. In this case, a driving error of an image stabilizer (e.g., an optical image stabilizer (OIS)) function for correcting shaking of an image can be reduced.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

MODE FOR THE INVENTION

Figure 1:
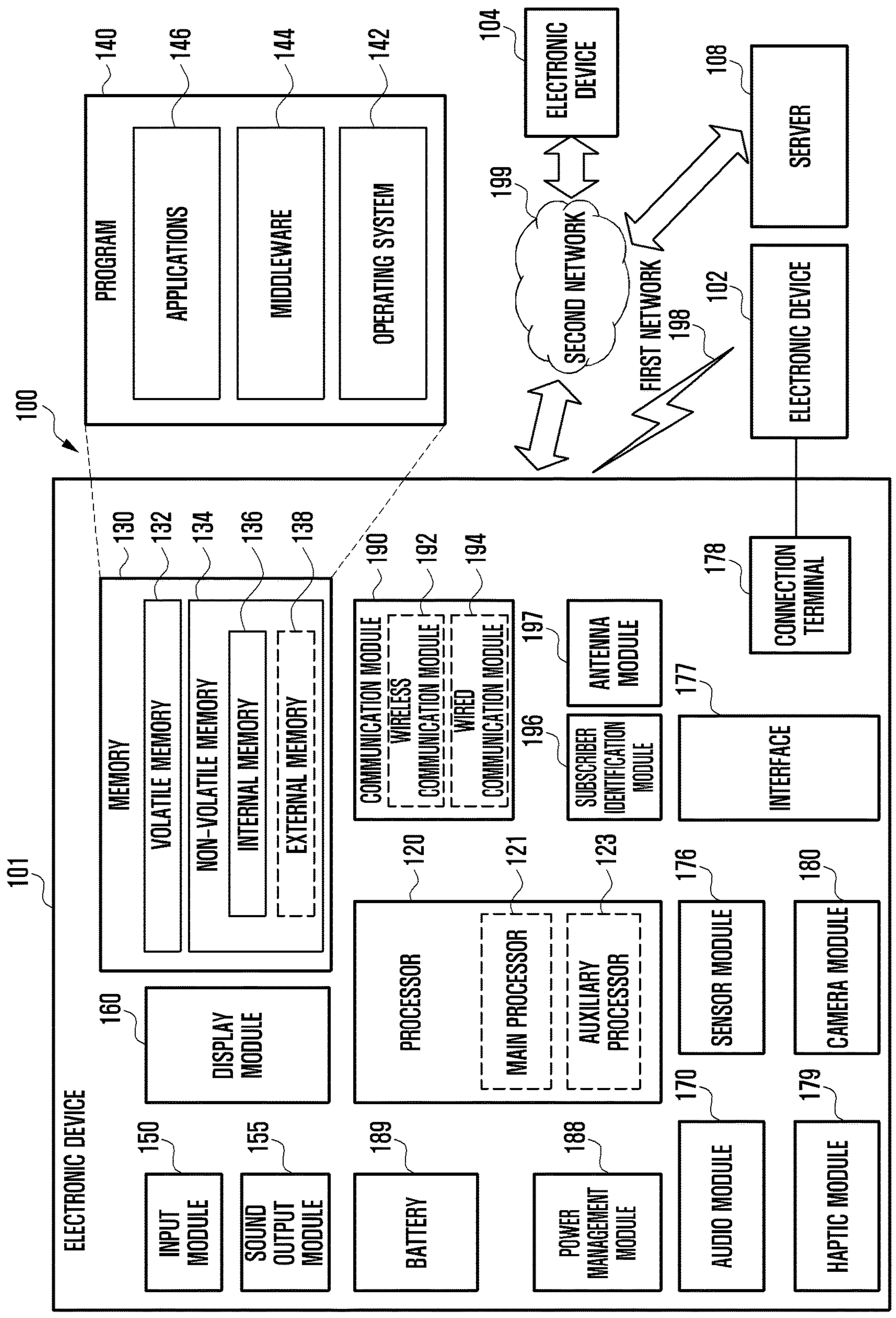
FIG. 1 is a block diagram of an electronic device in a network environment according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

With regard to the description of the drawings, similar reference numerals may be used to refer to similar or related elements. It is to be understood that a singular form of a noun corresponding to an item may include one or more of the things, unless the relevant context clearly indicates otherwise.

As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

It should be appreciated that the blocks in each flowchart and combinations of the flowcharts may be performed by one or more computer programs which include instructions. The entirety of the one or more computer programs may be stored in a single memory device or the one or more computer programs may be divided with different portions stored in different multiple memory devices.

Any of the functions or operations described herein can be processed by one processor or a combination of processors. The one processor or the combination of processors is circuitry performing processing and includes circuitry like an application processor (AP, e.g. a central processing unit (CPU)), a communication processor (CP, e.g., a modem), a graphics processing unit (GPU), a neural processing unit (NPU) (e.g., an artificial intelligence (AI) chip), a Wi-Fi chip, a Bluetooth® chip, a global positioning system (GPS) chip, a near field communication (NFC) chip, connectivity chips, a sensor controller, a touch controller, a finger-print sensor controller, a display driver integrated circuit (IC), an audio CODEC chip, a universal serial bus (USB) controller, a camera controller, an image processing IC, a microprocessor unit (MPU), a system on chip (SoC), an IC, or the like.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
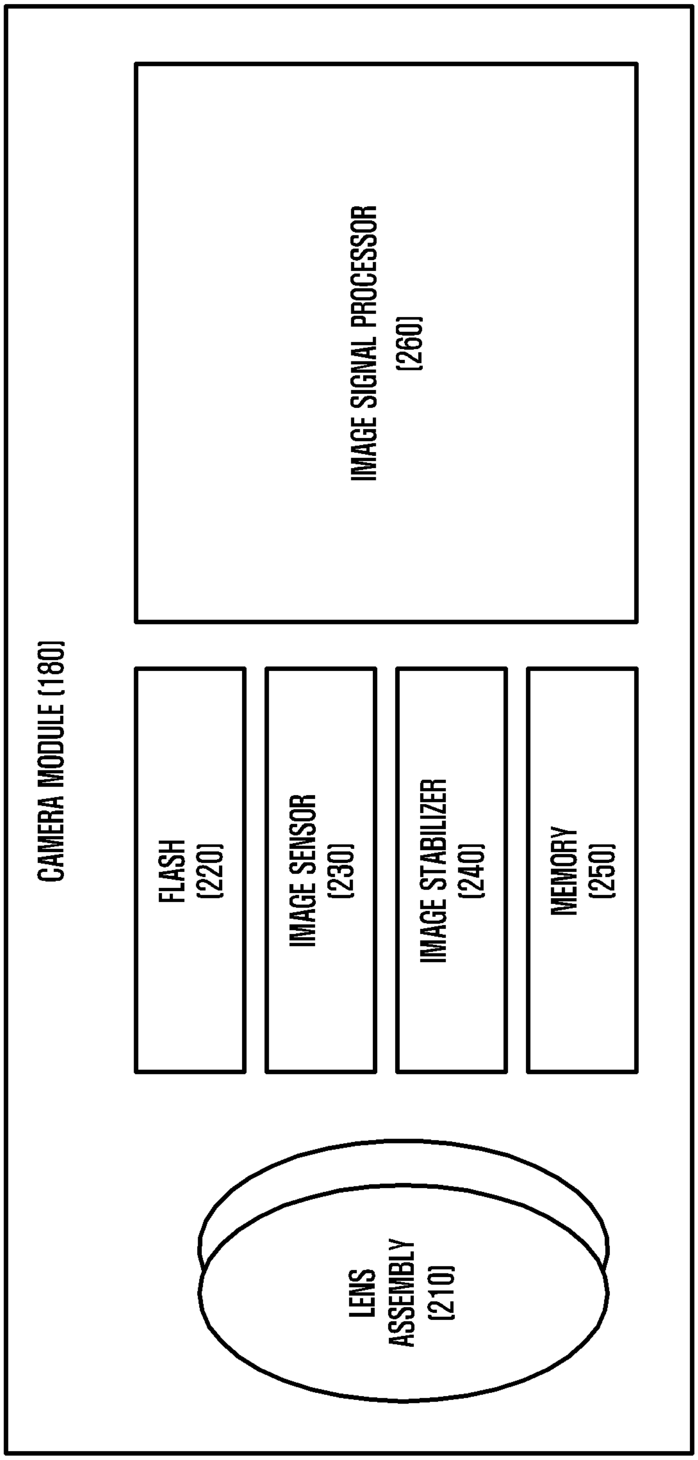
FIG. 2 is a block diagram showing a camera module according to an embodiment of the disclosure.

FIG. 2 is a block diagram of electronic device 200 illustrating the camera module 180 according to an embodiment of the disclosure. Referring to FIG. 2, the camera module 180 may include a lens assembly 210, a flash 220, an image sensor 230, an image stabilizer 240, memory 250 (e.g., buffer memory), or an image signal processor 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as separate memory that is operated independently from the memory 130.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3A:
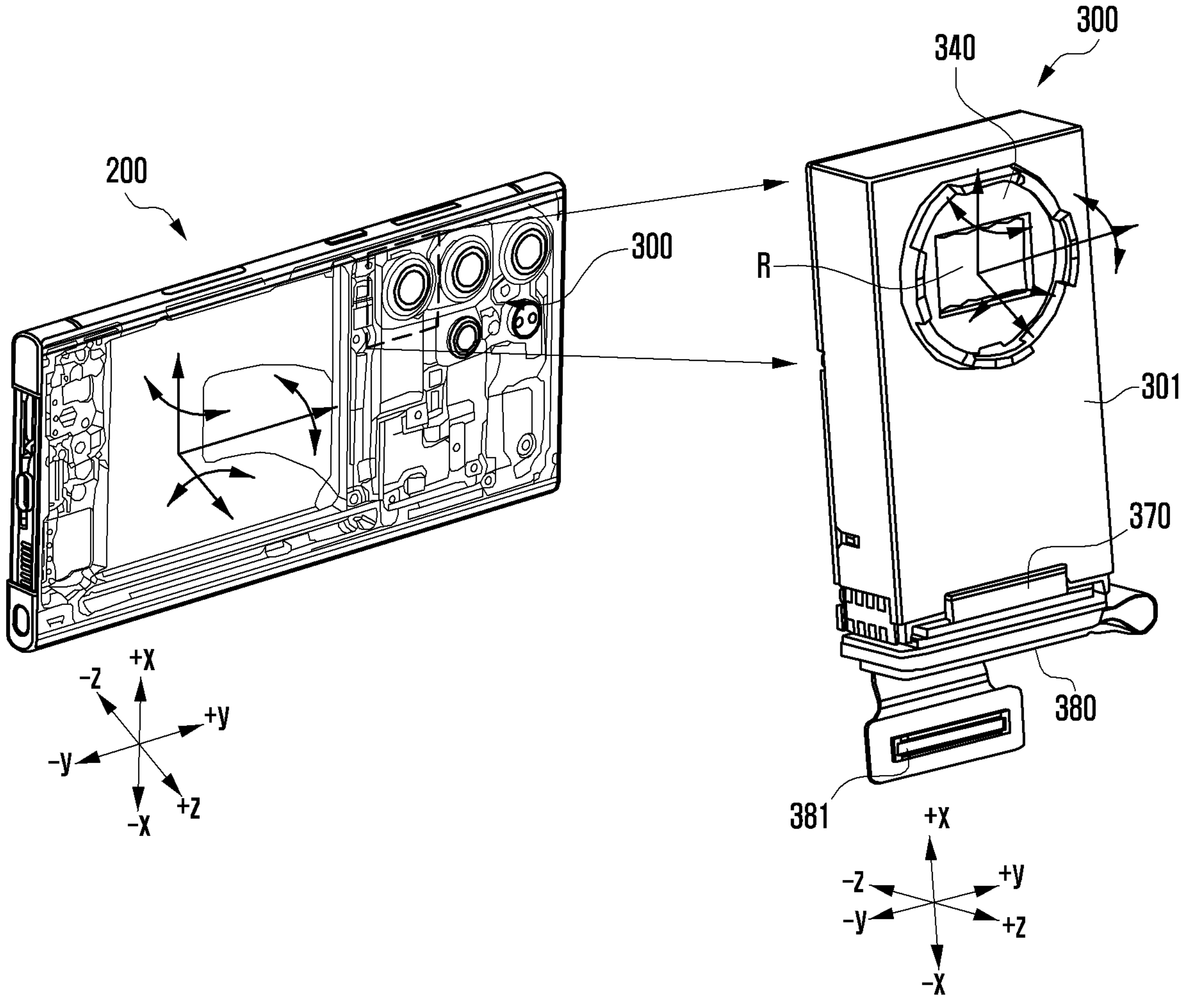
FIGS. 3A and 3B are views of a camera module disposed in an electronic device according to various embodiments of the disclosure.
Figure 3B:
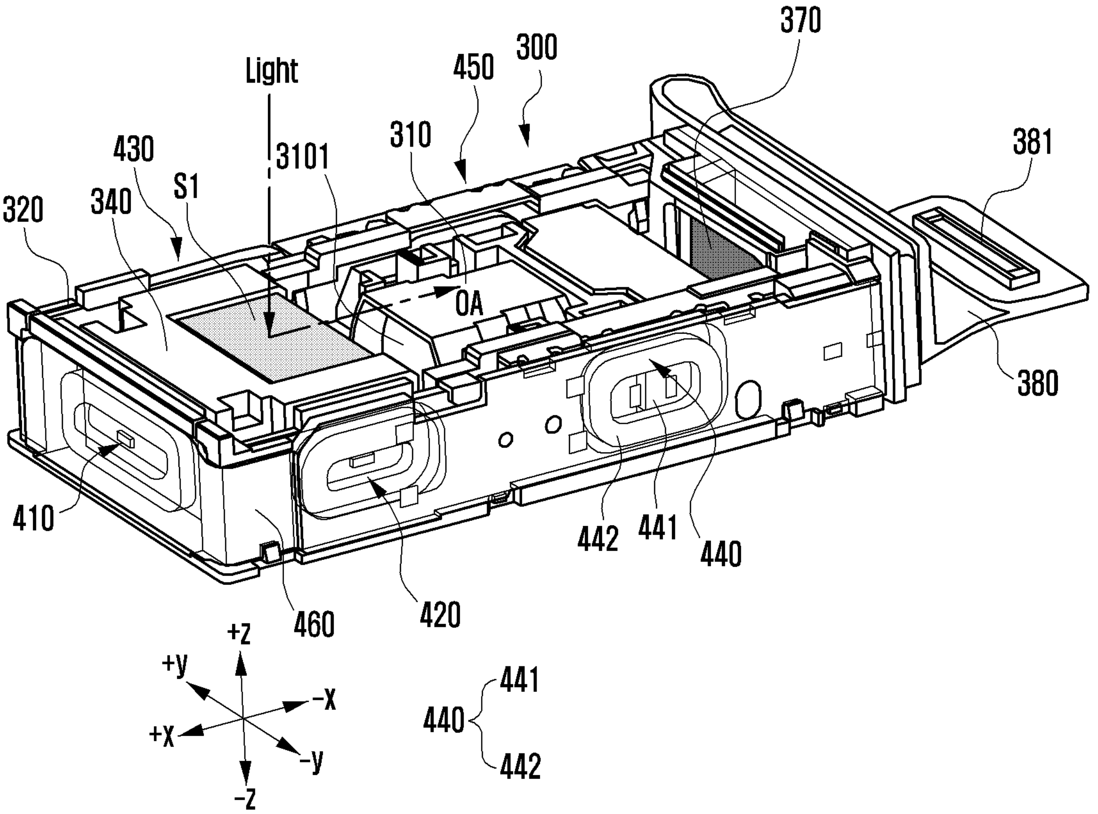

FIGS. 3A and 3B are views of a camera module disposed in an electronic device according to various embodiments of the disclosure.

Figure 4A:
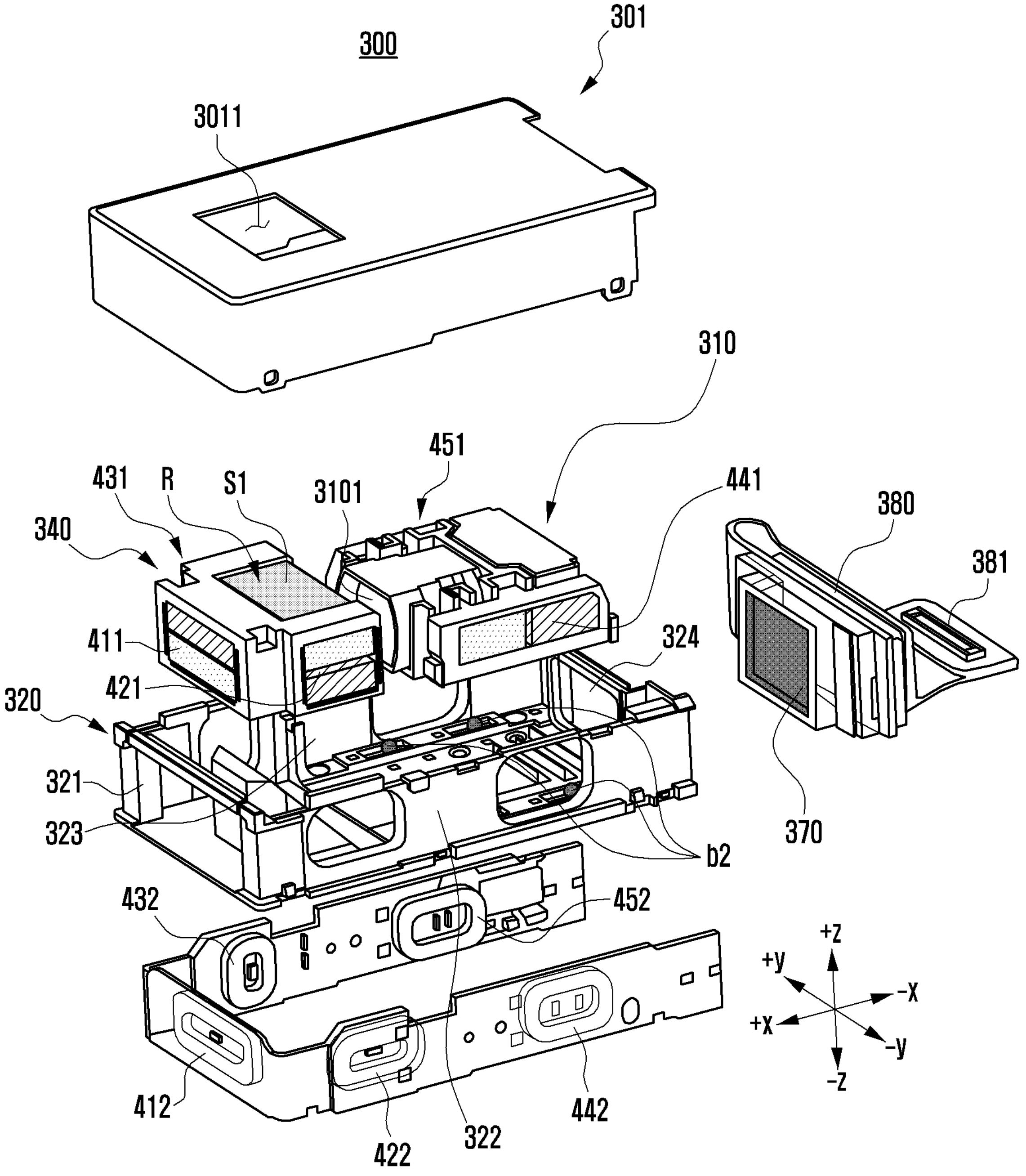
FIG. 4A is an assembly view of the camera module illustrated in FIG. 3A according to an embodiment of the disclosure.

FIG. 4A is an assembly view of the camera module illustrated in FIG. 3A according to an embodiment of the disclosure.

Figure 4B:
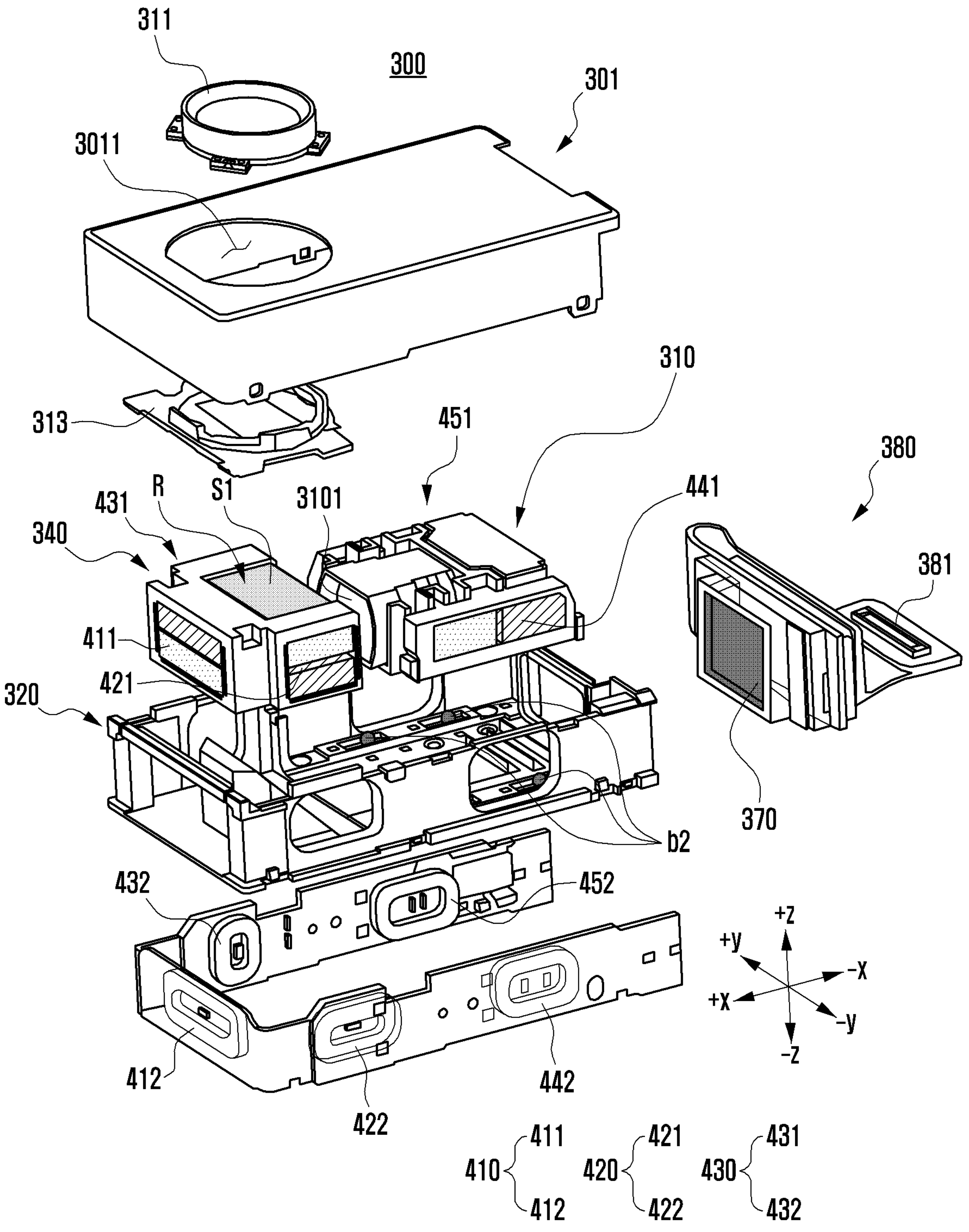
FIG. 4B is an assembly view of a camera module having a first lens module facing an incident surface of a reflective member, which is added to the camera module in FIG. 4A according to an embodiment of the disclosure.

FIG. 4B is an assembly view of a camera module having a first lens module facing an incident surface of a reflective member, which is added to the camera module in FIG. 4A according to an embodiment of the disclosure.

Figure 4C:
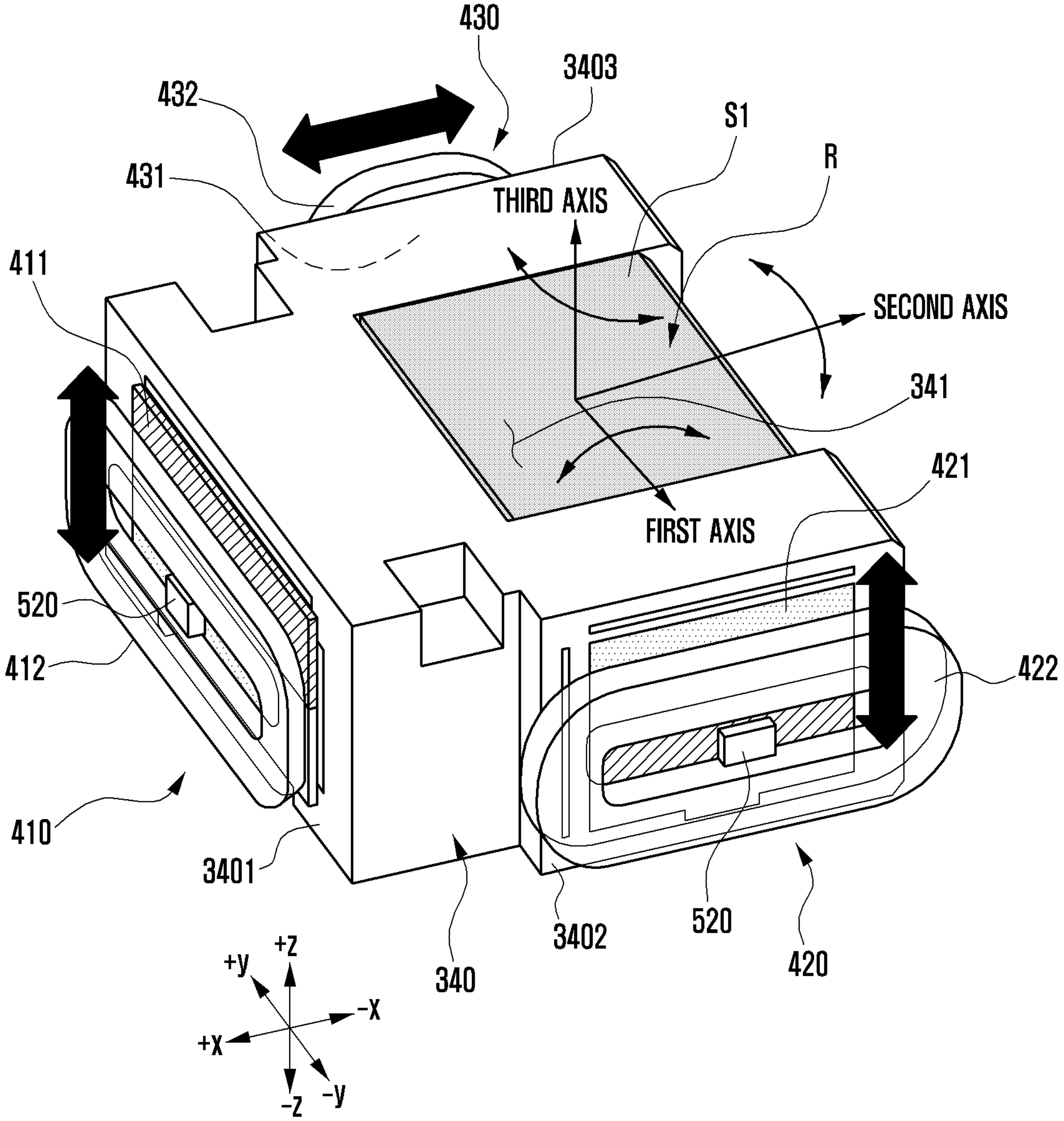
FIG. 4C is a view showing the arrangement relationship of a reflector actuator, a first OIS actuator, a second OIS actuator, and a third OIS actuator according to an embodiment of the disclosure.

FIG. 4C is a view showing the arrangement relationship of a reflector actuator, a first OIS actuator, a second OIS actuator, and a third OIS actuator according to an embodiment of the disclosure.

According to an embodiment, the following description may be a description of a rear camera (e.g., the camera module 300 (e.g., the camera module 180 in FIG. 1) of an electronic device 200 (e.g., the electronic device 101 in FIG. 1) illustrated in FIG. 3A.

According to an embodiment, referring to FIGS. 3A, 3B, 4A, 4B, and 4C, the camera module 300 may include a camera cover 301, a camera housing 320, a reflector actuator including a reflection member R and a carrier 340, a lens driving portion 310, a flexible printed circuit board 460, an image sensor 370 (e.g., the image sensor 230 in FIG. 2), a first OIS actuator 410, a second OIS actuator 420, a third OIS actuator 430, a first AF actuator 440, and/or a second AF actuator 450. At least one of the elements described above may be omitted or at least one other element may be added therein. Referring to FIG. 4B, the camera module may include a lens housing 313 disposed to cover the carrier 340 and face an incident surface S1 of the reflection member R, and a first lens module 311 coupled to the lens housing 313. In this case, light incident from the outside of the electronic device 200 to the camera module 300 may be introduced into the reflection member R through the first lens module 311. In an embodiment, referring to FIG. 4C, the camera module 300 may include the third OIS actuator 430.

In an embodiment, the reflector actuator, the lens driving portion 310, and the image sensor 370 may be arranged in the camera housing 320. In an embodiment, referring to FIG. 3B, the reflector actuator, the lens driving portion 310, and the image sensor 370 may be sequentially arranged in the camera housing 320. For example, the reflector actuator, the lens driving portion 310, and the image sensor 370 may be arranged side by side along an axis (e.g., the axis X in FIG. 3B, an optical axis (OA), the exit optical axis C2 in FIG. 12A) perpendicular to an exit surface S2 (e.g., the exit surface S2 in FIG. 12A) of the reflection member R.

In an embodiment, the reflector actuator may be disposed in the camera housing 320 to be rotatable (or movable) relative to the image sensor 370. In an embodiment, referring to FIG. 3B, the lens driving portion 310 may be disposed in the camera housing 320 to be movable in the direction (e.g., the X-axis direction in FIG. 3B and/or the OA direction in FIG. 3B) of the optical axis (OA) of a lens relative to the image sensor 370.

Referring to FIGS. 4A and 4B, the camera housing 320 may have an open upper surface (e.g., the +Z-axis direction with reference to FIG. 4A) to enable the reflector actuator and the lens driving portion 310 to be arranged therein. In an embodiment, the camera housing 320 may include a first portion 321, a fourth portion 324 substantially parallel to the first portion 321, a second portion 322 connecting the first portion 321 and the fourth portion 324 and substantially perpendicular to the first portion 321 and the fourth portion 324, and a third portion 323 substantially parallel to the second portion 322. In an embodiment, a first OIS coil 412 of the first OIS actuator 410 may be disposed in the first portion 321. In an embodiment, a first AF coil 442 of the first AF actuator 440 and/or a second OIS coil 422 of the second OIS actuator 420 may be disposed in the second portion 322. In an embodiment, a second AF coil 452 of the second AF actuator 450 and/or a third OIS coil 432 of the third OIS actuator 430 may be disposed in the third portion 323. In an embodiment, a part of the image sensor 370 of the camera module 300 may be disposed in the fourth portion 324.

Referring to FIG. 3B, the image sensor 370 may be coupled to the camera housing 320 and thus the position thereof with respect to the camera housing 320 may be fixed. For example, the image sensor 370 may be disposed in the fourth portion 324 of the camera housing 320. In an embodiment, the image sensor 370 may include a substrate 380 and a connector 381. The image sensor 370 may be connected to a printed circuit board (not shown) of the electronic device 200 through the connector 381.

Referring to FIGS. 3A, 4A, and 4B, a camera cover 301 may be positioned outside the camera housing 320 and be coupled to or fitted around the camera housing 320. According to an embodiment, the camera cover 301 may be positioned at the outermost part of the camera module 300 to surround the reflector actuator, the lens driving portion 310, and the flexible printed circuit board 460. In an embodiment, the camera cover 301 may include an opening 3011 formed to allow a part of the reflective member R to be visually exposed from the camera module 300.

Referring to FIGS. 3B, 4A, and 4B, the lens driving portion 310 may include at least one lens 3101, a first AF magnetic body 441 (e.g., a magnet), and a second AF magnetic body 451 (e.g., a magnet). In an embodiment, the lens 3101 may be an element configured to transmit, to the image sensor 370, light emitted from an exit surface (e.g., the exit surface S2 in FIG. 9) of the reflection member R after having passed through the incident surface S1 of the reflection member R. In an embodiment, the first AF magnetic body 441 may face the first AF coil 442 disposed in the second portion 322 of the camera housing 320. In an embodiment, the second AF magnetic body 451 may face the second AF coil 452 disposed in the third portion 323 of the camera housing 320.

In an embodiment, the camera module 300 may be configured such that the lens driving portion 310 moves relative to the image sensor 370 and thus may be configured to perform an auto focus (AF) function for automatically adjusting the focus of the lens 3101 on a subject outside the electronic device 200, under control of the processor 120. In an embodiment, the lens driving portion 310 may move relative to the image sensor 370 along the optical axis (OA) (e.g., the X-axis direction in FIG. 3B) of the lens 3101 by at least one of the first AF actuator 440 and the second AF actuator 450.

Referring to FIGS. 3B, 4A, and 4B, the first AF actuator 440 may include a first AF magnetic body 441 (e.g., a magnet), and a first AF coil 442 which is disposed in the second portion 322 of the camera housing 320 so that at least a part thereof faces the first AF magnetic body 441 and is connected to a flexible printed circuit board 460. In an embodiment, the second AF actuator 450 may include a second AF magnetic body 451 (e.g., a magnet), and a second AF coil 452 which is disposed in the third portion 323 substantially parallel to the first portion 321 of the camera housing 320 so that at least a part thereof faces the second AF magnetic body 451 and is connected to a flexible printed circuit board 460. In addition, the first AF actuator 440 and the second AF actuator 450 may be changed to various elements capable of moving the lens driving portion 310 in the direction of the optical axis (OA) of the lens 3101. In an embodiment, the first AF coil 442 and the second AF coil 452 may generate a magnetic force as a current is applied thereto through the flexible printed circuit board 460. By the electromagnetic force acting between the first AF magnetic body 441 and the first AF coil 442 and/or the electromagnetic force acting between the second AF magnetic body 451 and the second AF coil 452, the lens driving portion 310 may be moved relative to the image sensor 370 in the X-axis direction (e.g., the direction of the optical axis (OA) in FIG. 3B) to automatically adjust the focus of the lens 3101 on a subject.

According to an embodiment, as illustrated in FIGS. 4A and 4B, the lens driving portion 310 may move relative to the camera housing 320 in the X-axis direction by means of AF balls b2 which are a bearing ball. In an embodiment, the AF balls b2 may be arranged in a ball guide portion formed to extend in the direction of the axis X (e.g., the axis X in FIG. 3B), in the camera housing 320. The AF balls b2 may be arranged in the ball guide portion in the X-axis direction to guide the movement of the lens driving portion 310 relative to the camera housing 320.

Referring to FIGS. 3A, 3B, 4A, and 4B, the camera module 300 may achieve high magnification by using the refraction of light. In an embodiment, light incident to the camera module 300 may be reflected or refracted by the reflector actuator. Therefore, the light path may be changed, and thus the light may be introduced into the image sensor 370 after having passed through the lens driving portion 310.

Referring to FIGS. 3B, 4A, and 4B, the reflector actuator may include the reflection member R and the carrier 340 on which the reflection member R is seated. In an embodiment, the reflection member R may include an element, such as a prism or a mirror, for refracting or reflecting light to change the path thereof.

Figure 5A:
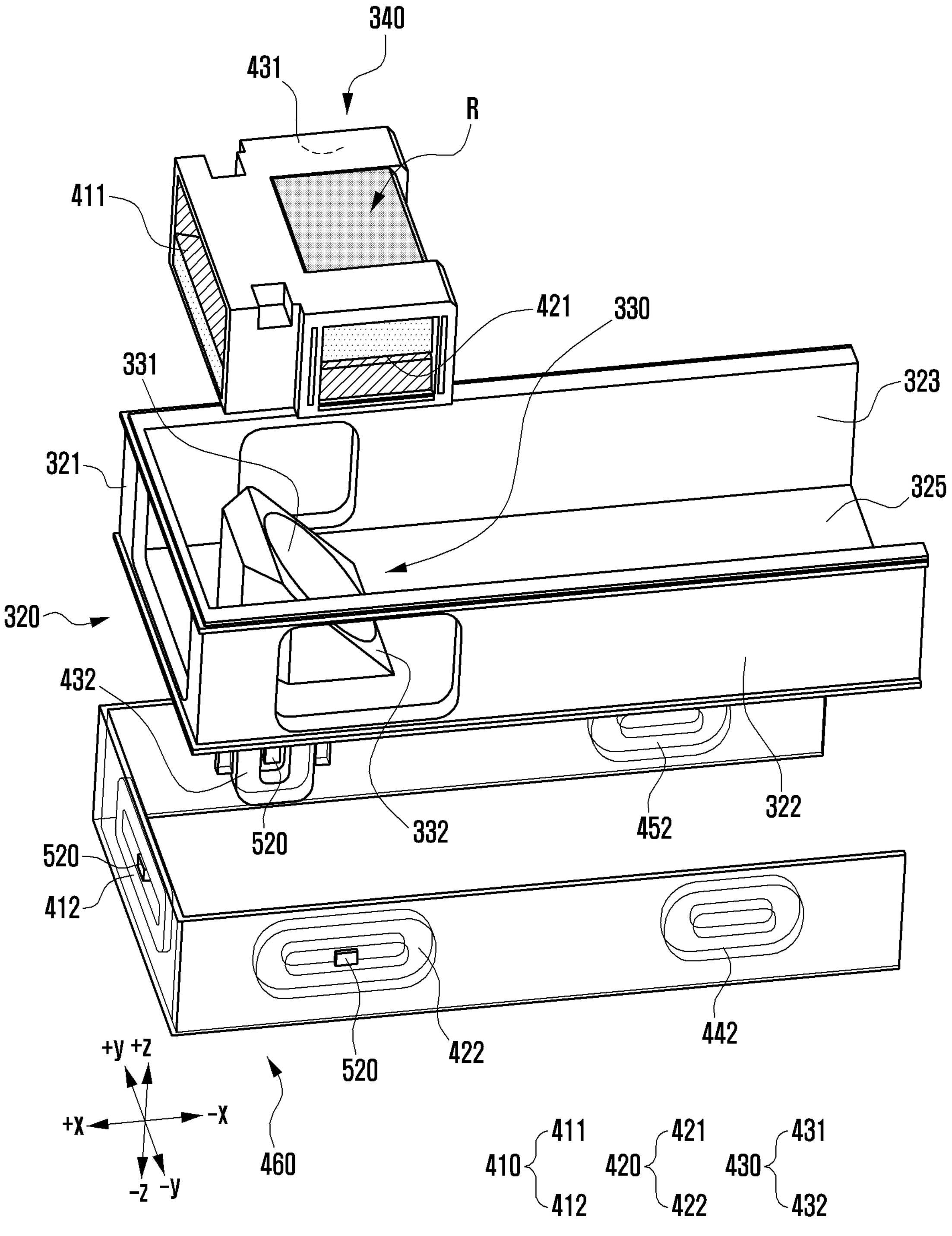
FIGS. 5A and 5B are assembly views of a flexible printed circuit board, a camera housing, and a reflector actuator according to various embodiments of the disclosure.
Figure 5B:
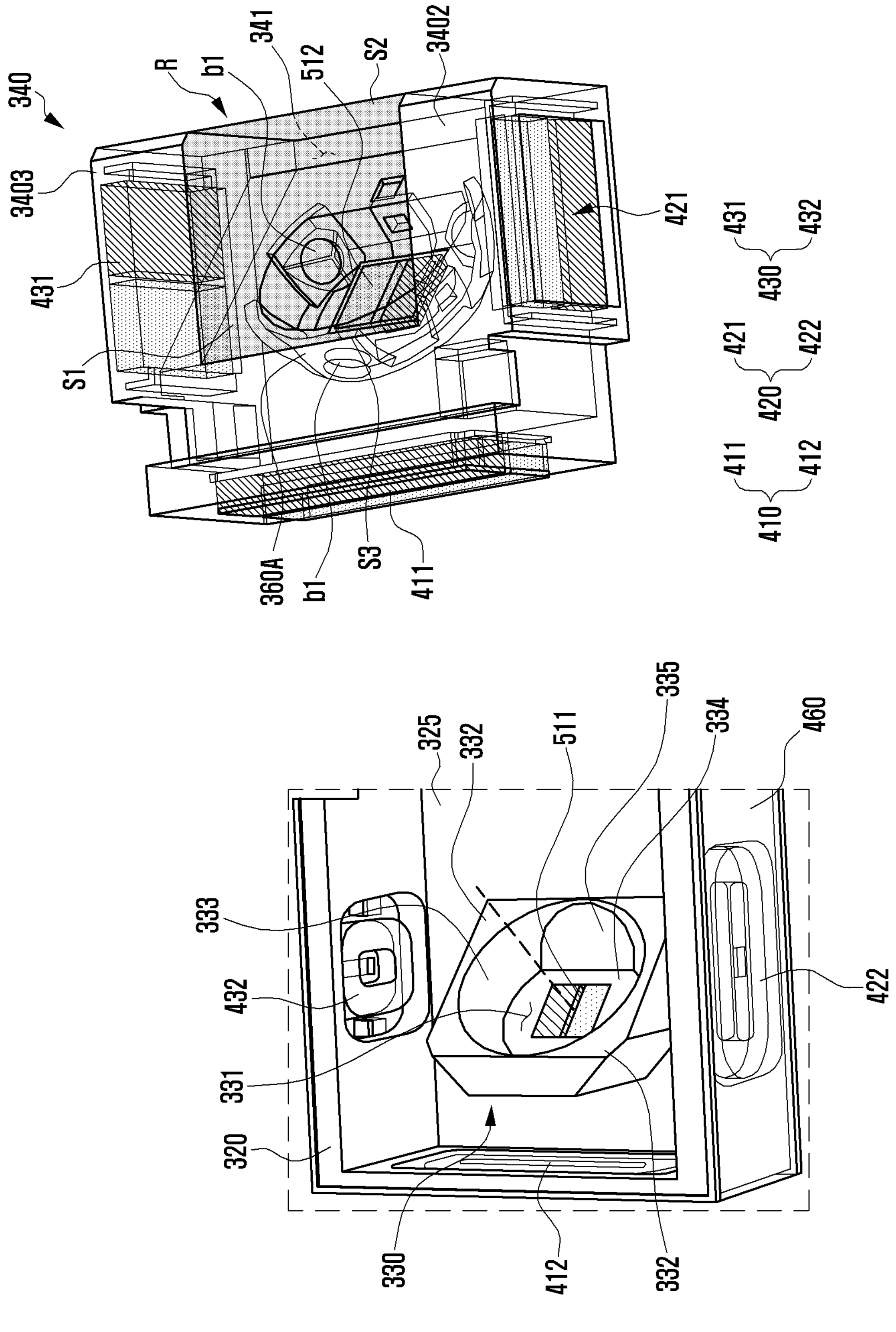
Figure 9:
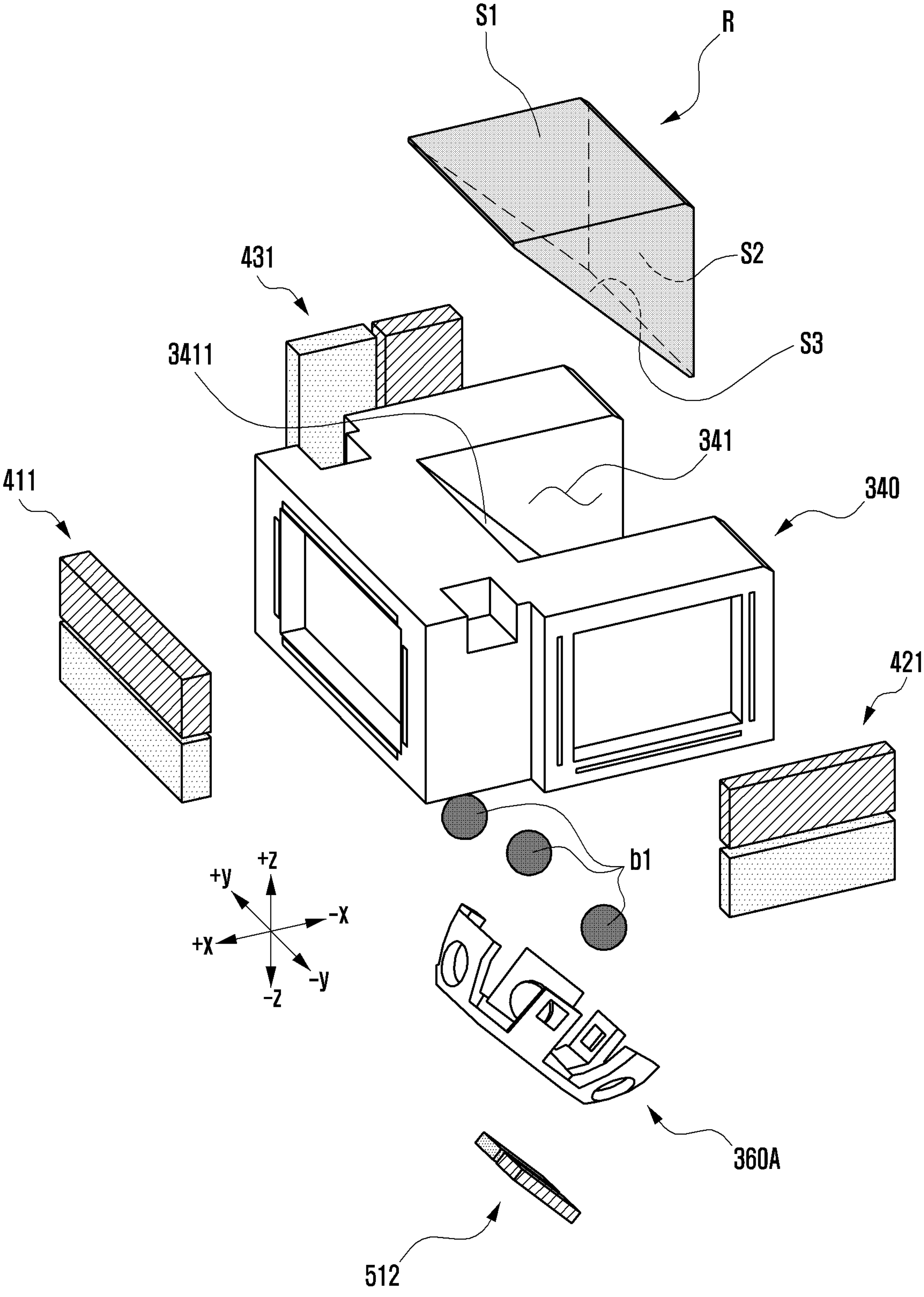
FIG. 9 is an assembly view of a reflector actuator according to an embodiment of the disclosure.
Figure 12A:
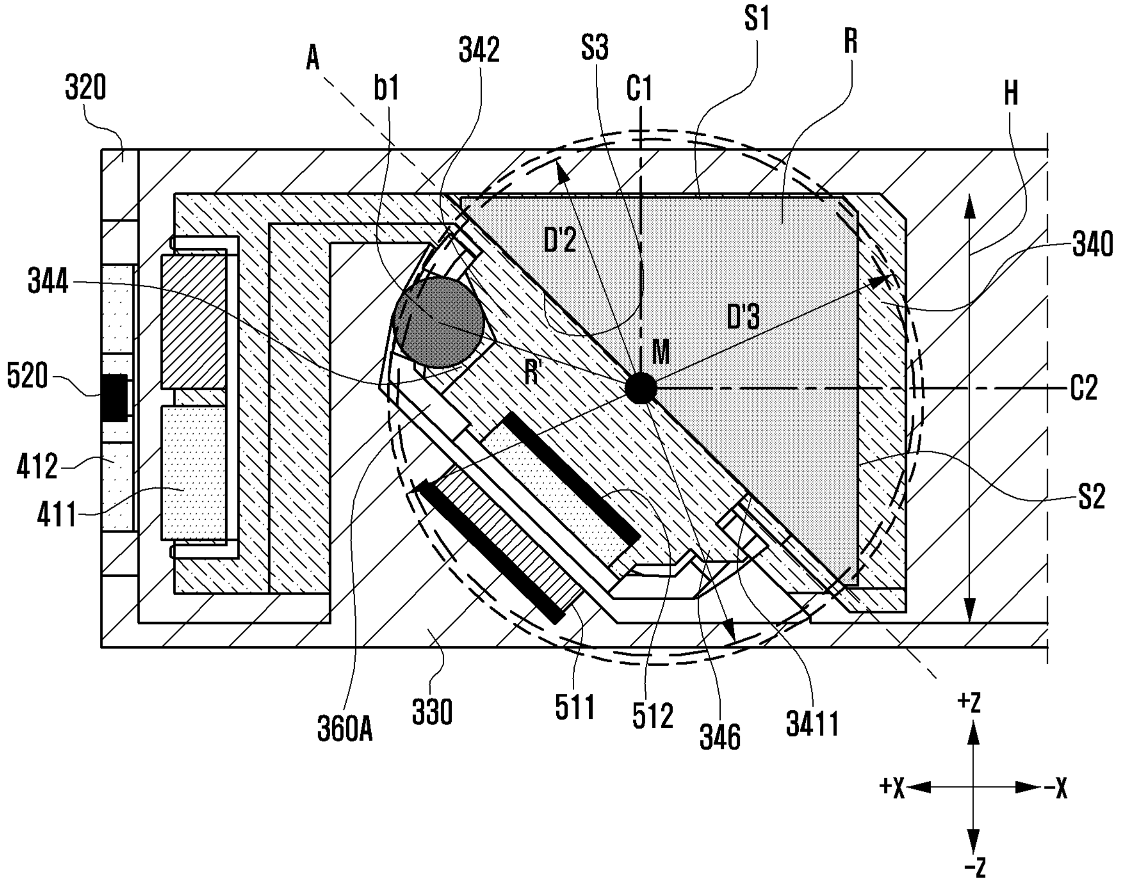
FIG. 12A is a view showing a state where a guide portion of a carrier is fastened to an accommodating portion of a camera housing according to an embodiment of the disclosure.

Referring to FIGS. 5B, 9, and 12A described below, the reflection member R may include an incident surface S1 to which light is incident, a reflection surface S3 (e.g., the reflection surface S3 in FIG. 12A) from which light is reflected or refracted, and an exit surface S2 from which the incident light is emitted. In an embodiment, the incident surface S1 and the exit surface S2 may be substantially perpendicular. In an embodiment, the reflection surface S3 may be a surface which connects the incident surface S1 and the exit surface S2 and at least a part of which faces a first sloping surface 3411 of a seating portion (e.g., the seating portion 341 in FIG. 9) of the carrier 340. In an embodiment, light incident to the incident surface S1 of the reflection member R may be reflected from the reflection surface S3, may pass through the exit surface S2, and may be introduced into the image sensor 370 through the lens 3101 of the lens driving portion 310.

Figure 6A:
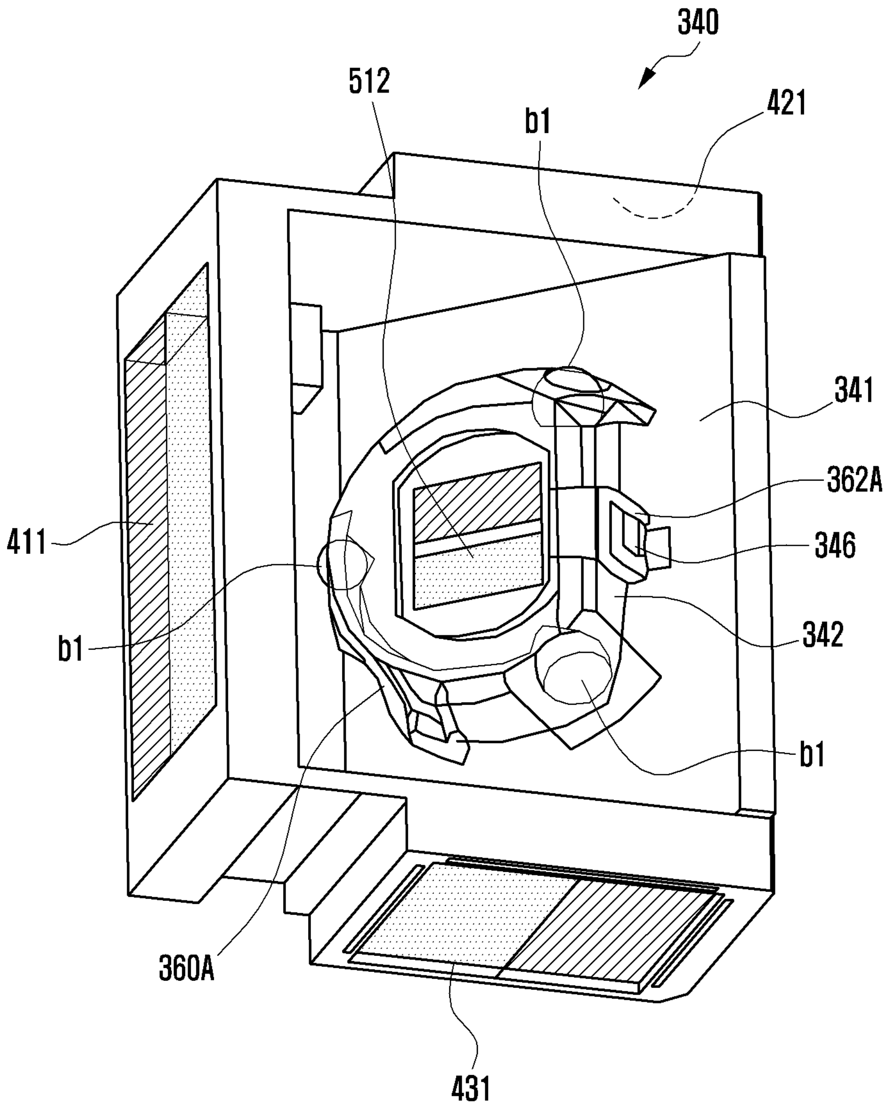
FIG. 6A is a rear perspective view of a reflector actuator according to an embodiment of the disclosure.

Referring to FIGS. 5B and 6A described below, the carrier 340 may include a guide portion 342, at least a part of which is fastened to an accommodating portion 330 formed in the camera housing 320. In an embodiment, the carrier 340 may rotate around a first axis (e.g., a pitch axis and/or the axis Y in FIG. 4C), a second axis (e.g., a yaw axis and/or the axis X in FIG. 4C), and/or a third axis (e.g., a roll axis and/or the axis Z in FIG. 4C) relative to the camera housing 320 with reference to the accommodating portion 330, to perform the optical image stabilizer (OIS) function for correcting shaking of the camera module 300.

Referring to FIGS. 4A, 4B and 4C, the camera module 300 may be configured such that the first OIS actuator 410, the second OIS actuator 420, and/or the third OIS actuator 430 is controlled by the processor 120, to correct shaking of an image (e.g., perform an optical image stabilizer (OIS) function). In an embodiment, the first OIS actuator 410 may include a first OIS magnetic body 411 (e.g., a magnet) disposed on the carrier 340 to face the first portion 321 of the camera housing 320, and a first OIS coil 412 which is disposed in the first portion 321 of the camera housing 320 such that at least a part thereof faces the first OIS magnetic body 411 and is connected to the flexible printed circuit board 460. In an embodiment, the second OIS actuator 420 may include a second OIS magnetic body 421 (e.g., a magnet) disposed on the carrier 340 to face the second portion 322 of the camera housing 320, and a second OIS coil 422 which is disposed in the second portion 322 of the camera housing 320 such that at least a part thereof faces the second OIS magnetic body 421 and is connected to the flexible printed circuit board 460. In an embodiment, the third OIS actuator 430 may include a third OIS magnetic body 431 (e.g., a magnet) (e.g., the third OIS magnetic body 431 in FIG. 4A) disposed on the carrier 340 to face the third portion 323 of the camera housing 320, and a third OIS coil 432 which is disposed in the third portion 323 of the camera housing 320 such that at least a part thereof faces the third OIS magnetic body 431 and is connected to a flexible printed circuit board 460. In addition, the first OIS actuator 410, the second OIS actuator 420, and the third OIS actuator 430 may be changed to various elements capable of rotating the carrier 340 relative to the image sensor 370.

According to an embodiment, the processor 120 may control to rotate the carrier 340 around the first axis (e.g., the first axis in FIG. 4C), the second axis (e.g., the second axis in FIG. 4C), and/or the third axis (e.g., the third axis in FIG. 4C) relative to the image sensor 370, in a direction in which that a movement (e.g., shaking and/or hand tremors) generated by a user during a photographing process using the camera module 300 of the electronic device 200 is offset. The processor 120 of the electronic device 200 may obtain movement information of the electronic device 200 detected by a sensor module (e.g., the sensor module 176 in FIG. 1) of the electronic device 200 and may operate the first OIS actuator 410, the second OIS actuator 420, and/or the third OIS actuator 430, based on the movement information. For example, the first OIS actuator 410, the second OIS actuator 420, and/or the third OIS actuator 430 may be operated so that the carrier 340 rotates around the first axis, the second axis, and/or the third axis relative to the image sensor 370 of the camera module 300 by a predetermined angle, based on the movement information of the electronic device 200. Through this, the quality of the image obtained through the camera module 300 can be improved. For example, in the process of capturing a video of a subject or in the process of capturing an image of a subject, shaking of the camera module 300 can be suppressed to improve the image quality.

Referring to FIGS. 3B, 4A, 4B, and 4C, the carrier 340 may include a first surface 3401 facing the first portion 321 of the camera housing 320, a second surface 3402 facing the second portion 322 of the camera housing 320, and a third surface 3403 facing the third portion 323 of the camera housing 320. In an embodiment, the second surface 3402 and the third surface 3403 may be substantially parallel to each other. In an embodiment, the first surface 3401 may be substantially perpendicular to the second surface 3402 and the third surface 3403. In an embodiment, the first OIS magnetic body 411 may be disposed on the first surface 3401 of the carrier 340 to face the first OIS coil 412 disposed in the first portion 321 of the camera housing 320. In an embodiment, the second OIS magnetic body 421 may be disposed on the second surface 3402 of the carrier 340 to face the second OIS coil 422 disposed in the second portion 322 of the camera housing 320. In an embodiment, the third OIS magnetic body 431 may be disposed on the third surface 3403 of the carrier 340 to face the third OIS coil 432 disposed in the third portion 323 of the camera housing 320. In an embodiment, the first OIS magnetic body 411 and the second OIS magnetic body 421 may be arranged on surfaces (e.g., the first surface 3401 and the second surface 3402) which are perpendicular to each other, in the carrier 340, and thus be positioned at positions substantially perpendicular to each other. In an embodiment, the first OIS magnetic body 411 and the third OIS magnetic body 431 may be arranged on surfaces (e.g., the first surface 3401 and the third surface 3403) which are perpendicular to each other, in the carrier 340, and thus be positioned at positions substantially perpendicular to each other.

Referring to FIGS. 4C and 5A described below, by an electromagnetic force acting on the first OIS actuator 410 (e.g., the first OIS magnetic body 411 and the first OIS coil 412), the carrier 340 and the reflection member R may be rotated (e.g., rotated on the XZ plane in FIG. 4C) around the first axis (e.g., a pitch axis and/or the axis Y in FIG. 4C) relative to the image sensor 370. In an embodiment, by an electromagnetic force acting on the second OIS actuator 420 (e.g., the second OIS magnetic body 421 and the second OIS coil 422), the carrier 340 and the reflection member R may be rotated (e.g., rotated on the YZ plane in FIG. 4C) around the second axis (e.g., a yaw axis and/or the axis X in FIG. 4C) relative to the image sensor 370. In an embodiment, by an electromagnetic force acting on the third OIS actuator 430 (e.g., the third OIS magnetic body 431 and the third OIS coil 432), the carrier 340 and the reflection member R may be rotated (e.g., rotated on the XY plane in FIG. 4C) around the third axis (e.g., a roll axis and/or the axis Z in FIG. 4C) relative to the image sensor 370.

In an embodiment, the carrier 340 may rotate around the first axis, the second axis, and the third axis as rotation axes, and thus may rotate relative to the image sensor 370 and the camera housing 320. In an embodiment, the third axis may be an incident optical axis (e.g., the incident optical axis C1 in FIG. 12A) passing through the center of the incident surface S1 of the reflection member R. The second axis may be an exit optical axis (e.g., the exit optical axis C2 in FIG. 12A) passing through the center of the exit surface S2 of the reflection member R. In an embodiment, the first axis may be an axis which passes through the intersection point of the second axis and the third axis and is substantially parallel to the axis Y in FIG. 4C. In an embodiment, the intersection point of the first axis, the second axis, and the third axis may be positioned on the reflection surface S3 of the reflection member R.

As described below, the rotation center (e.g., the rotation center M in FIG. 12A) of the reflection member R may coincide with the reflection center of the reflection surface S3. In an embodiment, the reflection center may be the intersection point of the incident optical axis C1 (e.g., the third axis) passing through the center of the incident surface S1 of the reflection member R and the exit optical axis C2 (e.g., the second axis) passing through the center of the exit surface S2 of the reflection member R. In an embodiment, the rotation center M of the reflection member R may be the rotation center M of the carrier 340 relative to the camera housing 320. In an embodiment, the rotation center M of the reflection member R may be the intersection point of the first axis, the second axis, and/or the third axis. Therefore, according to an embodiment of the disclosure, as the rotation center M of the reflection member R and the reflection center of the reflection surface S3 coincide with each other, an error in the correction of shaking of an image, based on the control of the first OIS actuator 410, the second OIS actuator 420, and/or the third OIS actuator 430, can be reduced.

As described above, the second OIS actuator 420 may be configured to rotate the carrier 340 and the reflection member R around the second axis relative to the image sensor 370, and the third OIS actuator 430 may be configured to rotate the carrier 340 and the reflection member R around the third axis relative to the image sensor 370. However, it is not limited to the above description, and various embodiments may be possible. In an embodiment, the second OIS actuator 420 may be configured to rotate the carrier 340 and the reflection member R around the third axis relative to the image sensor 370. In this case, the third OIS actuator 430 may be configured to rotate the carrier 340 and the reflection member R around the second axis relative to the image sensor 370. In an embodiment, referring to FIG. 6B described below, the second OIS actuator 420 and the third OIS actuator 430 may be configured to rotate the carrier 340 and the reflection member R around the third axis relative to the image sensor 370. For example, the second OIS actuator 420 and the third OIS actuator 430 may be configured to rotate the carrier 340 and the reflection member R around the third axis relative to the image sensor 370. In an embodiment, the second OIS actuator 420 and the third OIS actuator 430 may be configured such that axes around which the carrier 340 and the reflection member R rotate are the same. For example, the second OIS actuator 420 and the third OIS actuator 430 may be configured to rotate the carrier 340 and the reflection member R around the second axis relative to the image sensor 370.

In addition, the first OIS actuator 410, the second OIS actuator 420, and the third OIS actuator 430 may be configured to provide various rotation axes to the carrier 340 and the reflection member R. Hereinafter, for the convenience of explanation, the second OIS actuator 420 may be configured to rotate the carrier 340 and the reflection member R around the second axis, and the third OIS actuator 430 may be configured to rotate the carrier 340 and the reflection member R around the third axis.

According to an embodiment of the disclosure, either of the second OIS actuator 420 or the third OIS actuator 430 may be omitted. For example, the third OIS actuator 430 may be omitted. For example, in this case, shaking of an image may be corrected by driving the first OIS actuator 410 to rotate the carrier 340 around the first axis relative to the image sensor 370. In addition, shaking of an image may be corrected by driving the second OIS actuator 420 to rotate the carrier around the second axis or the third axis relative to the image sensor 370. Under the condition that the camera housing 320 includes all of the first OIS actuator 410, the second OIS actuator 420, and the third OIS actuator 430, the following description will be described. However, the following description can be equally applied to even the case that one of the second OIS actuator 420 and the third OIS actuator 430 of the camera housing 320 is omitted.

Referring to FIGS. 4C and 5A described below, at least one magnetic flux detection sensor 520 may be disposed at the center part of an OIS coil (e.g., the first OIS coil 412, the second OIS coil 422, and third OIS coil 432). In an embodiment, multiple magnetic flux detection sensors 520 may be arranged inside the OIS coil. The magnetic flux detection sensor 520 may detect changes in magnetic flux values according to a change in the distance from an OIS magnetic body (e.g., the first OIS magnetic body 411, the second OIS magnetic body 421, the third OIS magnetic body 431) facing the magnetic flux detection sensor, based on rotation of the carrier 340. The processor 120 may detect a change in the magnetic flux value detected through the magnetic flux detection sensor 520 to control the rotation of the carrier 340.

Figure 6B:
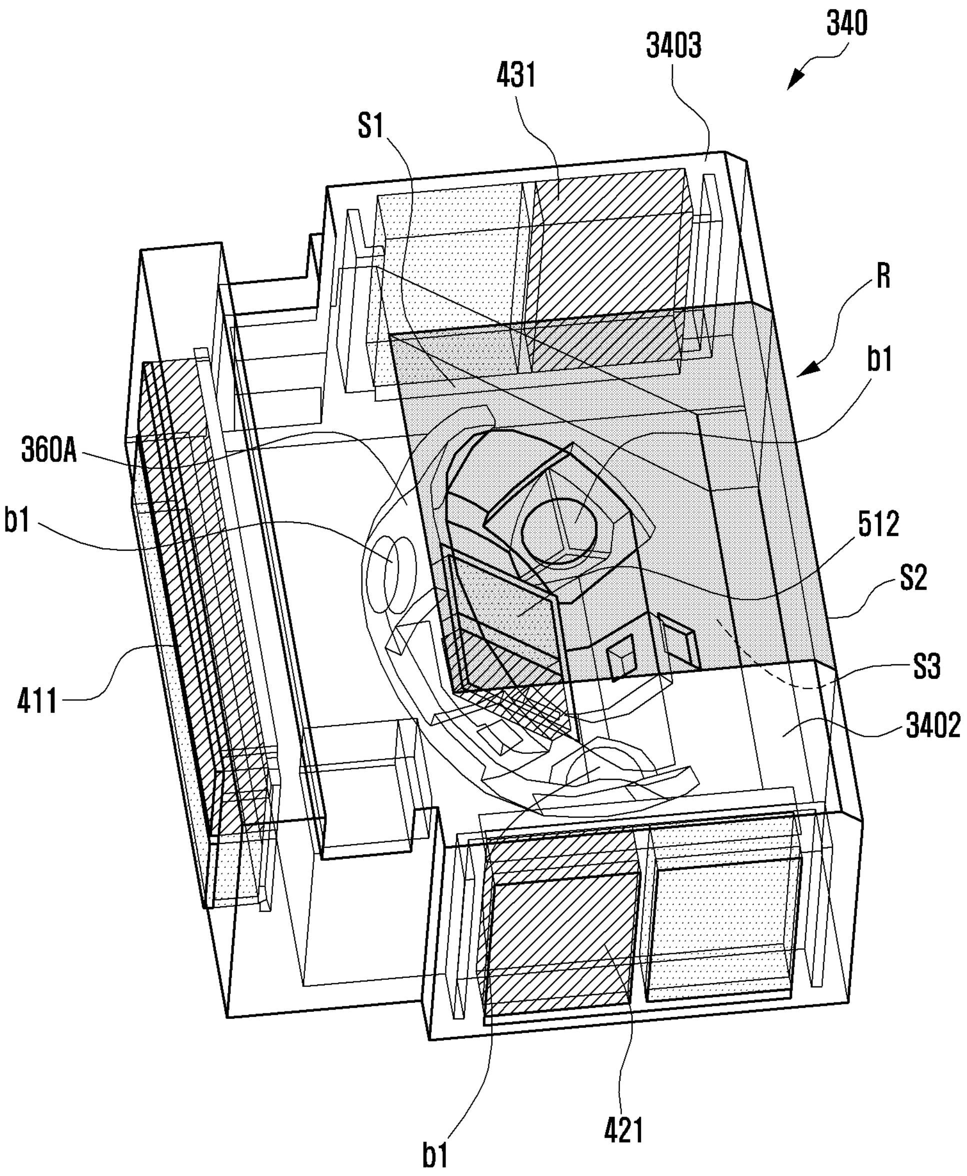
FIG. 6B is a front perspective view of a reflector actuator according to an embodiment of the disclosure.
Figure 6C:
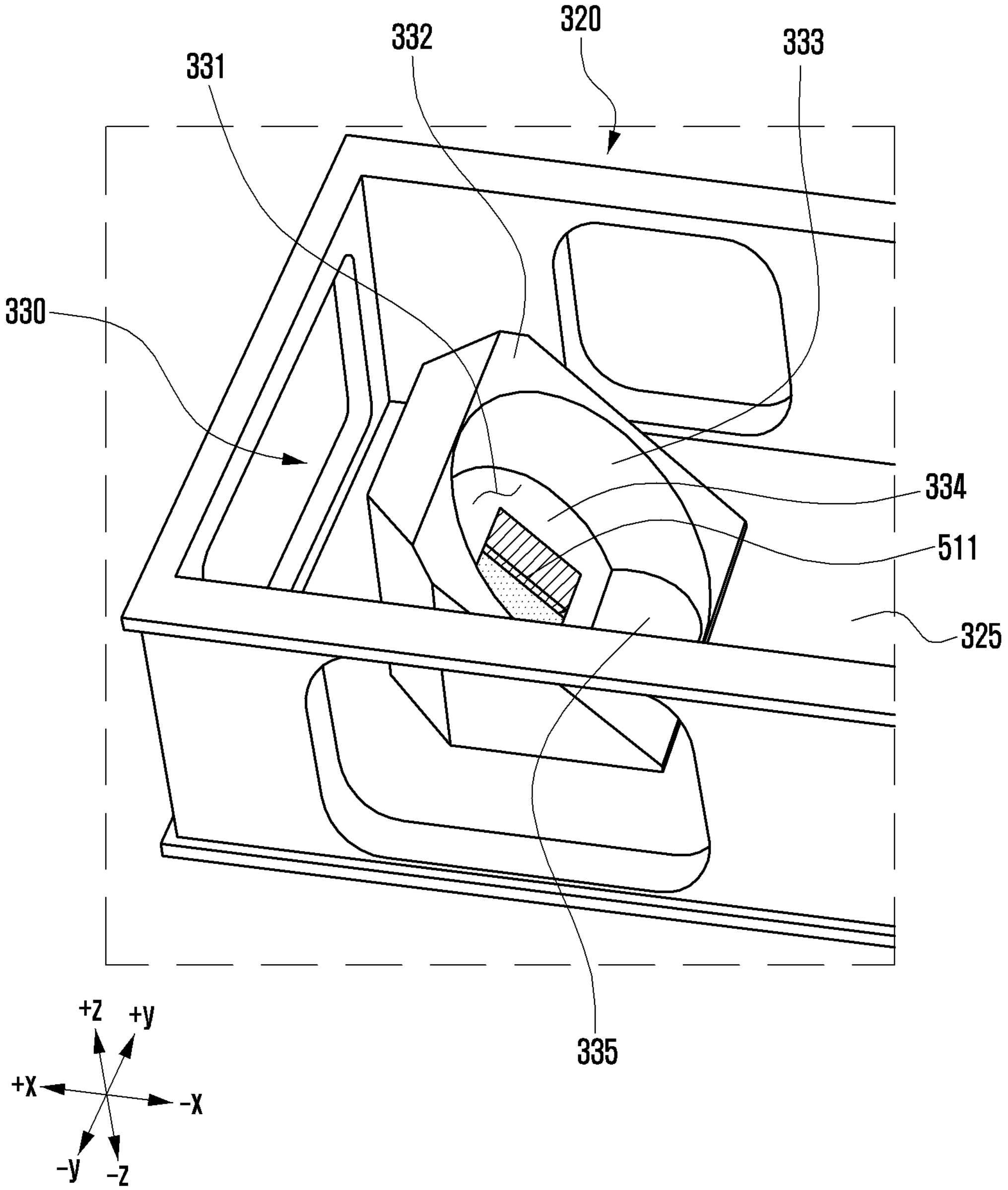
FIG. 6C is a front perspective view of a camera housing according to an embodiment of the disclosure.
Figure 7A:
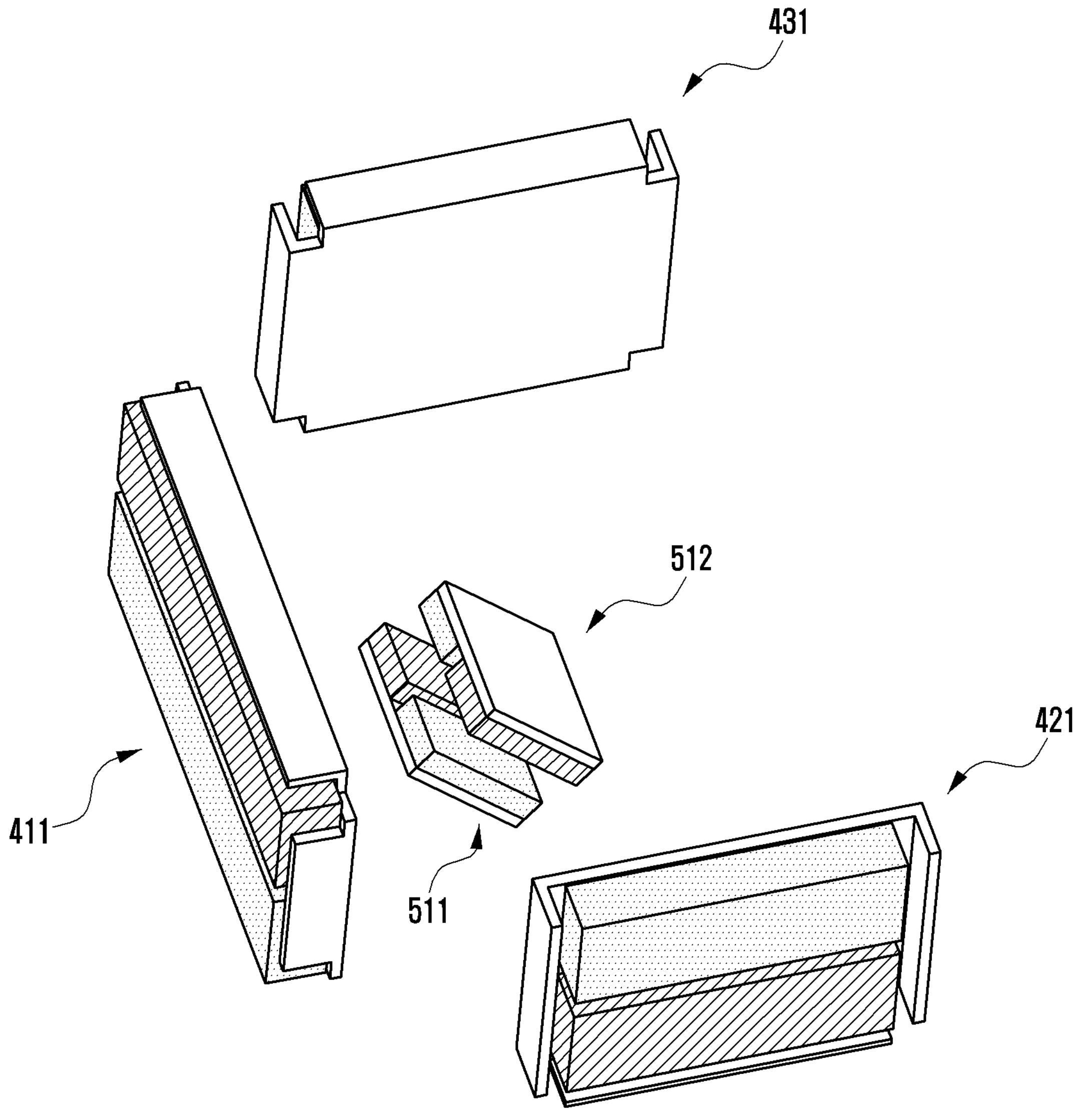
FIGS. 7A, 7B, and 7C are views of a first attraction magnetic body and a second attraction magnetic body according to various embodiments of the disclosure.
Figure 7B:
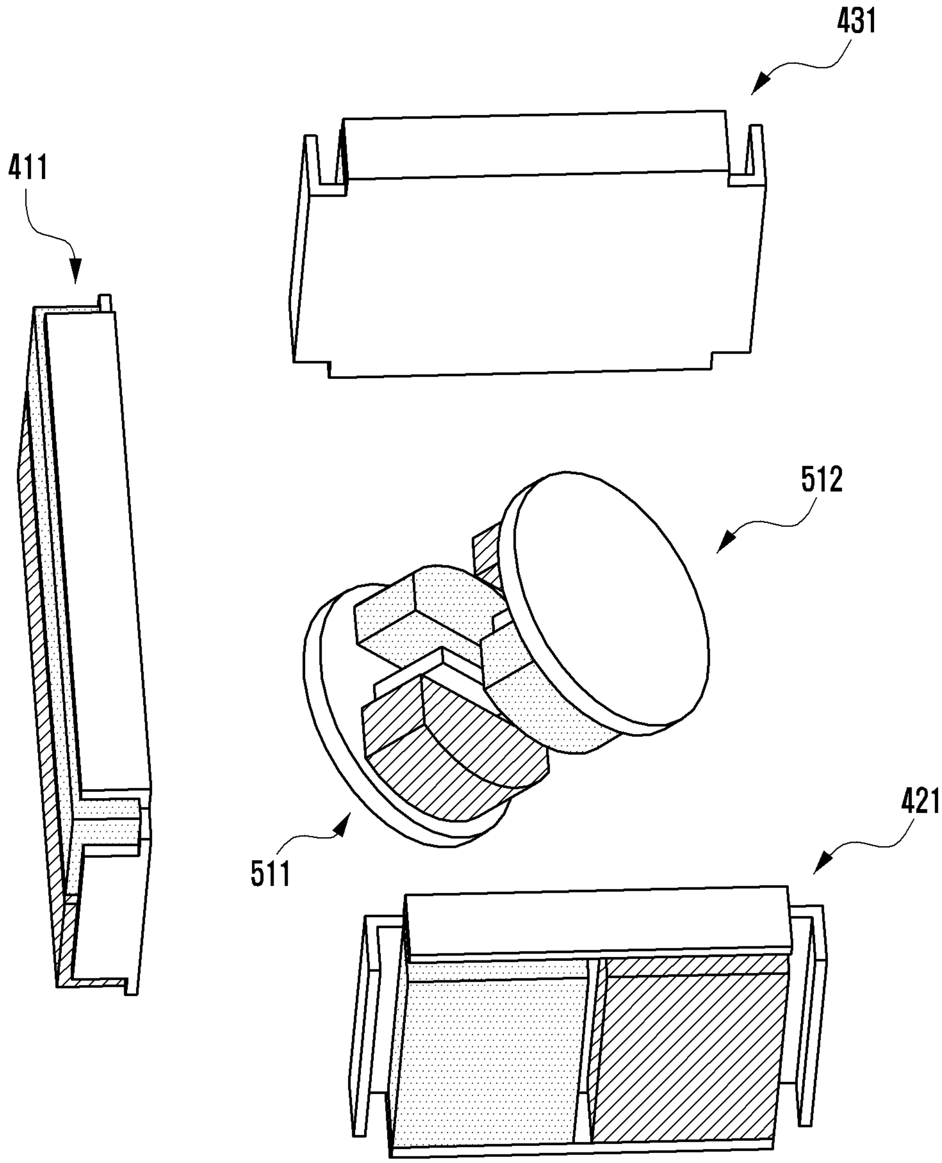
Figure 7C:
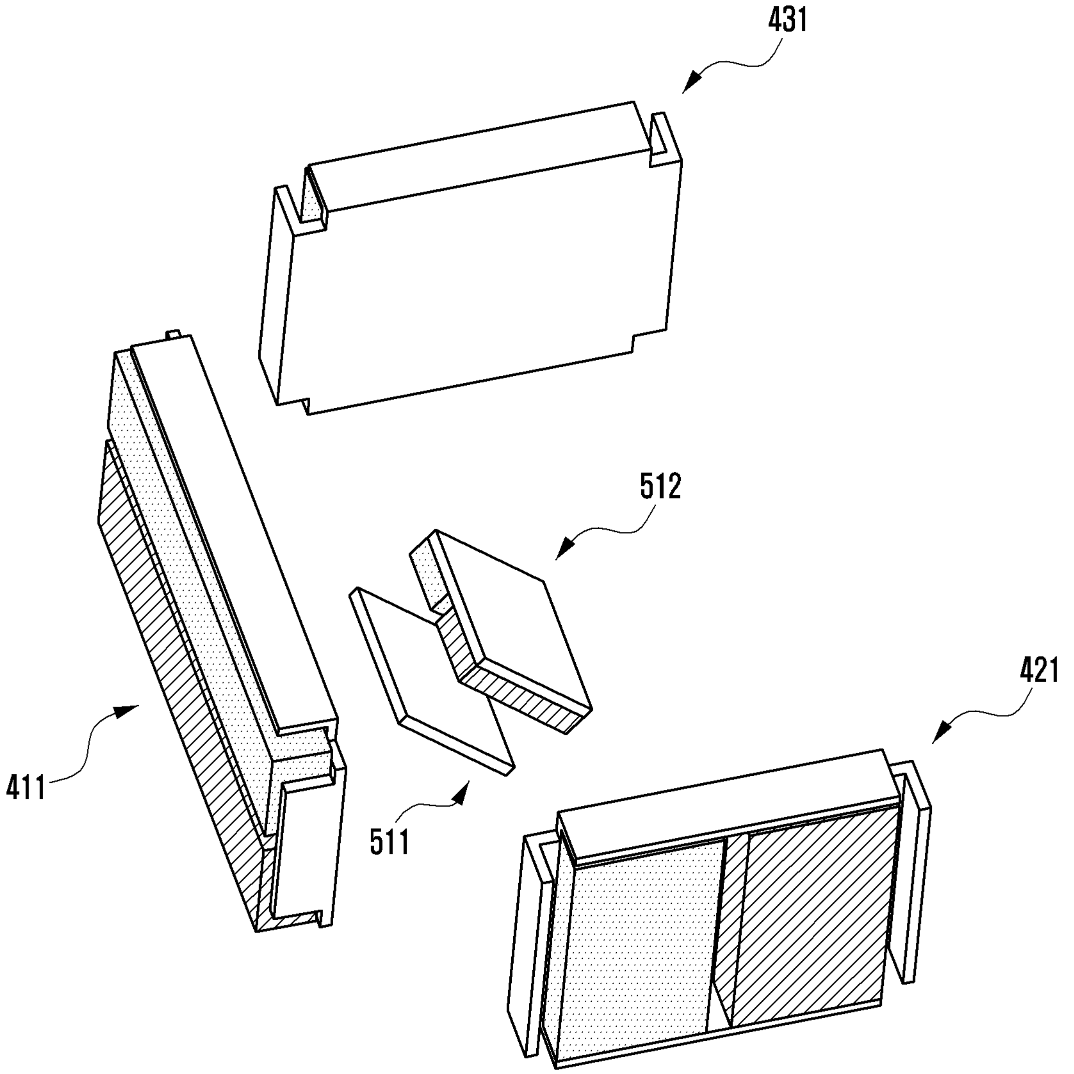
Figure 8:
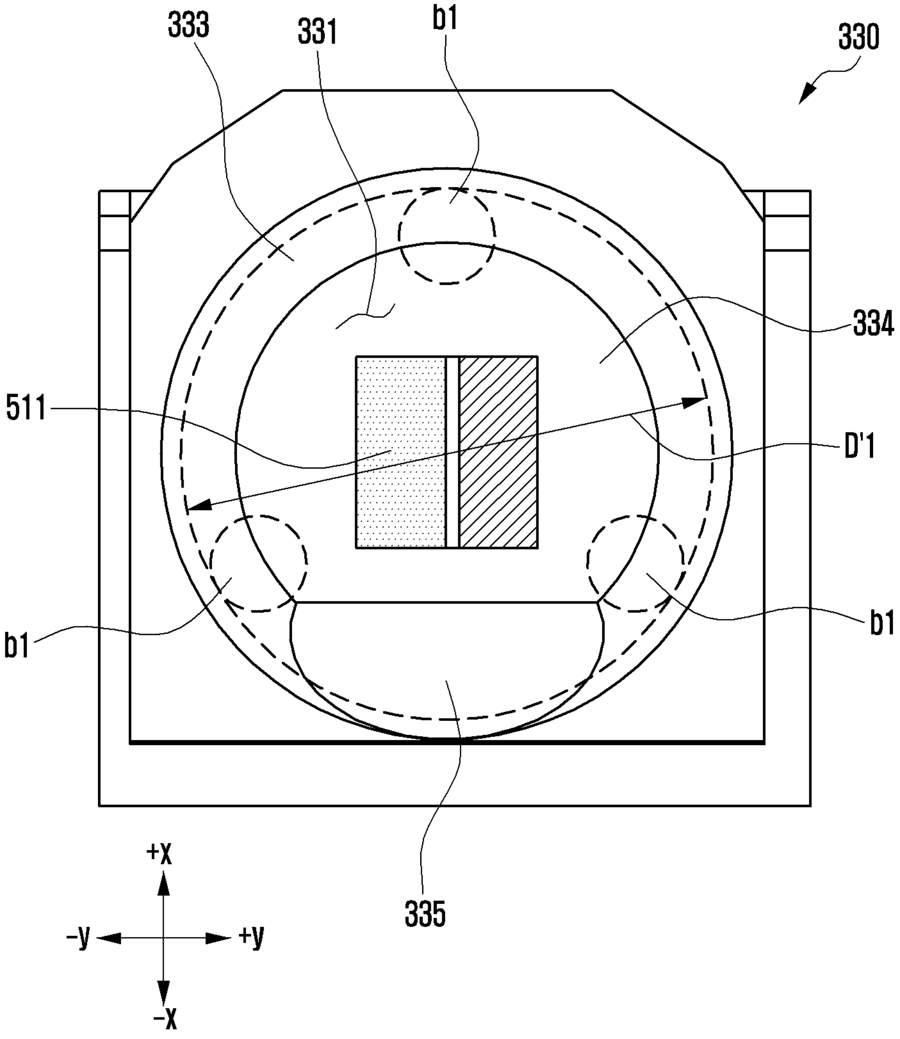
FIG. 8 is an enlarged view of an accommodating portion of the camera housing illustrated in FIG. 6C according to an embodiment of the disclosure.

FIGS. 5A and 5B are assembly views of a flexible printed circuit board, a camera housing, and a reflector actuator according to various embodiments of the disclosure. FIG. 6A is a rear perspective view of a reflector actuator according to an embodiment of the disclosure. FIG. 6B is a front perspective view of a reflector actuator according to an embodiment of the disclosure. FIG. 6C is a front perspective view of a camera housing according to an embodiment of the disclosure. FIGS. 7A to 7C are views of a first attraction magnetic body and a second attraction magnetic body according to various embodiment of the disclosure. FIG. 8 is an enlarged view of an accommodating portion of the camera housing illustrated in FIG. 6C according to an embodiment of the disclosure.

Referring to FIGS. 5A and 5B, the carrier 340 may include a seating portion 341 in which the reflection member R is disposed. In an embodiment, the seating portion 341 may include a groove having a shape corresponding to the reflection member R. In an embodiment, the seating portion 341 may include a first sloping surface 3411 facing the reflection surface S3 of the carrier 340. In an embodiment, the first sloping surface 3411 (e.g., the first sloping surface 3411 in FIG. 12A) may be substantially parallel to the reflection surface S3. In an embodiment, the reflection surface S3 of the reflection member R may be a surface which is tilted at a predetermined angle with respect to a support surface 325 of the camera housing 320. The first sloping surface 3411 may be substantially parallel to the reflection surface S3 and thus may form a predetermined angle with the support surface 325 of the camera housing 320.

Referring to FIGS. 5B, 6A, and 6C, the carrier 340 may include a guide portion 342. In an embodiment, the guide portion 342 may be formed in a direction facing (e.g., a direction opposite to) the reflection surface S3 of the reflection member R. For example, the guide portion 342 may extend from the seating portion 341 in a direction substantially perpendicular to the first sloping surface 3411 and may extend in a direction facing (e.g., a direction opposite to) the reflection member R. In an embodiment, the guide portion 342 may be formed to be inclined at a predetermined angle with respect to the support surface 325 of the camera housing 320 in a state where the carrier 340 is disposed in the camera housing 320.

In an embodiment, the guide portion 342 may have at least a part inserted into the accommodating portion 330 protruding from the support surface 325 of the camera housing 320. In an embodiment, the accommodating portion 330 of the camera housing 320 may include a guide groove 331 which enables a guide portion 342 to be inserted therein. The carrier 340 may be rotated around the first axis, the second axis, and/or the third axis relative to the camera housing 320 by the first OIS actuator 410, the second OIS actuator, and/or the third OIS actuator 430, based on that the guide portion 342 is fastened to the guide groove 331 of the accommodating portion 330.

Referring to FIGS. 5A, 5B, and 6C, the accommodating portion 330 of the camera housing 320 may include a second sloping surface 332 corresponding to the first sloping surface 3411 of the seating portion 341. In an embodiment, the reflection surface S3 of the reflection member R, the first sloping surface 3411, and the second sloping surface 332 may be substantially parallel to each other. In an embodiment, the guide groove 331 may be formed on the second sloping surface 332 of the accommodating portion 330. The carrier 340 may be positioned in the camera housing 320 such that the guide portion 342 is disposed in the guide groove 331 of the accommodating portion 330.

In an embodiment not illustrated in the drawings, the guide portion 342 of the carrier 340 may protrude to be substantially perpendicular to the support surface 325 of the camera housing 320. For example, the guide portion 342 may protrude from one surface of the carrier 340 to be perpendicular to the incident surface S1 of the reflection member R. Based on this, the accommodating portion 330 of the camera housing 320 may include a flat surface (not shown) substantially parallel to the support surface 325 of the camera housing 320. The guide groove 331 may be formed on the flat surface of the accommodating portion 330. The carrier 340 may rotate relative to the camera housing 320, based on that the guide portion 342 is fastened to the guide groove 331 of the accommodating portion 330. In an embodiment, the guide portion 342 of the carrier 340 may have at least a part formed in a spherical shape, and the guide groove 331 of the camera housing 320 may be formed in a shape corresponding to the guide portion 342. In an embodiment, the carrier 340 may rotate relative to the camera housing 320 by means of a guide structure (e.g., the OIS balls b1 and/or protrusions (not shown) formed on one of the guide portion 342 and the guide groove 331) disposed between the guide portion 342 and the guide groove 331.

In an embodiment, the carrier 340 may be rotated around the first axis, the second axis, and/or the third axis relative to the camera housing 320 by the first OIS actuator 410, the second OIS actuator, and/or the third OIS actuator 430, based on that the guide portion 342 is fastened to the guide groove 331 of the accommodating portion 330.

As described above, the guide portion 342 of the carrier 340 and the accommodating portion 330 of the camera housing 320 may be formed in various shapes to enable the carrier 340 to be rotatably fastened to the camera housing 320.

According to an embodiment, a guide structure may be disposed between the camera housing 320 and the carrier 340. In an embodiment, the guide structure may be positioned between the guide portion 342 of the carrier 340 and the guide groove 331 of the accommodating portion 330 of the camera housing 320. In an embodiment, the guide structure may guide rotation of the carrier 340 relative to the image sensor 370, in the camera housing 320. In an embodiment, the guide structure may be in contact with at least one of the guide portion 342 of the carrier 340 and one surface of the accommodating portion 330, which is positioned in the guide groove 331 of the accommodating portion 330, at least three points. In this case, the guide portion 342 of the carrier 340 may rotate relative to the accommodating portion 330 with reference to the at least three points, in the guide groove 331 of the camera housing 320. In addition, as at least one of the guide portion 342 and the accommodating portion 330 comes into contact with the guide structure at the at least three points, in the operation in which the carrier 340 rotates relative to the camera housing 320, it may be prevented that the guide portion 342 of the carrier 340 linearly move (or slides) in the guide groove 331 of the camera housing 320. Accordingly, the linear movement of the carrier 340 relative to the camera housing 320 may be prevented by the guide portion 342, and a rotational movement thereof relative to the camera housing 320 may be possible.

Referring to FIGS. 5B, 6A, and 8, the guide structure may be OIS balls b1 which are a bearing ball. In an embodiment, at least three OIS balls b1 may be arranged between the guide portion 342 of the carrier 340 and the guide groove 331 of the accommodating portion 330. As described below, the OIS balls b1 may be in contact with a curved portion 333 (e.g., the first curved portion 333) of the guide groove 331.

In an embodiment, the guide structure may be at least three protrusions formed to protrude from at least one of the accommodating portion 330 of the camera housing 320 or the guide portion 342 of the carrier 340. In an embodiment, the protrusions may be formed to protrude from a first curved portion 333 positioned inside the guide groove 331 of the accommodating portion 330, and be in contact with the guide portion 342 of the carrier 340 at least three points. In an embodiment, the protrusions may be formed to protrude from the guide portion 342 of the carrier 340, and be in contact with the first curved portion 333 of the accommodating portion 330 at least three points.

As described above, the guide structure may be variously configured, such as the OIS balls b1 or the protrusions integrally formed with the accommodating portion 330 or the guide portion 342. Under the condition that the guide structure is the OIS balls b1 which are a bearing ball as illustrated in FIGS. 5B, 6A, 8, 9, 10A, and 10B, the following description will be described. However, the following description may be equally applied to even the case that the guide structure is protrusions.

Referring to FIGS. 5A, 5B, and 6C, the accommodating portion 330 of the camera housing 320 may include a planar portion 334 positioned in the guide groove 331 and the first curved portion 333. In an embodiment, the planar portion 334 may be substantially parallel to the first sloping surface 3411 of the carrier 340 and the reflection surface S3 of the reflection member R. In an embodiment, the first curved portion 333 may surround the planar portion 334, in the guide groove 331. In an embodiment, the first curved portion 333 may be formed in the guide groove 331 and formed to have a predetermined curvature.

Figure 10A:
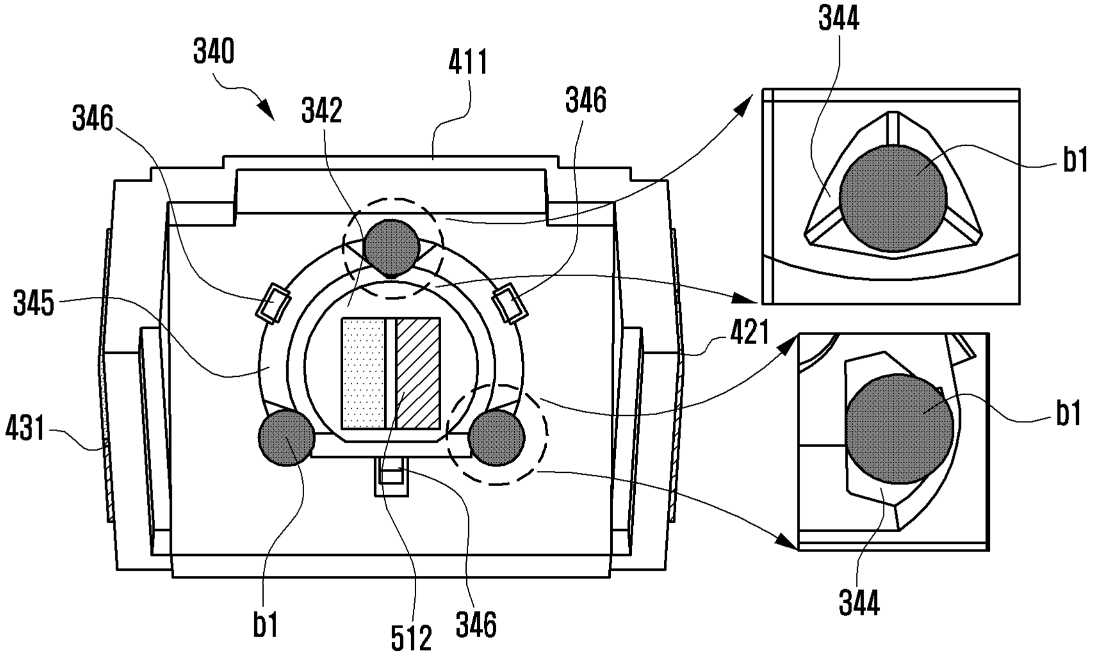
FIG. 10A is a view showing elements and OIS balls positioned on the rear surface of a reflector actuator according to an embodiment of the disclosure.

In an embodiment, the first curved portion 333 may be a portion at which the accommodating portion 330 is in contact with the guide structure. For example, referring to FIG. 8, the OIS balls b1, which are a guide structure, may be arranged between the guide portion 342 of the carrier 340 and the first curved portion 333 of the accommodating portion 330. Referring to FIG. 10A described below, the OIS balls b1 may be seated in accommodating grooves 344 formed in a guide portion 342 of the carrier 340. In an embodiment, the accommodating grooves 344 may be formed in a second curved portion 345 formed to have a predetermined curvature, in the guide portion 342. In an embodiment, the second curved portion 345 may face the first curved portion 333 in a state where the guide portion 342 of the carrier 340 is fastened to the guide groove 331 of the camera housing 320.

Based on that the carrier 340 rotates around the first axis, the second axis, and/or the third axis relative to the camera housing 320, the OIS balls b1 may move along the first curved portion 333 of the accommodating portion 330 in a state of being positioned in the accommodating grooves 344 of the guide portion 342, to guide rotation of the carrier 340 relative to the camera housing 320.

Referring to FIGS. 5B and 6A, a first ball cover 360A (e.g., the first ball cover 360A in FIGS. 11A to 11D) may be coupled to the guide portion 342 of the carrier 340. In an embodiment, the first ball cover 360A may prevent the OIS balls b1 arranged in the accommodating grooves 344 of the guide portion 342 from being separated from the accommodating grooves 344. In an embodiment, the first ball cover 360A may include openings 361A for accommodating parts of the OIS balls b1.

Referring to FIGS. 6C, 8, and 12A described below, the first curved portion 333 of the accommodating portion 330 may include a flat area (e.g., the first flat area 335). In an embodiment, the flat area 335 may be formed at the lowermost end of the first curved portion 333, which is adjacent to the support surface 325 of the camera housing 320. In an embodiment, the OIS balls b1 may be positioned in the first curved portion 333 except for the flat area 335. In an embodiment, the guide portion 342 of the carrier 340 may include a flat area (e.g., a second flat area), a part of which corresponds to the flat area 335 of the accommodating portion 330.

Referring to FIGS. 6C, 8, and 12A described below, the first flat area 335 may be substantially parallel to the support surface 325 of the camera housing 320. In an embodiment, compared to the case that the first flat area 335 is not formed, when the first flat area 335 is formed at the lowermost end of the first curved portion 333 of the accommodating portion 330 and when the guide portion 342 of the carrier 340 is fastened to the accommodating portion 330, the height (e.g., the length in the Z-axis direction with reference to FIG. 12A) of the carrier 340 from the support surface 325 of the camera housing 320 may be reduced. For example, compared to the case that the first flat area 335 is not formed, as the first flat area 335 is formed in the guide groove 331, the guide portion 342 may be lowered in the −Z-axis direction with reference to FIG. 12A, in the guide groove 331, and thus be seated in the guide groove 331. Accordingly, compared to the case that the first flat area 335 is not formed in the guide groove 331, the height H (e.g., the length in the Z-axis direction with reference to FIG. 12A) of the carrier 340 occupying the inside of the camera housing 320 may be reduced.

Referring to FIGS. 5B, 6A, 6B, 7A, 7B, and 7C, a first attraction magnetic body 511 may be disposed in the accommodating portion 330 of the camera housing 320. In an embodiment, the first attraction magnetic body 511 may be positioned in the accommodating portion 330 and be disposed in the planar portion 334 substantially parallel to the first sloping surface 3411. A second attraction magnetic body 512 may be disposed on one surface of the guide portion 342, which is inserted into the accommodating portion 330. In an embodiment, an attractive force may be applied between the first attraction magnetic body 511 and the second attraction magnetic body 512. The guide portion 342 of the carrier 340 and the accommodating portion 330 of the camera housing 320 may be pulled toward each other by the attractive force acting between the first attraction magnetic body 511 and the second attraction magnetic body 512. Based on this, the guide portion 342 of the carrier 340 and the accommodating portion 330 of the camera housing 320 may maintain a state of being in point contact with the guide structure (e.g., the OIS balls b1 or the protrusions).

According to an embodiment, the first attraction magnetic body 511 and the second attraction magnetic body 512 may be configured in various shapes. In an embodiment, referring to FIG. 6C, the first attraction magnetic body 511 may include two magnets having a straight line shape. In this case, as illustrated in FIGS. 6A, 6B, and 7A, the second attraction magnetic body 512 may include two magnets having a straight line shape to correspond to the first attraction magnetic body 511. In an embodiment, referring to FIG. 7A, the magnets constituting the first attraction magnetic body 511 and the second attraction magnetic body 512 may have a width and a height of about 2 mm and a thickness of about 0.3 mm. In an embodiment, referring to FIG. 7B, the first attraction magnetic body 511 and the second attraction magnetic body 512 may be formed as magnetic bodies, at least parts of which have semicircular shapes. In an embodiment, referring to FIG. 7C, the first attraction magnetic body 511 and the second attraction magnetic body 512 may be magnets or metal plates (e.g., yokes) having magnetism. For example, the first attraction magnetic body 511 disposed in the camera housing 320 may be a metal plate which exerts an attractive force with the second attraction magnetic body 512. In an embodiment, the first attraction magnetic body 511 may be formed as a cross-shaped magnetic body. In this case, the second attraction magnetic body 512 may be formed as a cross-shaped magnetic body to correspond to the first attraction magnetic body 511. In addition, the first attraction magnetic body 511 and the second attraction magnetic body 512 may be formed in various shapes.

In an embodiment, when the carrier 340 is moved in an unintended direction other than rotation around the first axis (e.g., the axis Y in FIG. 5A), the second axis (e.g., the axis X in FIG. 5A), and/or the third axis (e.g., the axis Z in FIG. 5A) relative to the camera housing 320 by the first OIS actuator 410, the second OIS actuator, and/or the third OIS actuator 430, the carrier 340 may be returned to a default position through the attractive force between the first attraction magnetic body 511 and the second attraction magnetic body 512. The "default position" of the carrier 340 may be an original state where the carrier is assembled to the camera housing 320, and may be a state where the carrier does not rotate around the first axis, the second axis, and/or the third axis. For example, the default position may be a position of the carrier 340 in a state where the carrier is not tilted with respect to the camera housing 320, and be a position of the carrier with respect to the camera housing 320 in a state where an OIS actuator (e.g., the first OIS actuator 410, the second OIS actuator 420, and/or the third OIS actuator 430) is not actuated. In an embodiment, referring to FIG. 4C described above, when the carrier 340 is in the default position, the reflection member R may be configured such that the incident surface S1 is substantially perpendicular to the third axis and the exit surface S2 is substantially perpendicular to the second axis.

In an embodiment, when power is turned off to the camera module 300, based on the attractive force acting between the first attraction magnetic body 511 and the second attraction magnetic body 512, the carrier 340 may be returned to the default position and/or may be maintained at the default position, with respect to the camera housing 320. For example, when power is turned off to the camera module 300 in a state where the carrier 340 rotates around the first axis, the second axis, and/or the third axis relative to the camera housing 320, the carrier 340 may be returned to the default position with respect to the camera housing 320 through the attractive force acting between the first attraction magnetic body 511 and the second attraction magnetic body 512.

Figure 10B:
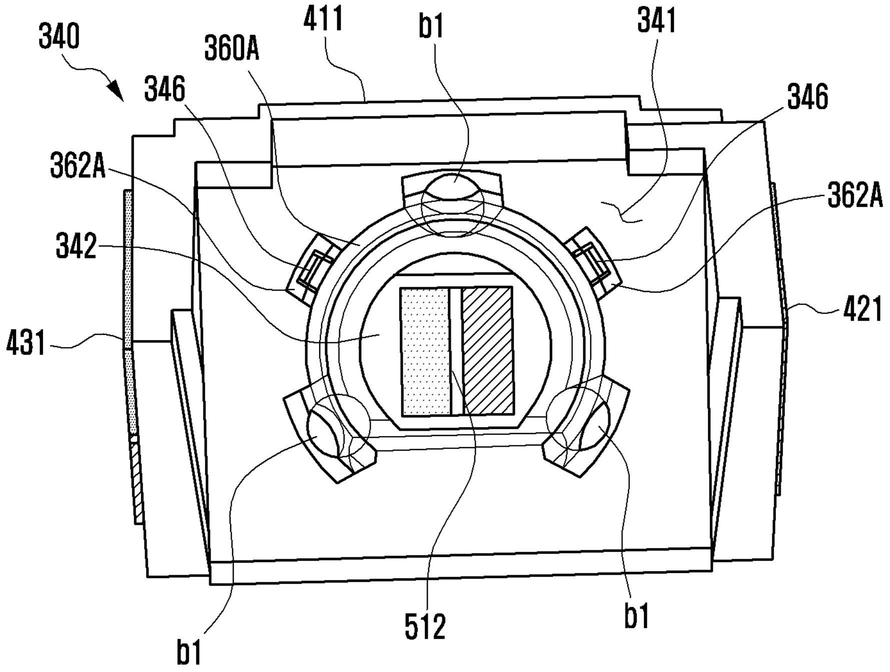
FIG. 10B is a view showing a state where a first ball cover is coupled to a guide portion of a carrier according to an embodiment of the disclosure.
Figure 11A:
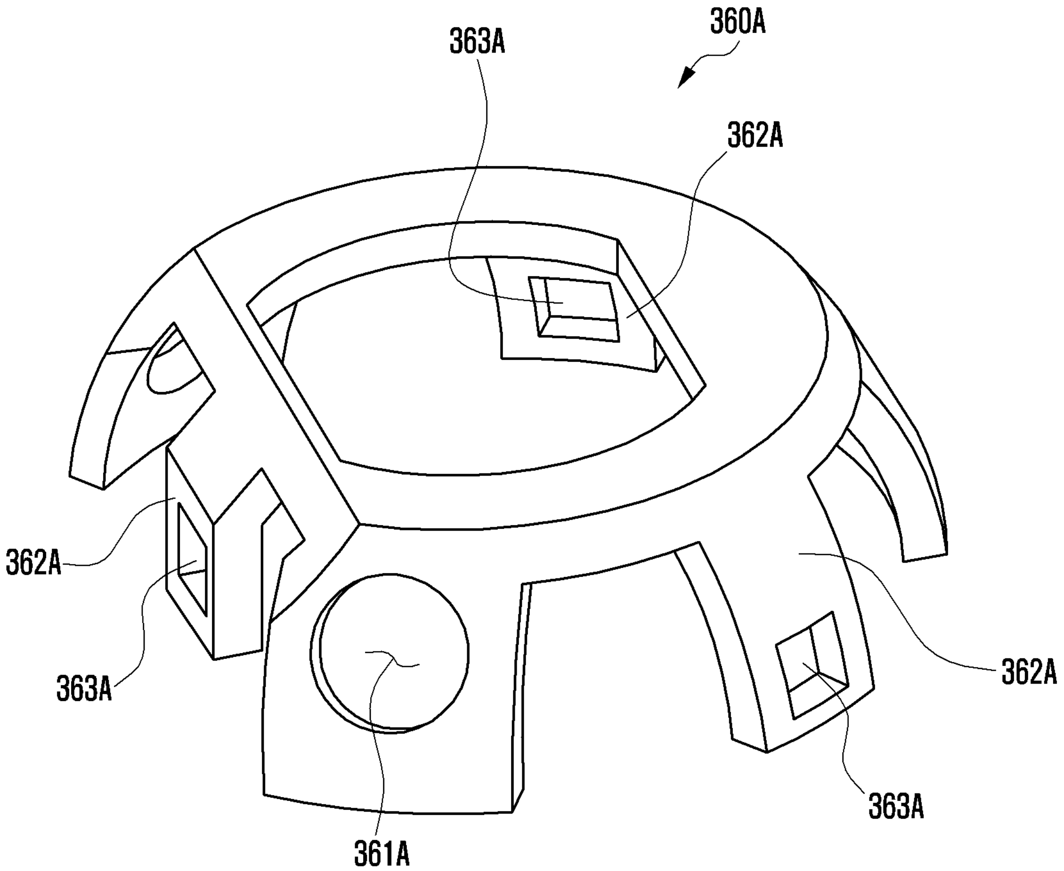
FIG. 11A is a perspective view of a first ball cover according to an embodiment of the disclosure.
Figure 11B:
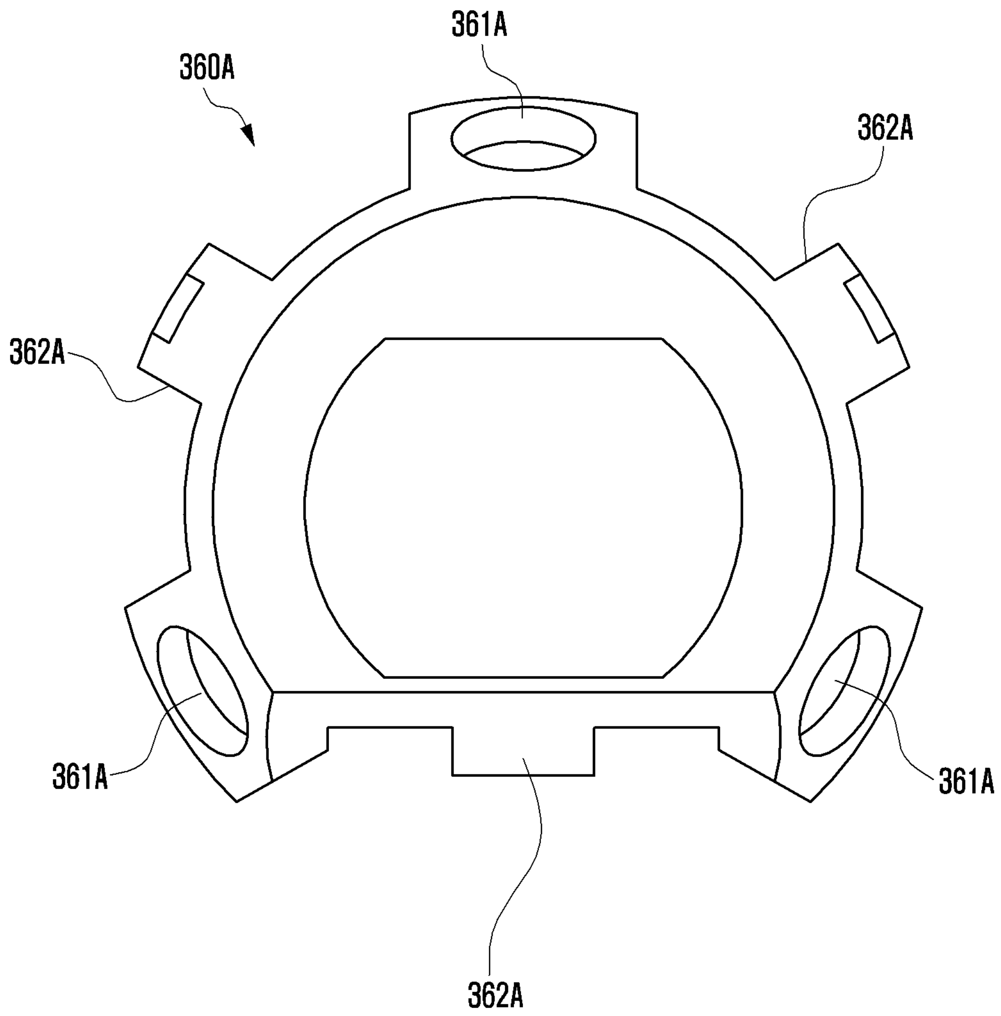
FIG. 11B is a front view of a first ball cover according to an embodiment of the disclosure.
Figure 11C:
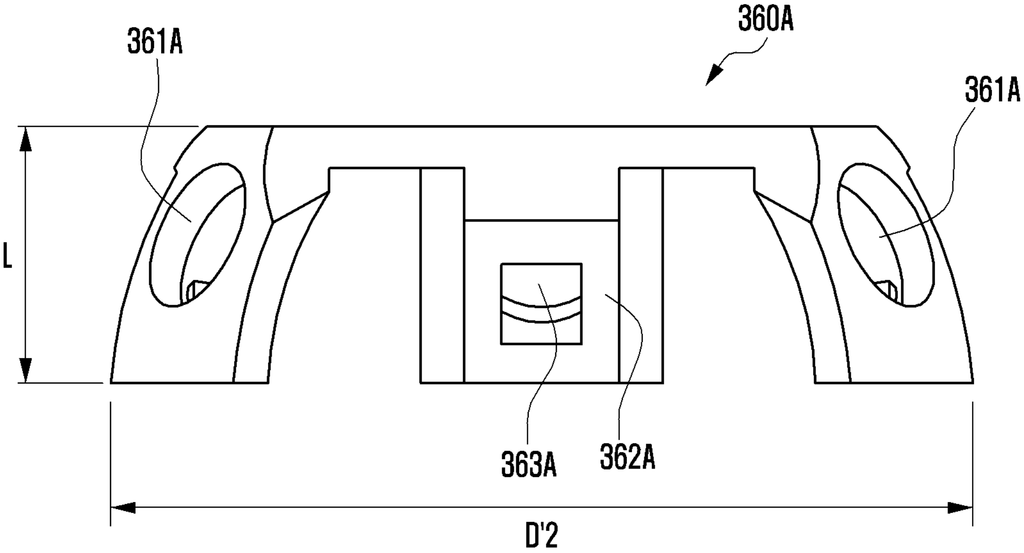
FIGS. 11C and 11D are side views of a first ball cover according to various embodiments of the disclosure.
Figure 11D:
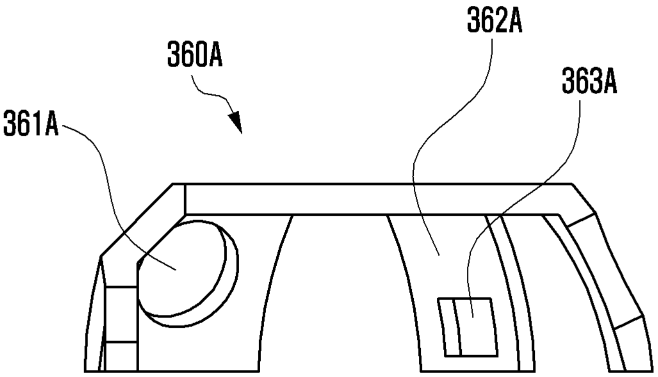
Figure 12B:
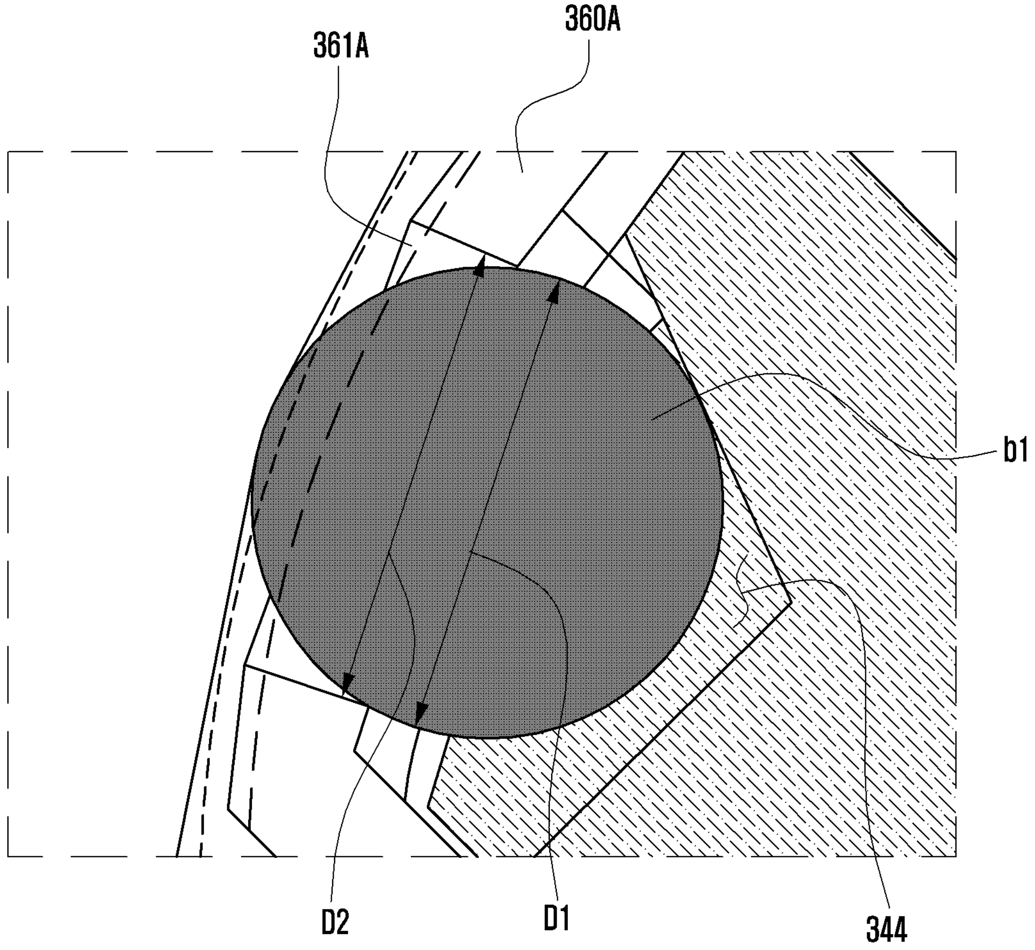
FIG. 12B is an enlarged view showing the arrangement relationship of a first ball cover, OIS balls, and a guide portion illustrated in FIG. 12A according to an embodiment of the disclosure.
Figure 13:
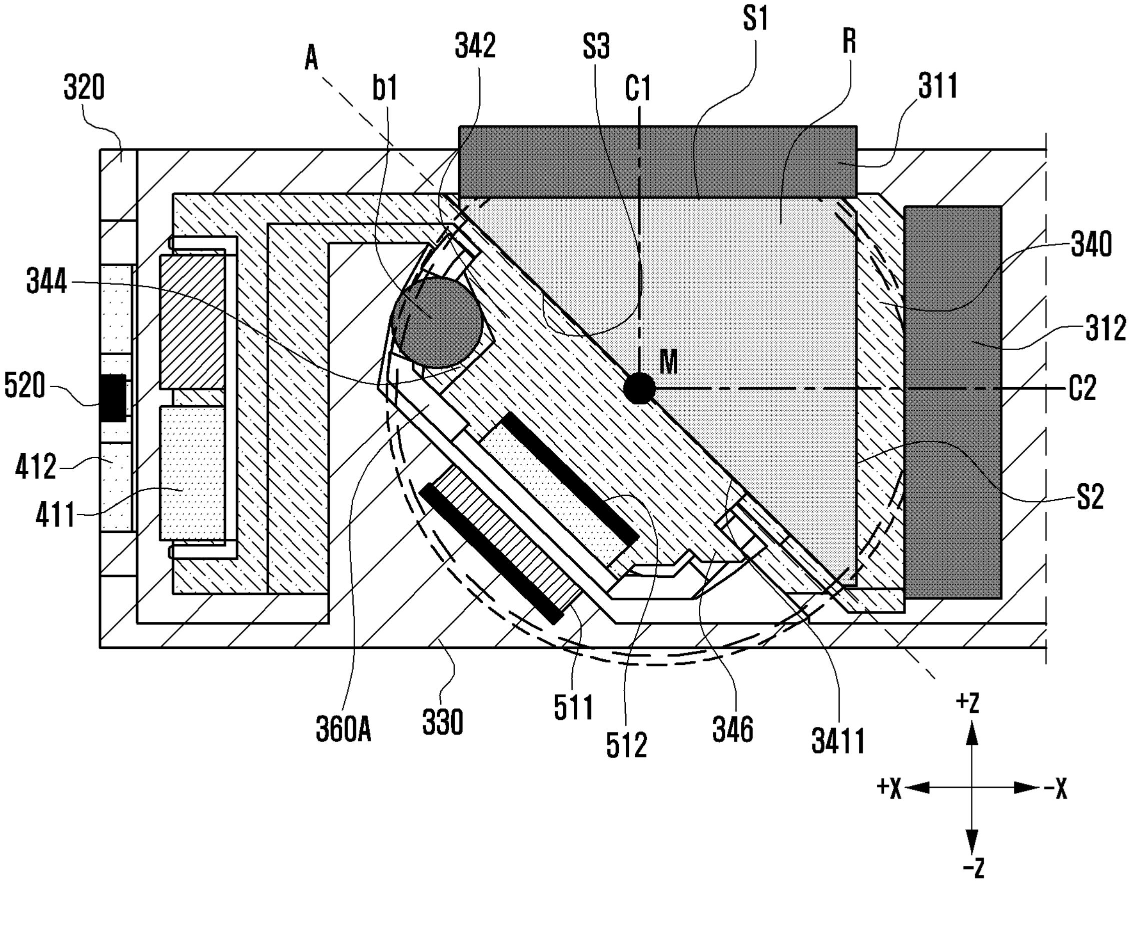
FIG. 13 is a view showing a state where lens modules are arranged on the incident surface and the exit surface of a reflective member according to an embodiment of the disclosure.

FIG. 9 is an assembly view of a reflector actuator according to an embodiment of the disclosure. FIG. 10A is a view showing elements and OIS balls positioned on the rear surface of a reflector actuator according to an embodiment of the disclosure. FIG. 10B is a view showing a state where a first ball cover is coupled to a guide portion of a carrier according to an embodiment of the disclosure. FIG. 11A is a perspective view of a first ball cover according to an embodiment of the disclosure. FIG. 11B is a front view of a first ball cover according to an embodiment of the disclosure. FIGS. 11C and 11D are side views of a first ball cover according to various embodiments of the disclosure. FIG. 12A is a view showing a state where a guide portion of a carrier is fastened to an accommodating portion of a camera housing according to an embodiment of the disclosure. FIG. 12B is an enlarged view showing the arrangement relationship of a first ball cover, OIS balls, and a guide portion illustrated in FIG. 12A according to an embodiment of the disclosure. FIG. 13 is a view showing a state where lens modules are arranged on the incident surface and the exit surface of a reflective member according to an embodiment of the disclosure.

Referring to FIG. 9, the reflector actuator may include a reflection member R, a carrier 340, a first OIS magnetic body 411, a second OIS magnetic body 421, a third OIS magnetic body 431, OIS balls b1, a first ball cover 360A, and a second attraction magnetic body 512. At least one of the elements described above may be omitted or at least one other element may be added therein.

Referring to FIGS. 10A and 10B, the guide portion 342 of the carrier 340 may include a curved portion (e.g., the second curved portion 345) corresponding to the first curved portion 333 of the accommodating portion 330 of the camera housing 320. In an embodiment, the second curved portion 345 of the guide portion 342 may be formed to have a substantially the same curvature as the first curved portion 333 of the accommodating portion 330.

Referring to FIGS. 10A and 10B, the OIS balls b1 may be seated in accommodating grooves 344 formed in the guide portion 342 of the carrier 340. In an embodiment, at least a part of the accommodating grooves 344 may be formed in a second curved portion 345 formed in the guide portion 342 to have a predetermined curvature. In an embodiment, the second curved portion 345 may face the first curved portion 333 in a state where the guide portion 342 of the carrier 340 is fastened to the guide groove 331 of the camera housing 320. In an embodiment, the OIS balls b1 may be in contact with one surface of the guide portion 342, which is positioned in the accommodating grooves 344. In an embodiment, the OIS balls b1 may perform rolling motion in a state of being in contact with the first curved portion 333, in the accommodating grooves 344, based on that the guide portion 342 of the carrier 340 rotates relative to the accommodating portion 330 of the camera housing 320.

Referring to FIGS. 10A and 10B, the accommodating grooves 344 may be formed at equal intervals. For example, in case that three OIS balls b1 are arranged between the guide portion 342 and the accommodating portion 330, three accommodating grooves 344 may be formed at equal intervals. For example, the neighboring accommodating grooves 344 may be formed at 120 degrees of an equal angle along a virtual circle. Accordingly, the multiple OIS balls b1 may be positioned in the guide portion 342 at equal intervals. For example, the neighboring OIS balls b1 may be positioned at 120 degrees of an equal angle. Therefore, based on that the multiple OIS balls b1 are arranged at equal intervals, the accommodating portion 330 of the camera housing 320 may be in stable contact with the OIS balls b1 at three points.

However, the number of the OIS balls b1 described above is only an example, and the number of OIS balls b1 may exceed three. In this case, the gap between the accommodating grooves 344 and the gap between the OIS balls b1 may be reduced. For example, the accommodating grooves 344 neighboring to each other may be arranged on the guide portion 342 at an equal angle less than 120 degrees along a virtual circle. Accordingly, the OIS balls b1 neighboring to each other may be arranged at an equal angle less than 120 degrees along a virtual circle.

Referring to FIGS. 9, 10B, 11A, 11B, and 11C, the OIS balls b1 may be maintained in a state of being arranged in the accommodating grooves 344 of the guide portion 342 by the first ball cover 360A coupled to the guide portion 342. In an embodiment, the first ball cover 360A may prevent the OIS balls b1 from being separated from the accommodating groove 344 of the guide portion 342. In an embodiment, the first ball cover 360A may include openings 361A for accommodating parts of the OIS balls b1. In an embodiment, the OIS balls b1 may be in contact with the first curved portion 333 of the accommodating portion 330 in a state where parts thereof are accommodated in the openings 361A of the first ball cover 360A, to guide rotation of the carrier 340 relative to the camera housing 320.

In an embodiment, the openings 361A formed in the first ball cover 360A may be based on the number of the OIS balls b1. In an embodiment, referring to FIG. 12B, the openings 361A formed in the first ball cover 360A may be formed to have sizes smaller than the OIS balls b1. For example, the diameter D2 of each of the openings 361A formed in the first ball cover 360A may be smaller than the diameter D1 of each of the OIS balls b1. Therefore, the OIS balls b1 may not be separated from the accommodating groove 344 through the openings 361A formed in the first ball cover 360A.

In an embodiment, the first ball cover 360A may be formed to have a size which enables the first ball cover to be disposed in the guide groove 331 of the camera housing 320. For example, the diameter D'1 of the curved portion 333 illustrated in FIG. 8 may be formed to a size which enables the first ball cover 360A to be accommodated therein. The diameter D'1 of the curved portion 333 may be the diameter of a virtual circle corresponding to the curved portion 333 when the planar portion 334 is viewed vertically.

Referring to FIGS. 12A and 13, a virtual circle having the distance from the rotation center M of the reflection member R to the outer surface of the first ball cover 360A as the radius thereof may be formed to have a diameter D'2 about 5 mm-7 mm. For example, the diameter D'2 of a virtual circle having the distance from the rotation center M of the reflection member R to the outer surface of the first ball cover 360A as the radius thereof may be 5.8 mm.

Referring to FIG. 11C, the height L of the first ball cover 360A may be formed at a ratio of about 22%-30% of the diameter D'2 of a virtual circle having the distance from the rotation center M to the outer surface of the first ball cover 360A as the radius thereof. In an embodiment, the height L of the first ball cover 360A may be about 1.65 mm.

The above-described numerical values and shapes of the first ball cover 360A are only examples, and the first ball cover 360A may be formed in various shapes which enable the OIS balls b1 to be positioned between the guide portion 342 and the first ball cover 360A.

Referring to FIGS. 10A and 10B, the first ball cover 360A may be coupled to the guide portion 342 of the carrier 340. In an embodiment, the first ball cover 360A and the guide portion 342 may include a fastening structure. In an embodiment, the guide portion 342 may include a fastening portion 346 protruding from one surface thereof. The first ball cover 360A may include a fastening groove 363A into which a fastening portion 346 is inserted. In an embodiment, the fastening groove 363A may be formed on a coupling portion 362A which is in contact with the guide portion 342. The first ball cover 360A may be fixed to the guide portion 342 as the fastening portion 346 of the guide portion 342 is coupled to the fastening groove 363A. In an embodiment, the coupling portion 362A may press the guide portion 342 to increase the coupling force of the ball cover 360A with respect to the guide portion 342. The above-described method for coupling the first ball cover 360A and the guide portion 342 is only an example, and the first ball cover 360A and the guide portion 342 may be coupled in various methods. For example, the first ball cover 360A may be fastened to the guide portion 342 in a hook fastening method or a screw fastening method.

In an embodiment, as a lubricant (e.g., grease) is applied to the insides of the accommodating grooves 344, friction between the OIS balls b1 and the inner surfaces of the accommodating grooves 344 may be reduced. In an embodiment, the OIS balls b1 may not be separated from the accommodating grooves 344 by the viscosity of the lubricant. Therefore, even if the first ball cover 360A is not coupled to the guide portion 342, the OIS balls b1 may not be separated from the accommodating grooves 344. Based on this, the guide portion 342 of the carrier 340 may be fastened to the accommodating portion 330 of the camera housing 320, in a state where the first ball cover 360A is omitted and the OIS balls b1 are arranged in the accommodating grooves 344 of the guide portion 342.

Referring to FIG. 12A, when the guide portion 342 of the carrier 340 is fastened to the accommodating portion 330 of the camera housing 320, the reflection surface S3 of the reflection member R and the second sloping surface 332 of the accommodating portion 330 may be substantially parallel to each other. When the guide portion 342 of the carrier 340 is fastened to the accommodating portion 330 of the camera housing 320, the rotation center M of the reflection member R may coincide with the reflection center of the reflection surface S3. In an embodiment, the reflection center may be the intersection point of the incident optical axis C1 passing through the center of the incident surface S1 of the reflection member R and the exit optical axis C2 passing through the center of the exit surface S2 of the reflection member R. In an embodiment, the rotation center M of the reflection member R may be the rotation center M of the carrier 340 relative to the camera housing 320. In an embodiment, the rotation center M of the reflection member R may be the intersection point of the first axis, the second axis, and/or the third axis. Therefore, according to an embodiment of the disclosure, as the rotation center M of the reflection member R and the reflection center of the reflection surface S3 coincide with each other, an error in the correction of shaking of an image, based on the control of the first OIS actuator 410, the second OIS actuator 420, and/or the third OIS actuator 430, can be reduced.

Referring to FIGS. 12A and 13, a virtual circle having the distance from the rotation center M of the reflection member R to the first curved portion 333 of the accommodating portion 330, with which the OIS ball b1 comes into contact, as the radius thereof, may be formed to have a diameter D'3 about 5 mm-7 mm. If differently defined, the diameter of a virtual circle having the distance from the rotation center M of the reflection member R to a point of the OIS ball b1, which is in contact with the first curved portion 333 of the accommodating portion 330, as the radius thereof, may be the diameter D'3 of the virtual circle. In an embodiment, the diameter D'3 of the virtual circle may be about 6 mm. The diameter D1 of each of the OIS balls b1 may be formed to be 10% to 20% of the diameter D'3 of a virtual circle having the distance from the rotation center M of the reflection member R to the first curved portion 333 of the accommodating portion 330, with which the OIS ball b1 comes into contact, as the radius thereof. In an embodiment, each of the OIS balls b1 may be formed to have the diameter D1 having a size of about 0.7 mm to 1.1 mm. For example, the diameter D1 of each of the OIS balls b1 may be about 1 mm. In an embodiment, the distance R' from the rotation center M of the reflection member R to the center of the OIS ball b1 may be about 2.15 mm to 2.95 mm. In an embodiment, the distance R' from the rotation center M of the reflection member R to the center of the OIS ball b1 may be preferably about 2.5 mm. The above-described numerical values are merely examples, and it is not be limited thereto.

Referring to FIG. 13, at least one lens module, which faces at least one of the incident surface S1 of the reflection member R and the exit surface S2 of the reflection member R, may be included therein. In an embodiment, referring to FIG. 4B described above, the first lens module 311 may be disposed to face the incident surface S1 of the reflection member R. In an embodiment, the first lens module 311 may be coupled to the lens housing 313 disposed on the carrier 340 so as to face the incident surface S1 of the reflective member R. In an embodiment, the lens housing 313 may be covered by the camera cover 301. In an embodiment, the first lens module 311 may be coupled to the lens housing 313, and at least a part thereof may be positioned in the opening 3011 of the camera cover 301.

In an embodiment, the second lens module 312 may be disposed to face the exit surface S2 of the reflective member R. In an embodiment, the first lens module 311 and the second lens module 312 may have at least parts coupled to the carrier 340 and thus may rotate relative to the camera housing 320 together with the carrier 340, based on the driving of the first OIS actuator 410, the second OIS actuator 420, and/or the third OIS actuator 430. In an embodiment, the camera module 300 may be configured such that at least one of the first lens module 311 and the second lens module 312 is omitted. In an embodiment, in case that the first lens module 311 is omitted, the lens housing 313 illustrated in FIG. 4B may also be omitted.

Figure 19A:
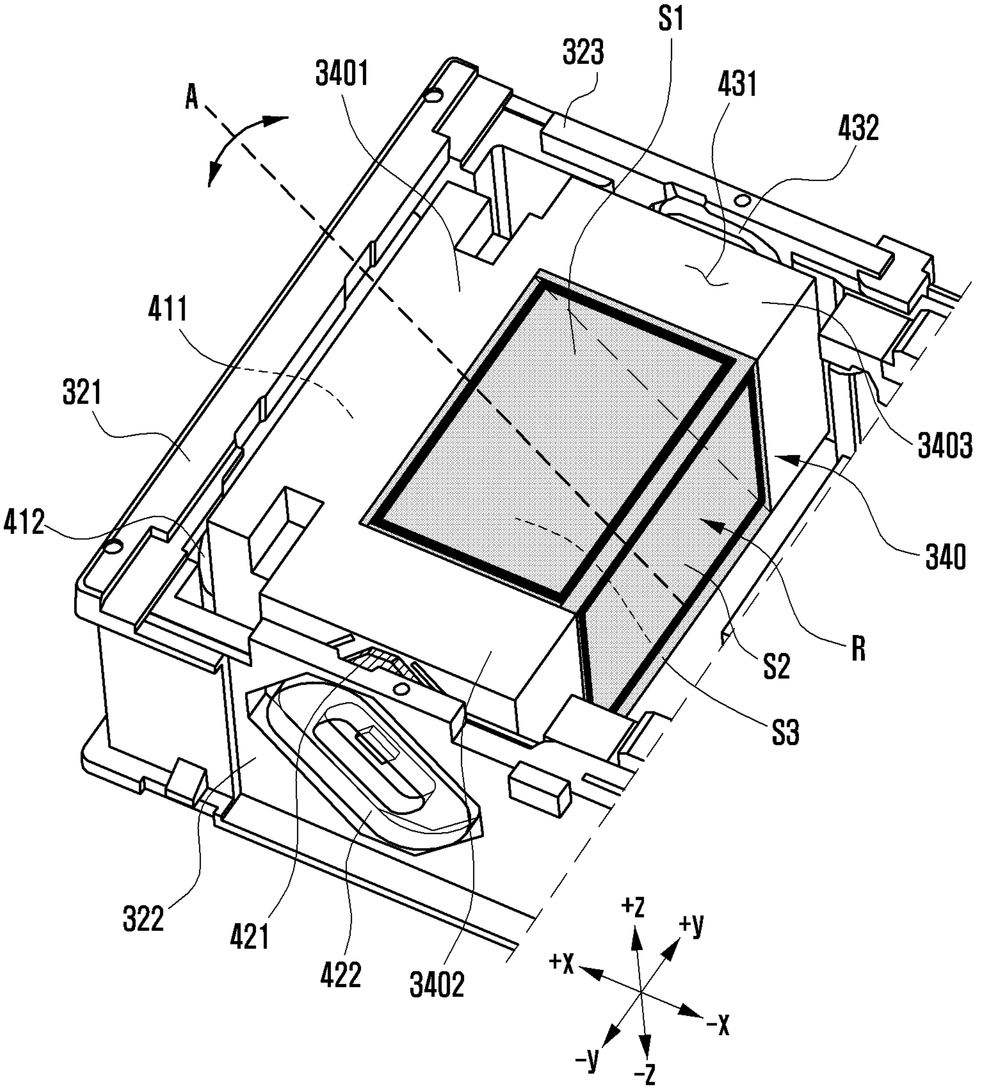
FIGS. 19A and 19B are views showing a second OIS actuator configured to rotate a carrier around an axis inclined with respect to a support surface of a camera housing according to various embodiments of the disclosure.

Referring to FIGS. 12A, 13, and 19A described below, when correcting shaking of an image, the carrier 340 may be rotated relative to the image sensor 370 around a fourth axis (e.g., the axis A in FIG. 12A, the axis A in FIG. 13, the axis A in FIG. 19A) to correct shaking of the image. In an embodiment, referring to FIGS. 12A and 13, the fourth axis (e.g., the A axis in FIGS. 12A and 13) may be an axis substantially parallel to the short side of the reflection surface S3 of the reflection member R. In an embodiment, each of the second OIS actuator 420 and the third OIS actuator 430 may be controlled to rotate the carrier 340 relative to the image sensor 370 around the fourth axis, to correct shaking of the image.

Figure 14A:
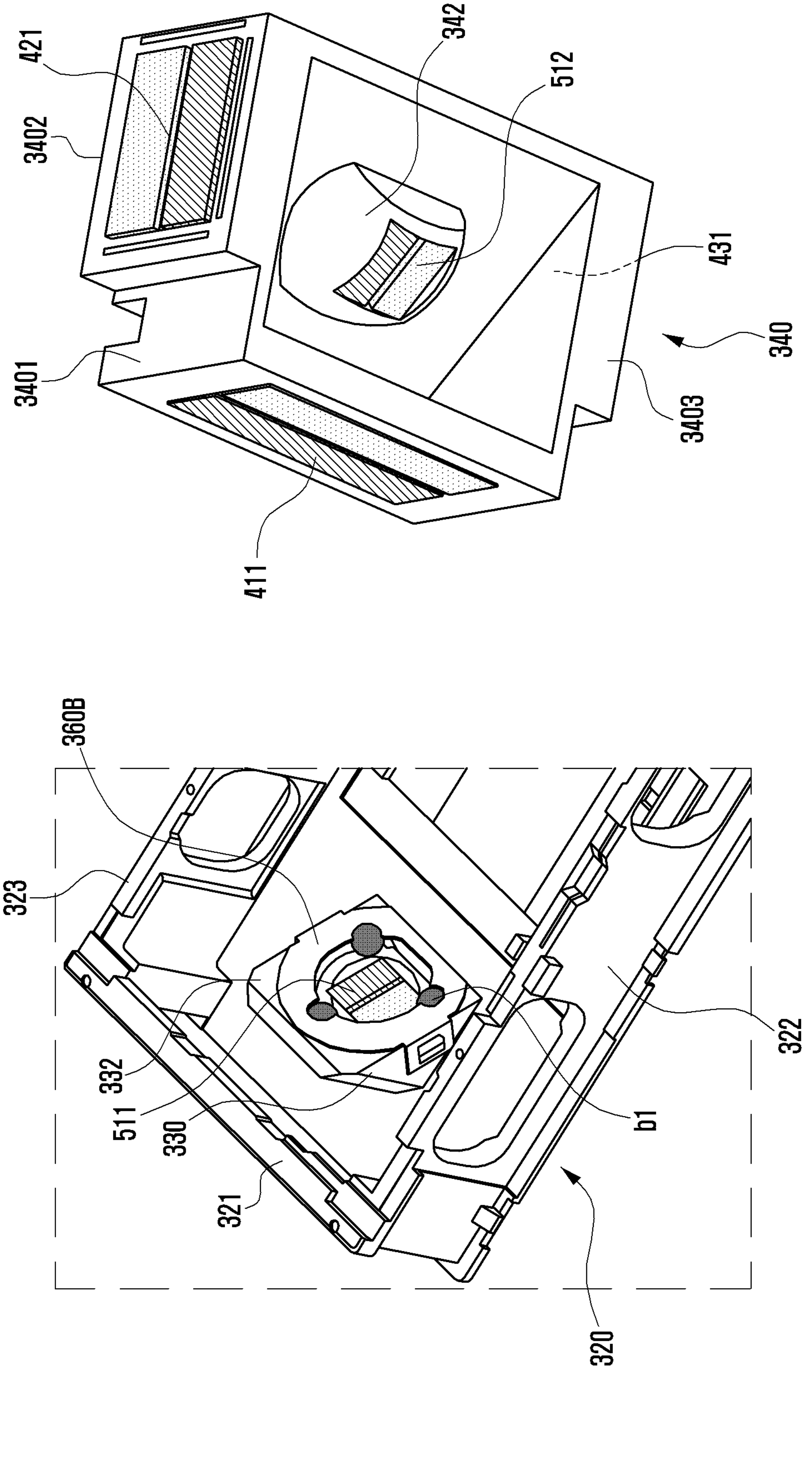
FIGS. 14A and 14B are views showing a state where accommodating grooves are formed in an accommodating portion of the camera housing, OIS balls being disposed in the accommodating grooves, and a state where a second ball cover is coupled to the accommodating portion, according to various embodiments of the disclosure.
Figure 14B:
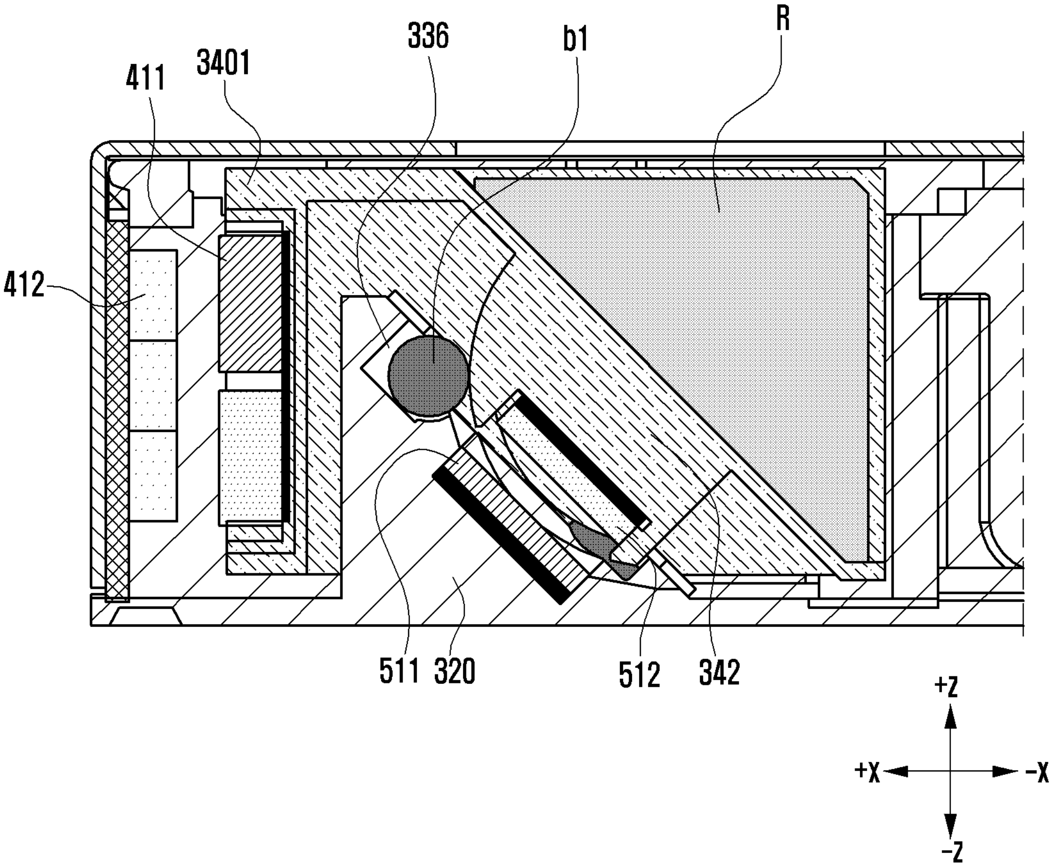
Figure 15A:
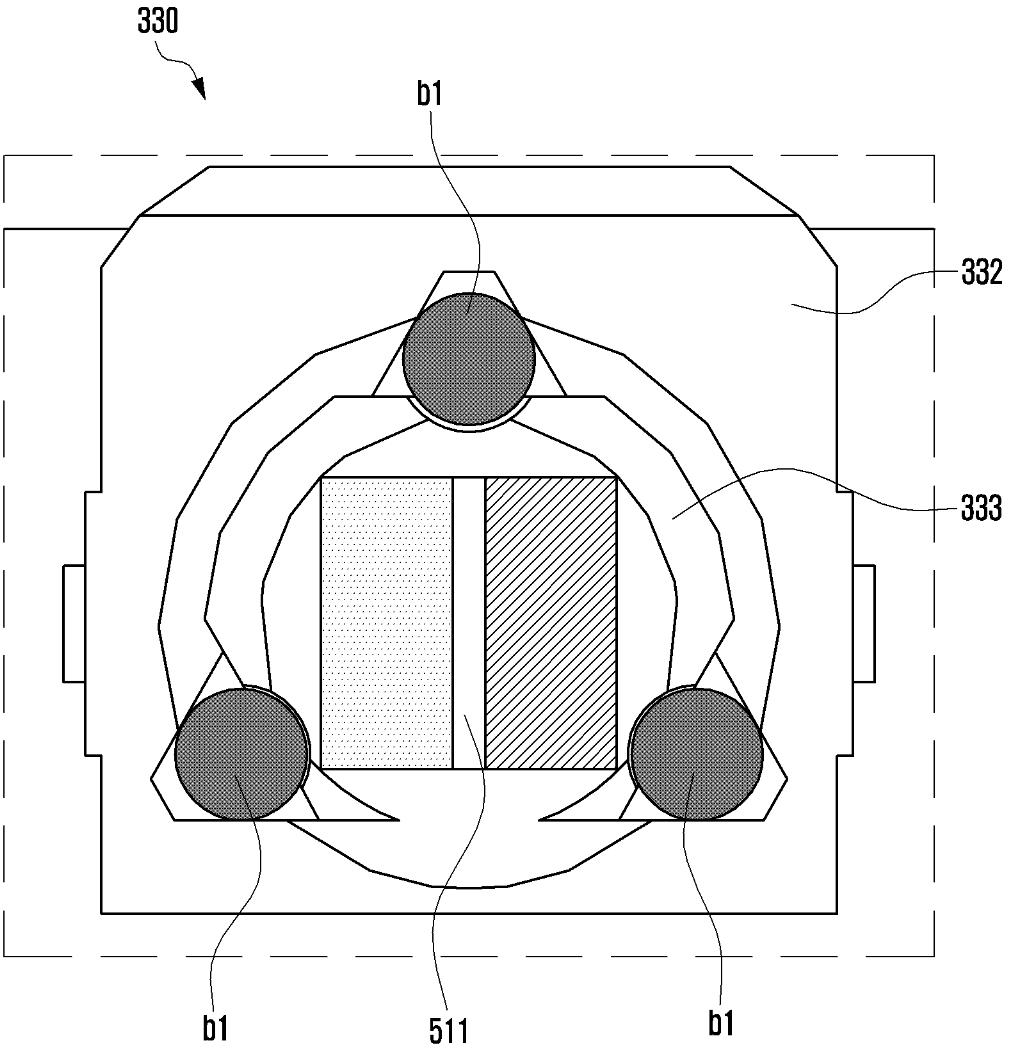
FIG. 15A is an enlarged view of accommodating grooves formed in an accommodating portion of a camera housing according to an embodiment of the disclosure.
Figure 15B:
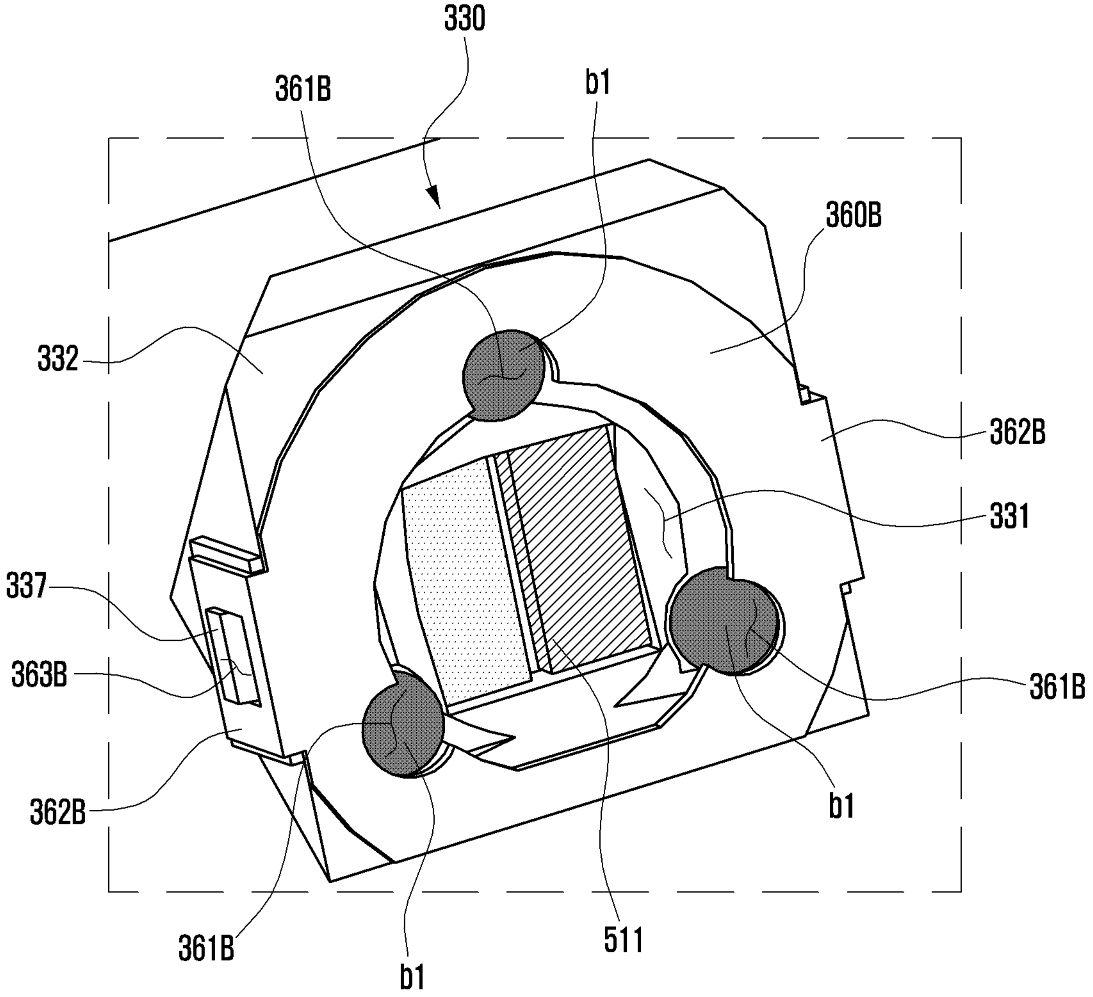
FIG. 15B is a view showing a state where a second ball cover is coupled to an accommodating portion of a camera housing according to an embodiment of the disclosure.
Figure 15C:
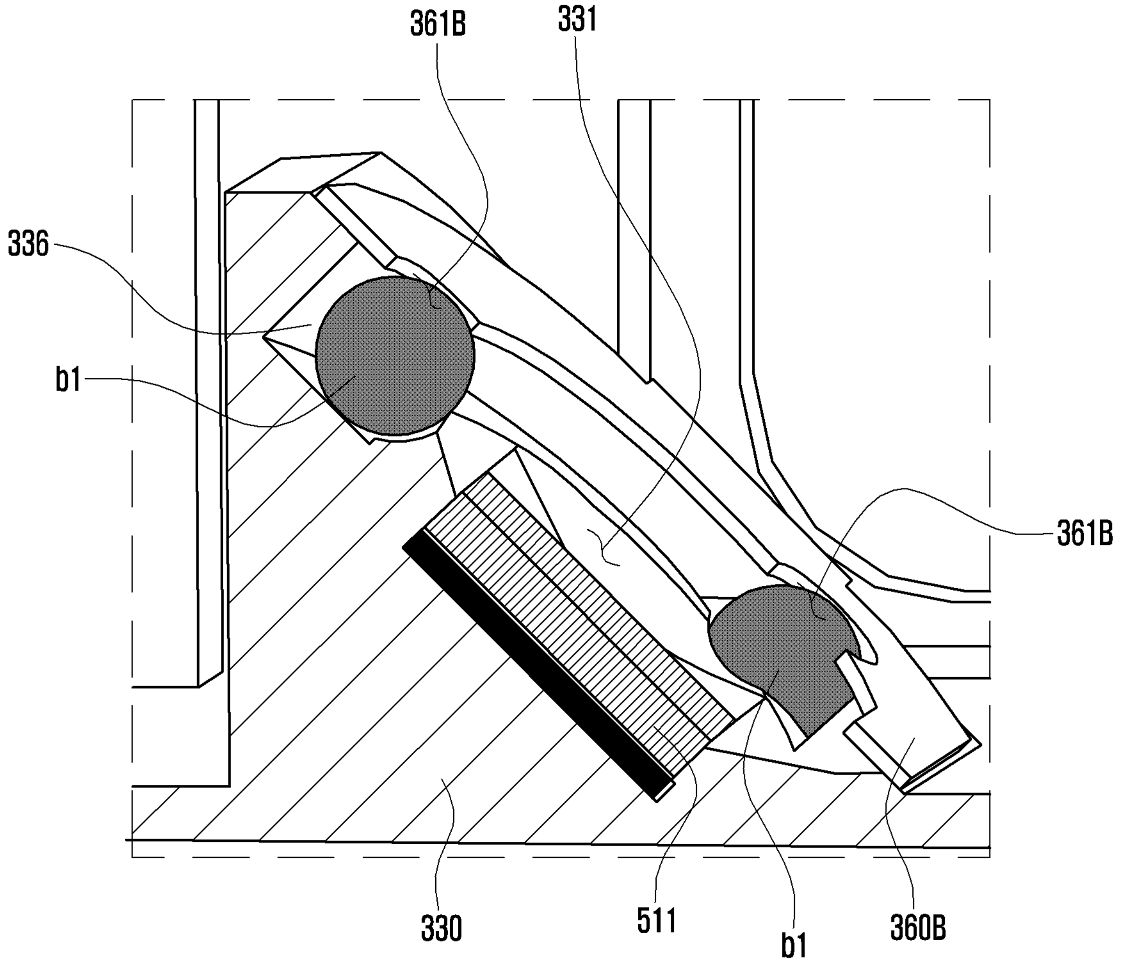
FIG. 15C is a cross-sectional view showing a state where a second ball cover is coupled to an accommodating portion of a camera housing according to an embodiment of the disclosure.

FIGS. 14A and 14B are views showing a state where accommodating grooves are formed in an accommodating portion of the camera housing, OIS balls being disposed in the accommodating grooves, and a state where a second ball cover is coupled to the accommodating portion, according to various embodiments of the disclosure. FIG. 15A is an enlarged view of accommodating grooves formed in an accommodating portion of a camera housing according to an embodiment of the disclosure. FIG. 15B is a view showing a state where a second ball cover is coupled to an accommodating portion of a camera housing according to an embodiment of the disclosure. FIG. 15C is a cross-sectional view showing a state where a second ball cover is coupled to an accommodating portion of a camera housing according to an embodiment of the disclosure.

Referring to FIGS. 14A, 14B, 15A, and 15B, the OIS balls b1 may be seated in the accommodating grooves 336 formed in the accommodating portion 330 of the camera housing 320. In an embodiment, the accommodating grooves 336 may be formed in the guide groove 331 of the accommodating portion 330. For example, at least parts of the accommodating grooves 336 may be formed in the first curved portion 333 (e.g., the first curved portion 333) of the accommodating portion 330. In an embodiment, the OIS balls b1 may be in contact with one surface of the accommodating portion 330, which is positioned in the accommodating grooves 336. In an embodiment, the OIS balls b1 may be arranged in the accommodating grooves 336 of the accommodating portion 330 to surround the first attraction magnetic body 511 disposed in the guide groove 331.

Referring to FIGS. 15A and 15B, the accommodating grooves 336 may be formed at equal intervals in the guide groove 331. Accordingly, the multiple OIS balls b1 may be positioned in the accommodating portion 330 at equal intervals. Therefore, based on that the multiple OIS balls b1 are arranged at equal intervals, the guide portion 342 of the carrier 340 may be in stable contact with the OIS balls b1 at at least three points.

Referring to FIGS. 14A, 14B, 15A, and 15B, a second ball cover 360B (e.g., the first ball cover 360A in FIG. 11A) may be coupled to the accommodating portion 330 of the camera housing 320. The OIS balls b1 may be maintained in a state of being arranged in the accommodating grooves 336 formed in the accommodating portion 330 by the second ball cover 360B coupled to the accommodating portion 330. In an embodiment, at least a part of the second ball cover 360B may be disposed on the second sloping surface 332 of the accommodating portion 330. In an embodiment, the second ball cover 360B may include openings 361B for accommodating parts of the OIS balls b1. In an embodiment, the OIS balls b1 may be in contact with the guide portion 342 of the carrier 340 in a state where parts thereof are accommodated in the openings 361B of the second ball cover 360B, to guide rotation of the carrier 340 relative to the camera housing 320.

In an embodiment, referring to FIGS. 15B and 15C, the openings 361B of the second ball cover 360B may be formed in open shapes. For example, the openings 361B may be shapes which are open toward one surface of the guide groove 331, on which the first attraction magnetic body 511 is disposed.

Referring to FIGS. 15B and 15C, the second ball cover 360B and the accommodating portion 330 may include a fastening structure. In an embodiment, the accommodating portion 330 may include a fastening portion 337 protruding from one surface thereof. The second ball cover 360B may include a fastening groove 363B into which the fastening portion 337 is inserted. In an embodiment, the fastening groove 363B may be formed on a coupling portion 362B which comes into contact with the guide portion 342. As the fastening portion 337 of the accommodating portion 330 is coupled to the fastening groove 363B, the second ball cover 360B may be fixed to the accommodating portion 330. In an embodiment, the coupling portion 362B may press the guide portion 342 to increase the coupling force of the ball cover 360B with respect to the guide portion 342. The above-described method for coupling the second ball cover 360B and the accommodating portion 330 is only an example, and the second ball cover 360B and the accommodating portion 330 may be coupled in various methods. For example, the second ball cover 360B may be coupled to the accommodating portion 330 in a hook fastening method or a screw fastening method.

Figure 16A:
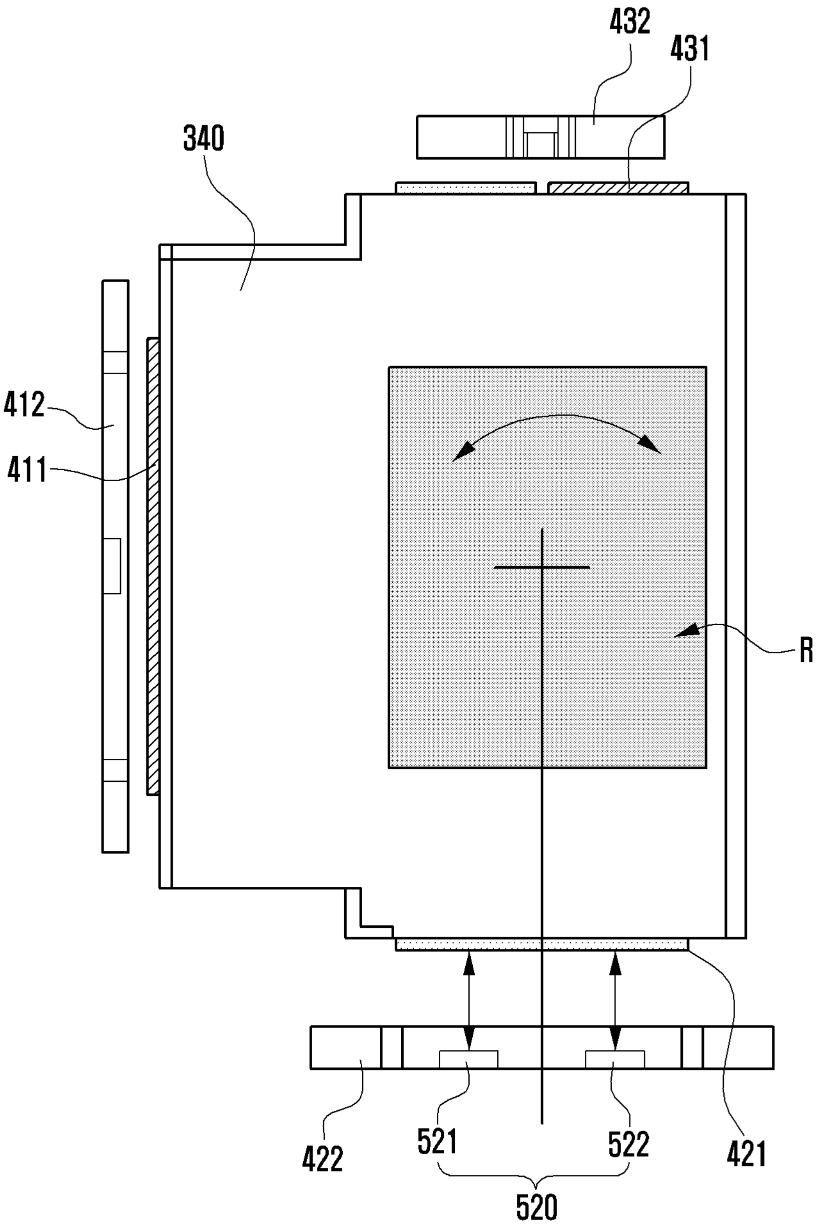
FIGS. 16A and 16B are views showing the relationship between a magnetic flux detection sensor disposed inside an OIS coil and an OIS magnetic body disposed on a carrier according to various embodiments of the disclosure.
Figure 16B:
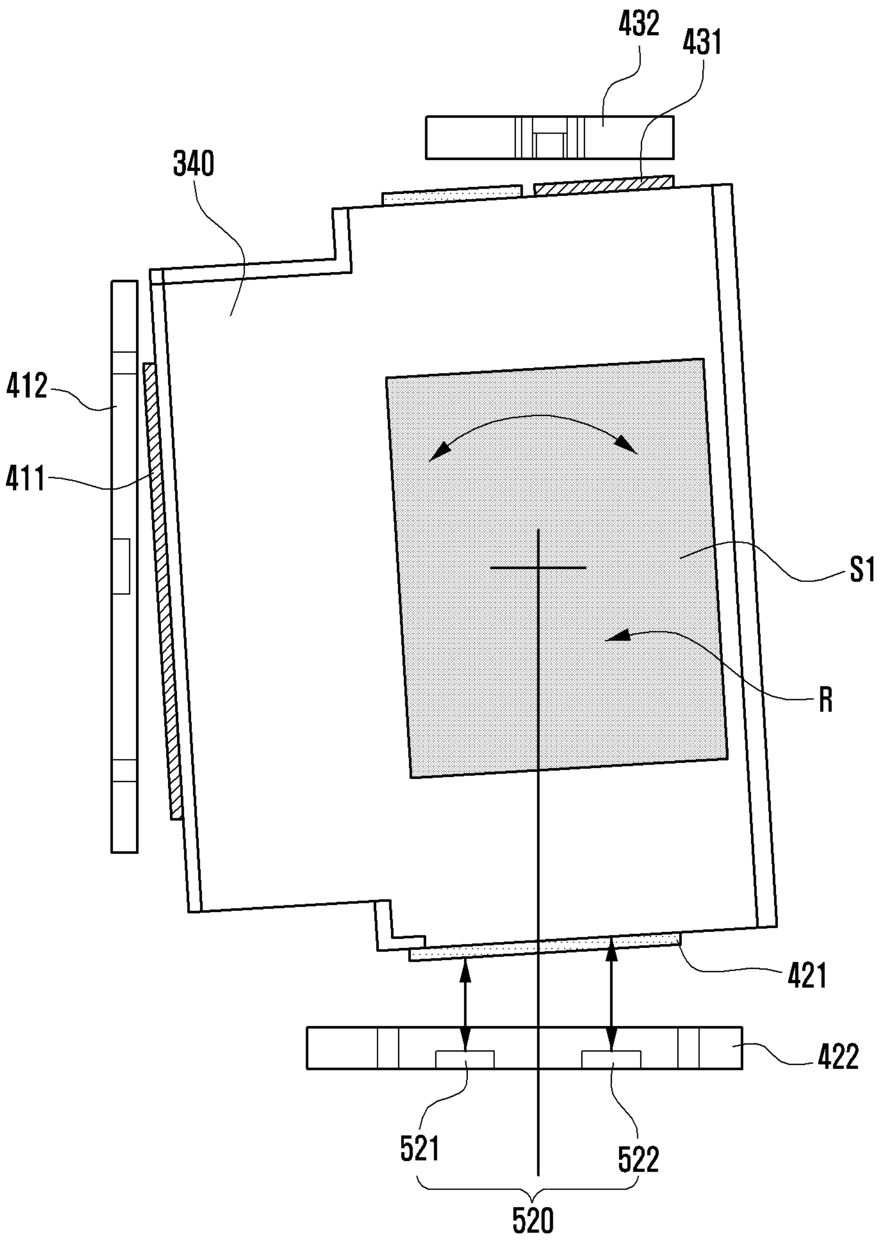

FIGS. 16A and 16B are views showing the relationship between a magnetic flux detection sensor disposed inside an OIS coil and an OIS magnetic body disposed on a carrier 340 according to various embodiments of the disclosure.

According to an embodiment, at least one magnetic flux detection sensor 520 may be disposed at the center part of an OIS coil (e.g., the first OIS coil 412, the second OIS coil 422, or the third OIS coil 432). In an embodiment, multiple magnetic flux detection sensors may be arranged inside the OIS coil.

Referring to FIGS. 16A and 16B, at least two magnetic flux detection sensors 521 and 522 may be arranged inside the second OIS coil 422. In an embodiment, the magnetic flux detection sensors 521 and 522 may be arranged inside the second OIS coil 422 so as to be symmetrical with respect to the first axis and may face the second OIS magnetic body 421. The magnetic flux detection sensors 521 and 522 may detect a change in the magnetic flux value according to the change in the distance from the second OIS magnetic body 421, based on the rotation of the carrier 340. Since the multiple magnetic flux detection sensors 521 and 522 are provided, compared to the case that one magnetic flux detection sensor is provided, the processor may more clearly identify the change in a position of the carrier 340. Therefore, the control of the carrier 340 may be performed more accurately.

The above-described multiple magnetic flux detection sensors (not shown) (e.g., the magnetic flux detection sensors 521 and 522) may be arranged inside the first OIS coil 412. The magnetic flux detection sensors may detect a change in the magnetic flux value according to the change in the distance from the first OIS magnetic body 411, based on the rotation of the carrier 340. Similarly, the multiple magnetic flux detection sensors (not shown) (e.g., the magnetic flux detection sensors 521 and 522) may be arranged inside the third OIS coil 432. The magnetic flux detection sensors may detect a change in the magnetic flux value according to the change in the distance from the third OIS magnetic body 431, based on the rotation of the carrier 340.

Figure 17A:
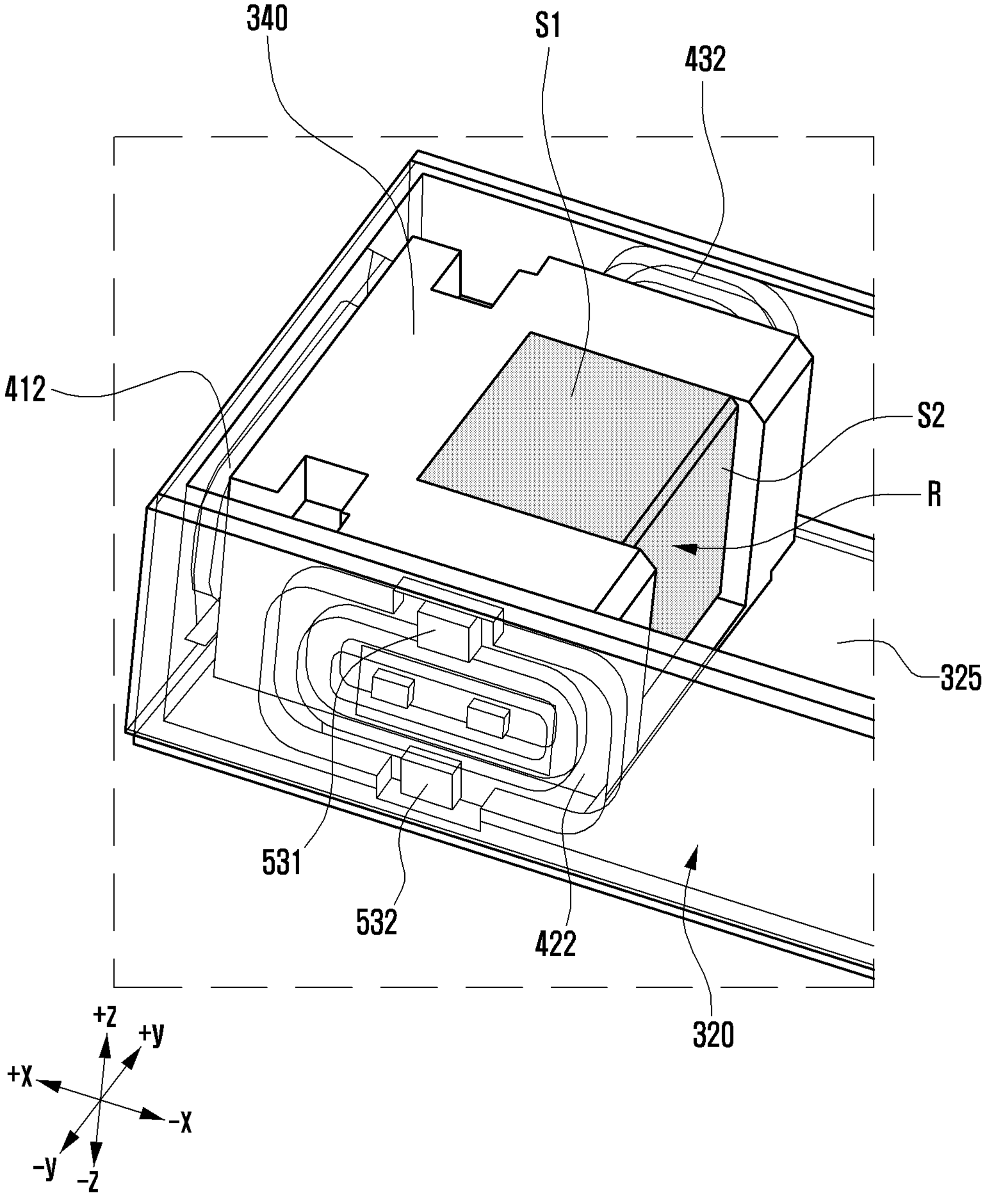
FIGS. 17A and 17B are views showing the relationship between a second OIS magnetic body and multiple metal plates arranged to respectively face different poles of the second OIS magnetic body disposed on a carrier, according to various embodiments of the disclosure.
Figure 17B:
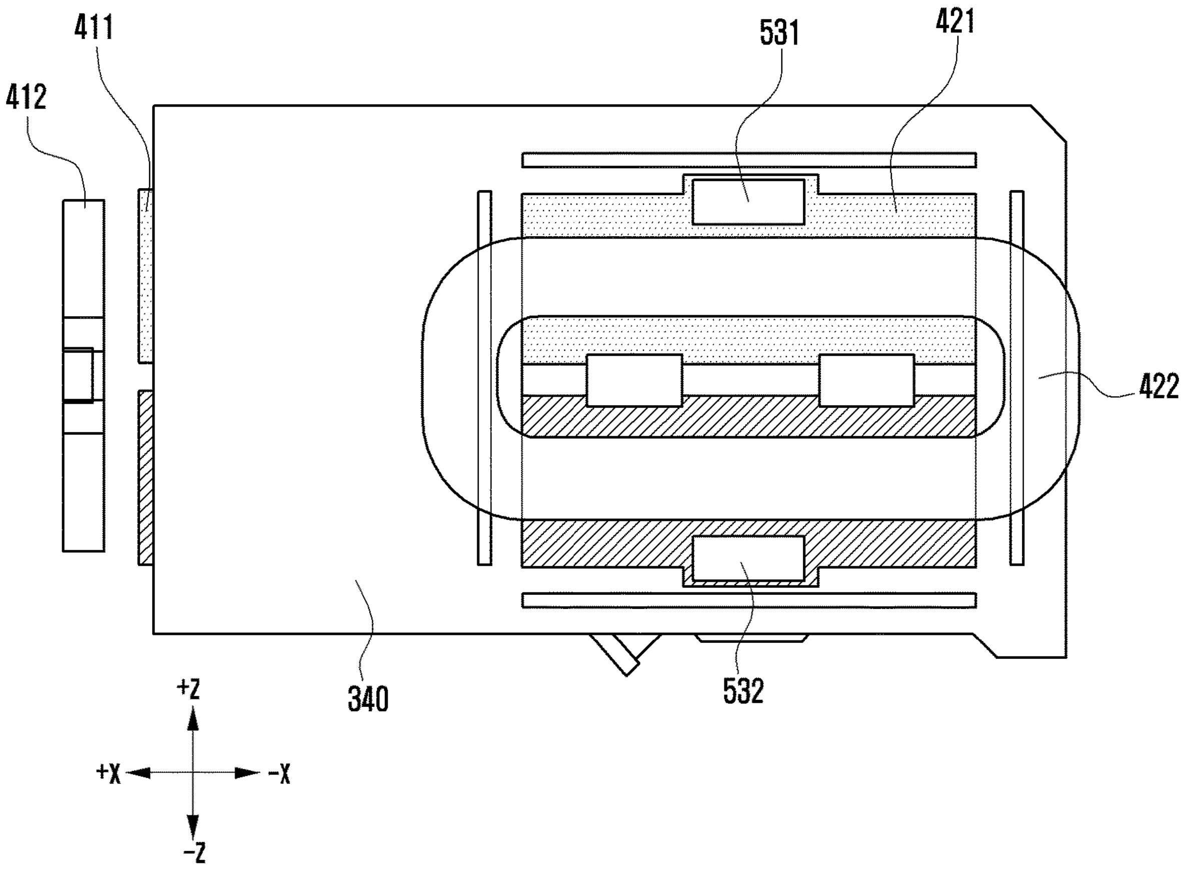
Figure 18A:
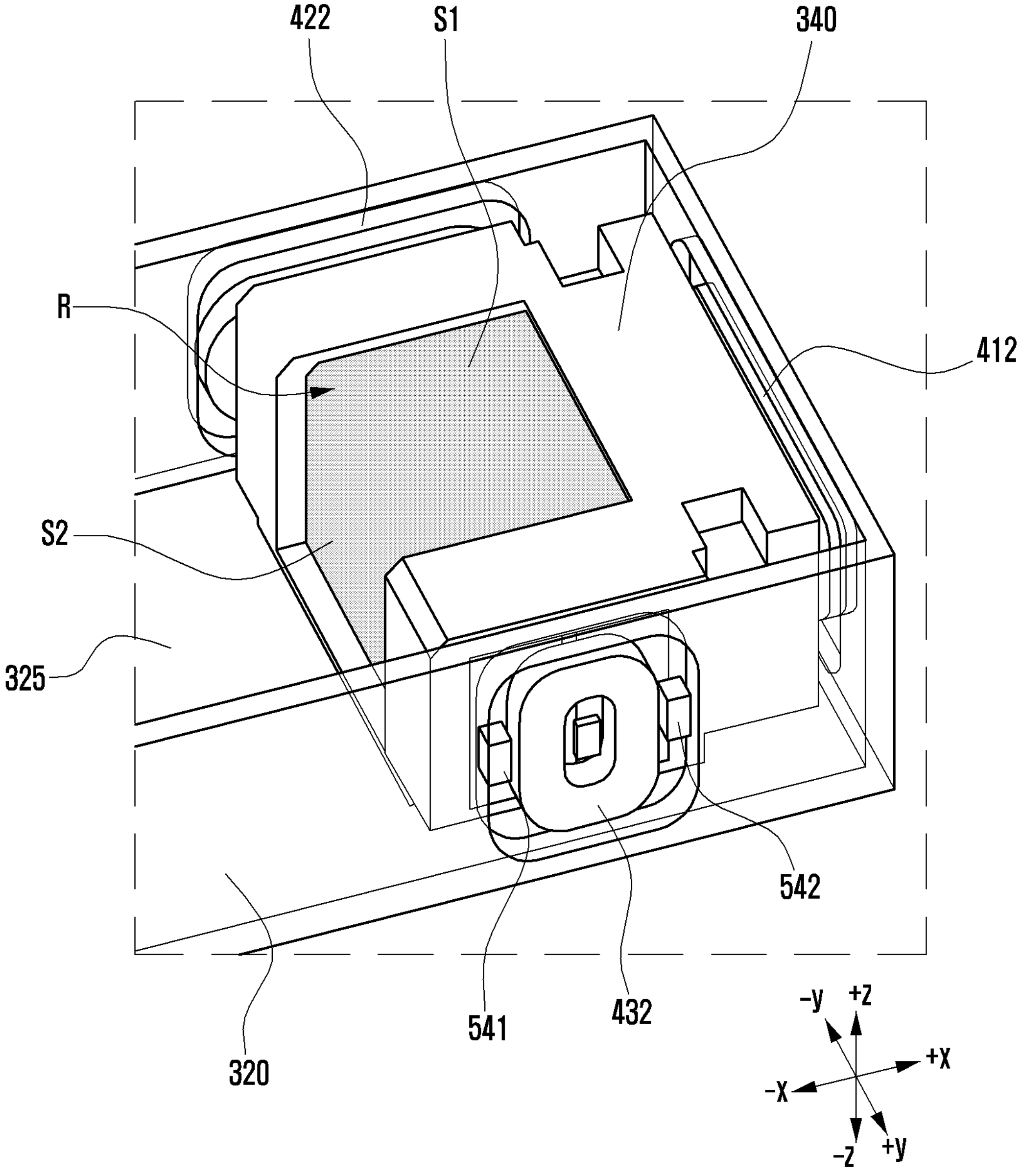
FIGS. 18A and 18B are views showing the relationship between a third OIS magnetic body and multiple metal plates arranged to respectively face different poles of the third OIS magnetic body disposed on a carrier, according to various embodiments of the disclosure.
Figure 18B:
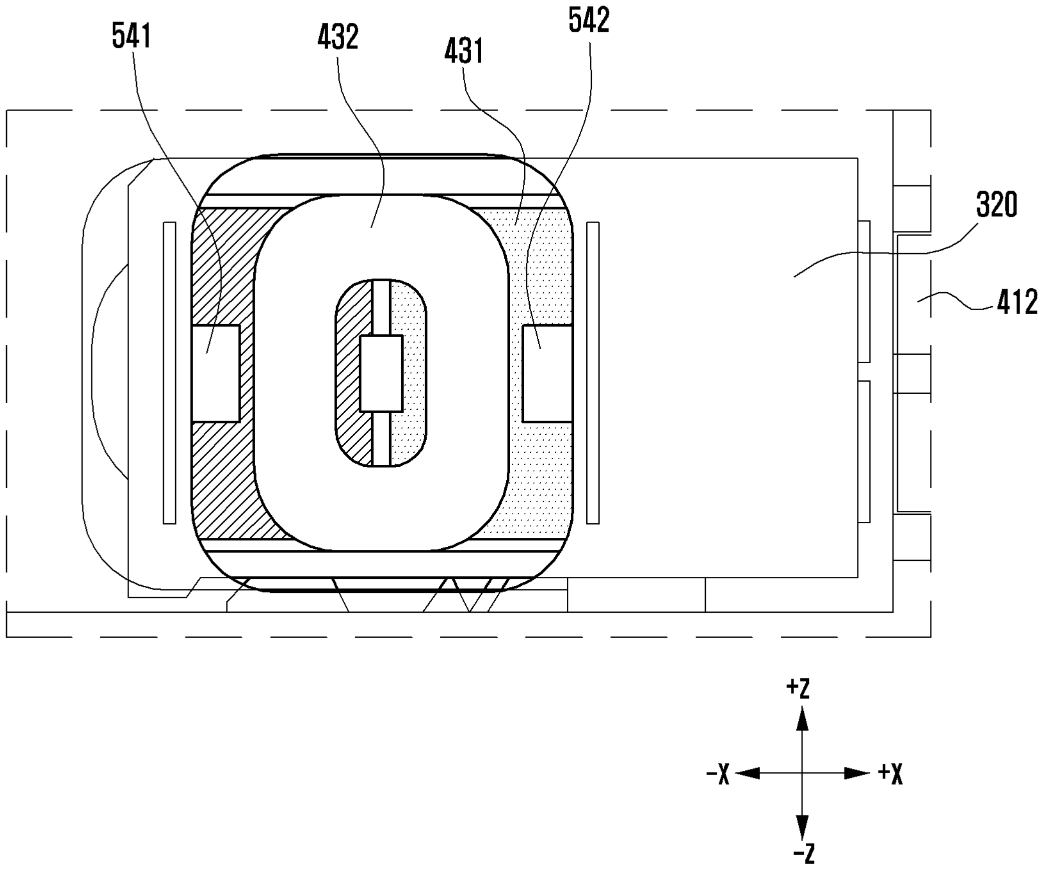

FIGS. 17A and 17B are views showing the relationship between a second OIS magnetic body and multiple metal plates arranged to respectively face different poles of the second OIS magnetic body disposed on a carrier 340, according to various embodiments of the disclosure. FIGS. 18A and 18B are views showing the relationship between a third OIS magnetic body and multiple metal plates arranged to respectively face different poles of the third OIS magnetic body disposed on a carrier 340, according to various embodiments of the disclosure.

Referring to FIGS. 17A and 17B, multiple metal plates 531 and 532 facing the second OIS magnetic body 421 may be arranged on the camera housing 320 so that the carrier 340 is restrained from rotating around the second axis (e.g., the second axis in FIG. 4C and/or the axis X in FIG. 17A) relative to the camera housing 320. In an embodiment, the multiple metal plates 531 and 532 may include a first metal plate 531 and a second metal plate 532. In an embodiment, the first metal plate 531 and the second metal plate 532 may face different poles of the second OIS magnetic body 421, respectively. In an embodiment, the first metal plate 531 and the second metal plate 532 may be positioned on the radius of gyration which has the second axis of the carrier 340 as the center thereof. In an embodiment, when the carrier 340 rotates around the second axis relative to the camera housing 320, the carrier 340 may be returned to the original position thereof by the attractive force acting between the multiple metal plates 531 and 532 and the second OIS magnetic body 421.

Referring to FIGS. 18A and 18B, multiple metal plates 541 and 542 facing the third OIS magnetic body 431 may be arranged on the camera housing 320 so that the carrier 340 is restrained from rotating around the third axis (e.g., the third axis in FIG. 4C and/or the axis Z in FIG. 18A) relative to the camera housing 320. In an embodiment, the multiple metal plates 541 and 542 may include a third metal plate 541 and a fourth metal plate 542. In an embodiment, the third metal plate 541 and the fourth metal plate 542 may face different poles of the third OIS magnetic body 431, respectively. In an embodiment, the third metal plate 541 and the fourth metal plate 542 may be positioned on the radius of gyration which has the third axis of the carrier 340 as the center thereof. In an embodiment, when the carrier 340 rotates around the third axis relative to the camera housing 320, the carrier 340 may be returned to the original position thereof by the attractive force acting between the multiple metal plates 541 and 542 and the third OIS magnetic body 431.

Although the structure in which the carrier 340 is restrained from rotating around the second axis and/or the third axis relative to the camera housing 320, which is described through FIGS. 17A, 17B, 18A, and 18B, is described based on the second OIS actuator 420 and the third OIS actuator 430 illustrated in FIGS. 4C and 6A, it is not be limited thereto. In an embodiment, the structure in which the carrier 340 is restrained from rotating around the second axis and/or the third axis relative to the camera housing 320 may be equally applied to the second OIS actuator 420 and the third OIS actuator 430 illustrated in FIG. 6B. For example, the metal plates (not shown) facing the second OIS magnetic body 421 and the metal plates (not shown) facing the third OIS magnetic body 431 in FIG. 6B may have the same arrangement as the third metal plate 541 and the fourth metal plate 542 illustrated in FIG. 18A. For example, the metal plates may be arranged to face the N-pole and the S-pole of the second OIS magnetic body 421, respectively, to exert an attractive force with the second OIS magnetic body 421. In addition, different metal plates may be arranged to face the N-pole and the S-pole of the third OIS magnetic body 431, respectively, to exert an attractive force with the third OIS magnetic body 431. Therefore, the carrier 340 may be restrained from rotating around the third axis relative to the camera housing 320.

In an embodiment, the structure in which the carrier 340 is restrained from rotating around the first axis relative to the camera housing 320 may be equally applied to the first OIS actuator 410 illustrated in FIGS. 4C, 6A, and 6B. For example, the metal plates (not shown) may be arranged to face the N-pole and S-pole of the first OIS magnetic body 411, respectively, so that an attractive force is applied therebetween. Therefore, when the carrier 340 rotates around the first axis relative to the camera housing 320, the carrier 340 may be returned to the original position thereof by the attractive force acting between the multiple metal plates and the first OIS magnetic body 411. Therefore, the carrier 340 may be restrained from rotating around the first axis relative to the camera housing 320.

Figure 19B:
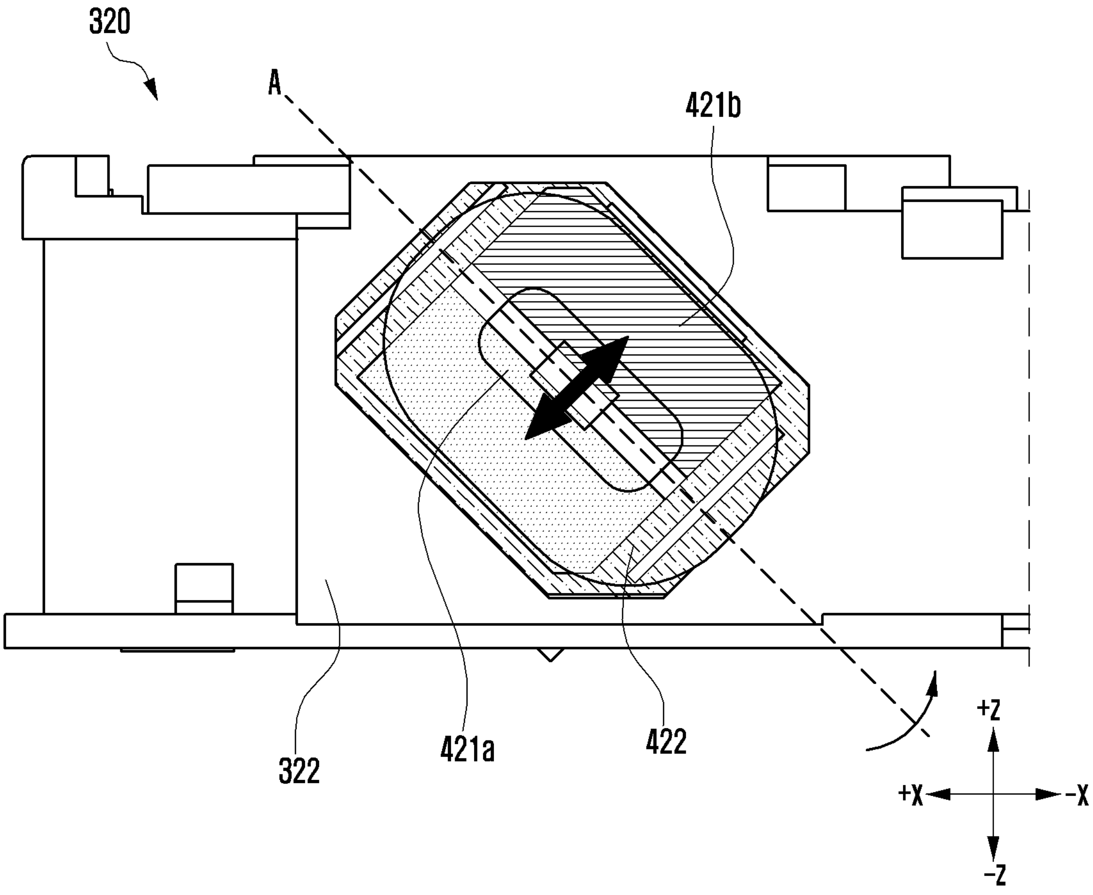

FIGS. 19A and 19B are views showing a second OIS actuator configured to rotate a carrier around an axis inclined with respect to a support surface of a camera housing according to various embodiments of the disclosure.

According to an embodiment, referring to FIGS. 12A and 13 described above, and FIG. 19A, when correcting shaking of an image, the carrier 340 may be rotated relative to the image sensor 370 around the fourth axis (e.g., the axis A in FIG. 12A, the axis A in FIG. 13, and/or the axis A in FIG. 19A) to correct shaking of the image. In an embodiment, referring to FIGS. 12A, 13, and 19A, the fourth axis may be an axis substantially parallel to the short side of the reflection surface S3 of the reflection member R. In an embodiment, the inclined axis A and the reflection surface S3 may form an inclination of about 45 degrees with respect to the support surface 325 of the camera housing 320. In an embodiment, the processor 120 may control each of the second OIS actuator 420 and the third OIS actuator 430 to rotate the carrier 340 around the fourth axis (e.g., the axis A in FIGS. 12A and 13) relative to the image sensor 370, so as to correct shaking of the image.

Referring to FIGS. 19A and 19B, the second OIS actuator 420 may be disposed to be inclined with respect to the carrier 340 and the camera housing 320 so that the carrier 340 is rotatable around the fourth axis relative to the image sensor 370. In an embodiment, the second OIS magnetic body 421 may be inclinedly disposed on the second surface 3402 of the carrier 340. For example, as illustrated in FIG. 19B, the second OIS magnetic body 421 may be disposed on the second surface 3402 of the carrier 340 such that multiple magnets 421*a* and 421*b* constituting the second OIS magnetic body 421 are substantially parallel to the fourth axis. In an embodiment, the multiple magnets 421*a* and 421*b* constituting the second OIS magnetic body 421 may be symmetrical with respect to the fourth axis, but it is not limited thereto. In an embodiment, the second OIS coil 422 may be inclinedly disposed in the second portion 322 of the camera housing 320 so as to face the second OIS magnetic body 421. For example, the second OIS coil 422 may be inclinedly disposed in the second portion 322 so as to be symmetrical with respect to the fourth axis. In an embodiment, the configuration may be equally applied to the third OIS magnetic body 431.

The camera module 180 or 300 may achieve high magnification by using the refraction of light. For example, the camera module 180 or 300 may include the reflection member R such as a prism or a mirror. Light incident to the reflection member R may be reflected or refracted, the light path may be refracted, and thus the light may be delivered to the image sensor 370.

The camera module 180 using the reflection member R may have a form in which a ball guide portion (not shown), a middle guide portion (not shown), a reflector actuator, the lens driving portion 310, and the image sensor 370 are sequentially arranged inside the camera housing 320.

Meanwhile, the reflector actuator may include the reflection member R and the carrier (not shown). In order to correct shaking of an image formed on the image sensor 370 due to hand tremors, the reflection member R may be tilted with respect to the image sensor 370. For example, the carrier, on which the reflection member R is disposed, may rotate around one of the first axis (e.g., a pitch axis or the axis Y in FIG. 4C) and the second axis (a yaw axis (e.g., the axis X in FIG. 4C) or the third axis (a roll axis (e.g., the axis Z in FIG. 4C)) relative to the image sensor 370 by the actuator (e.g., a coil and a magnet) (e.g., the first OIS actuator 410, the second OIS actuator 420, and/or the third OIS actuator 430). The middle guide portion may rotate around the first axis relative to the image sensor 370 by the actuator. The carrier may rotate in the same direction as the rotation direction of the middle guide portion, in conjunction with the middle guide portion.

Meanwhile, the middle guide portion may be a configuration for guiding rotation of the carrier. For example, in case that the carrier is designed to rotate around the second axis, the middle guide portion may guide rotation of the carrier so that the carrier does not rotate around the third axis.

Similarly, the ball guide portion may be a configuration for guiding rotation of the middle guide portion. For example, in case that the middle guide portion is designed to rotate around the first axis different from the rotation axis (e.g., the second axis) of the carrier, the ball guide portion may guide rotation of the middle guide portion so that the middle guide portion does not rotate around the second axis.

The above-described structure of the camera module 180 may include the middle guide portion for guiding rotation of the carrier and a ball guide portion for guiding rotation of the middle guide portion. Even if the arrangement of the carrier, the middle guide portion, and the ball guide portion is optimized, there may be a limit to reducing the size of the camera module 180 because one of the elements must be inevitably omitted. In addition, the greater the number of components constituting the camera module 180 is, the more complex the assembly process becomes. Therefore, the production cost thereof may increase.

The technical problems to be achieved in the document are not limited to the technical problems mentioned above, and other technical problems not mentioned can be clearly understood by a person skilled in the art to which the disclosure belongs from the description below.

A camera module 180 or 300 (e.g., the camera module 180 in FIG. 1 or the camera module 300 in FIG. 3A) according to an embodiment of the disclosure may include a reflection member R. In an embodiment, the camera module may include a carrier 340 including a seating portion 341 in which the reflection member is disposed and a guide portion 342 extending from the seating portion in a direction opposite to the reflection member. In an embodiment, the camera module may include an accommodating portion 330 having a guide groove 331 formed thereon to accommodate at least a part of the guide portion, and a camera housing 320 in which the carrier is disposed. In an embodiment, the camera module may include a guide structure configured to be in contact with at least one of the guide groove and the guide portion at at least three points. In an embodiment, the camera module may include a first OIS magnetic body 411 disposed on a first surface 3401 of the carrier. In an embodiment, the camera module may include a second OIS magnetic body 421 disposed on a second surface 3402 of the carrier, which is perpendicular to the first surface. In an embodiment, the camera module may include a first OIS coil disposed in the camera housing to face the first OIS magnetic body. In an embodiment, the camera module may include a second OIS coil disposed in the camera housing to face the second OIS magnetic body. In an embodiment, the camera module may include a lens driving portion through which light reflected from the reflective member is transmitted. In an embodiment, the camera module may include an image sensor 230 or 370 (e.g., the image sensor 230 in FIG. 2 or the image sensor 370 in FIG. 3B) to which light transmitted from the lens driving portion is incident.

In an embodiment, the carrier may be rotated around a first axis (e.g., the first axis in FIG. 4C) relative to the camera housing by an electromagnetic force acting between the first OIS magnetic body and the first OIS coil. In an embodiment, the carrier may be rotated around a second axis (e.g., the second axis in FIG. 4C) perpendicular to the first axis relative to the camera housing by an electromagnetic force acting between the second OIS magnetic body and the second OIS coil.

In an embodiment, the camera module may further include a third OIS magnetic body 431 disposed on a third surface 3403 of the carrier, which is parallel to the second surface of the carrier. In an embodiment, the camera module may further include a third OIS coil 432 disposed in the camera housing to face the third OIS magnetic body.

In an embodiment, the carrier may be rotated around a third axis (e.g., the third axis in FIG. 4C) perpendicular to the first axis and the second axis relative to the camera housing by an electromagnetic force acting between the third OIS magnetic body and the third OIS coil.

In an embodiment, the seating portion of the carrier may include a first sloping surface 3411 which is parallel to a reflection surface S3 of the reflection member. In an embodiment, the guide portion may extend in a direction perpendicular to the first sloping surface.

In an embodiment, the accommodating portion of the camera housing may include a second sloping surface 332 which is parallel to the first sloping surface. In an embodiment, the guide groove may be formed on the second sloping surface.

In an embodiment, the accommodating portion may include a curved portion 333 which is formed in the guide groove to have a predetermined curvature and is in contact with the guide structure, and a planar portion 334 which is positioned adjacent to the curved portion and is parallel to the reflection surface S3 of the reflection member.

In an embodiment, the camera module may further include a first attraction magnetic body 511 disposed on the planar portion of the accommodating portion, and a second attraction magnetic body 512 which is disposed on one surface of the guide portion and faces the first attraction magnetic body.

In an embodiment, the guide groove may include a flat area 335 adjacent to a part of the curved portion and parallel to a support surface of the camera housing.

In an embodiment, the guide structure may include at least three OIS balls b1 arranged between the guide portion and the guide groove.

In an embodiment, one of the guide portion and one surface of the accommodating portion, which is positioned in the guide groove, may include accommodating grooves 344 in which the at least three OIS balls are respectively accommodated and which are formed at equal intervals.

In an embodiment, the camera module may further include a ball cover 360A or 360B (e.g., the first ball cover 360A in FIG. 11A or the second ball cover 360B in FIG. 14A) configured to accommodate at least parts of the OIS balls and coupled to one of the guide portion and the accommodating portion.

In an embodiment, the ball cover may include openings 361A or 361B (e.g., the openings 361A of the first ball cover 360A in FIG. 11A or the openings 361B of the second ball cover 360B in FIG. 15B) in which the at least three OIS balls are respectively positioned.

In an embodiment, the opening of the ball cover may have a diameter D2 smaller than the diameter D1 of each of the OIS balls.

In an embodiment, the accommodating portion may include a planar portion 334 which is positioned in the guide groove and is parallel to a reflection surface of the reflection member, and a curved portion 333 which is formed to have a predetermined curvature and is in contact the OIS balls while surrounding the planar portion. In an embodiment, the diameter D'1 of the curved portion may be formed to have a size which allows the ball cover to be accommodated therein.

In an embodiment, the ball cover may have a height L greater than the diameter D1 of each of the OIS balls.

In an embodiment, a reflection center, which is an intersection point of an incident optical axis C1 passing through a center of an incident surface and an exit optical axis C2 passing through a center of an exit surface of the reflective member, may coincide with a rotation center of the reflective member, which is an intersection point of the first axis, the second axis, and the third axis.

In an embodiment, the camera module may further include multiple magnetic flux detection sensors 520 positioned in at least one of the first OIS coil, the second OIS coil, and the third OIS coil.

In an embodiment, the camera module may further include multiple metal plates which are arranged in the camera housing, face different poles of the second OIS magnetic body, respectively, and are configured to exert an attractive force therewith.

In an embodiment, the camera module may further include at least one lens module 311 facing an incident surface of the reflective member.

According to an embodiment of the disclosure, an electronic device (e.g., the electronic device 101 in FIG. 1, the electronic device 200 in FIG. 3A) including a camera module 180 or 300 (e.g., the camera module 180 in FIG. 1 or the camera module 300 in FIG. 3A) may include a reflection member R. In an embodiment, the electronic device may include a carrier 340 including a seating portion 341 in which the reflection member is disposed and a guide portion 342 extending from the seating portion in a direction opposite to the reflection member. In an embodiment, the electronic device may include an accommodating portion 330 having a guide groove 331 formed thereon to accommodate at least a part of the guide portion, and a camera housing 320 in which the carrier is disposed. In addition, the electronic device may include a guide structure configured to be in contact with at least one of the guide groove and the guide portion at at least three points. In an embodiment, the electronic device may include a first OIS magnetic body 411 disposed on a first surface 3401 of the carrier. In an embodiment, the electronic device may include a second OIS magnetic body 421 disposed on a second surface 3402 of the carrier, which is perpendicular to the first surface. In an embodiment, the electronic device may include a first OIS coil 412 disposed in the camera housing to face the first OIS magnetic body. In an embodiment, the electronic device may include a second OIS coil 422 disposed in the camera housing to face the second OIS magnetic body. In an embodiment, the electronic device may include a lens driving portion 310 through which light reflected from the reflecting member is transmitted. In an embodiment, the electronic device may include an image sensor 230 or 370 (e.g., the image sensor 230 in FIG. 2 or the image sensor 370 in FIG. 3B) to which light transmitted from the lens driving portion is incident.

According to an embodiment disclosed in the document, a structure capable of implementing an image stabilizer (e.g., an optical image stabilizer (OIS)) function may be included therein. The camera module 180 or 300 of the disclosure may be configured such that a middle guide portion (not shown) configured to guide rotation of the carrier 340 and a ball guide portion (not shown) configured to guide rotation of the middle guide portion are omitted. In an embodiment, the carrier 340 may be partially coupled to the accommodating portion 330 formed in the camera module 300 and may secure rotational degrees of freedom with reference to a first axis (e.g., a pitch axis and/or the axis Y in FIG. 4C), a second axis (e.g., a yaw axis and/or the axis X in FIG. 4C), and a third axis (e.g., a roll axis and/or the axis Z in FIG. 4C).

In addition, according to an embodiment of the disclosure, the camera module 300 may be configured such that the middle guide portion and the ball guide portion are omitted, and thus the size of the camera module 300 can be reduced due to the omission thereof. In addition, the production cost thereof can be reduced due to simplification of the production process by reduction of components used in the camera module 300.

In addition, according to an embodiment of the disclosure, the reflection center of the reflection member R and the rotation center M of the reflection member R disposed in the carrier 340 may coincide with each other. In this case, a driving error of an image stabilizer (e.g., an optical image stabilizer (OIS)) function for correcting shaking of an image can be reduced.

The effects obtainable from the disclosure are not limited to the effects mentioned above, and other effects not mentioned will be clearly understood by a person skilled in the art, to which the disclosure belongs, from the descriptions below.

According to various embodiments disclosed in the document, the electronic device 101 may have a bar-type appearance or a plate-type appearance, but it is not limited thereto. For example, the illustrated electronic device 101 may be a part of a foldable electronic device, a slidable electronic device, a stretchable electronic device, and/or a rollable electronic device. A "foldable electronic device", a "slidable electronic device", a "stretchable electronic device", and/or a "rollable electronic device" may mean an electronic device in which a display (e.g., the display module 160 in FIG. 1) can be bent and deformed so that at least a portion thereof is folded or wound or rolled, or an area thereof can be at least partially expanded and/or be accommodated inside a housing. A foldable electronic device, a slideable electronic device, a stretchable electronic device, and/or a rollable electronic device may be configured such that a display is unfolded or a larger area of a display is exposed to the outside, so as to expand and then use a screen display area thereof, according to user needs.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It will be appreciated that this document contemplates and includes embodiments based on any combination of two or more of the embodiments disclosed above, as well as embodiments including any combination of the features disclosed herein. That is, the absence of an explicit indication that two features may be combined or that two embodiments may be combined does not mean that such a combination is not envisioned, but rather that such a combination is intended to be included herein.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A camera module comprising:

a reflection member;

a carrier including a seating portion on which the reflection member is disposed, and a guide portion extending in a direction away from the reflection member;

a camera housing including an accommodating portion having a guide groove formed thereon such that at least a portion of the guide portion is accommodated therein, the carrier being disposed on the camera housing;

a guide structure disposed between the guide portion and the guide groove and having at least three points configured to come into contact with at least one of the guide portion;

a first magnet disposed on a first surface of the carrier;

a second magnet disposed on a second surface perpendicular to the first surface of the carrier;

a first coil disposed on the camera housing and facing the first magnet;

a second coil disposed on the camera housing and facing the second magnet;

a lens structure through which light reflected from the reflection member transmits; and an image sensor which the light having transmitted the lens structure enters.

2. The camera module of claim 1, wherein the carrier is configured to:

be rotated about a first axis with regard to the camera housing by an electromagnetic force between the first magnet and the first coil; and be rotated about a second axis perpendicular to the first axis with regard to the camera housing by an electromagnetic force between the second magnet and the second coil.

3. The camera module of claim 2, further comprising:

a third magnet disposed on a third surface parallel to the second surface of the carrier; and a third coil disposed on the camera housing and facing the third magnet, wherein the carrier is rotated about a third axis perpendicular to the first axis and the second axis with regard to the camera housing by an electromagnetic force between the third magnet and the third coil.

4. The camera module of claim 1, wherein the seating portion of the carrier comprises a first sloping surface parallel to a reflection surface of the reflection member, and wherein the guide portion extends in a direction perpendicular to the first sloping surface.

5. The camera module of claim 4, wherein the accommodating portion of the camera housing comprises a second sloping surface parallel to the first sloping surface, and wherein the guide groove is formed on the second sloping surface.

6. The camera module of claim 4, wherein the guide groove comprises:

a curved portion having a predetermined curvature and being in contact with the guide structure; and a planar portion positioned adjacent to the curved portion and parallel to the reflection surface of the reflection member.

7. The camera module of claim 6, further comprising:

a first attraction magnet disposed on the planar portion; and a second attraction magnet disposed on the guide portion and facing the first attraction magnet.

8. The camera module of claim 6, wherein the guide groove comprises a flat area parallel to a support surface of the camera housing, the flat area being positioned adjacent to the curved portion.

9. The camera module of claim 1, wherein the guide structure comprises at least three bearing balls disposed between the guide portion and the guide groove.

10. The camera module of claim 9, wherein one of the guide portion and the guide groove located within the guide groove comprises accommodating grooves formed at an identical interval such that the at least three bearing balls are accommodated therein, respectively.

11. The camera module of claim 10, further comprising:

a ball cover coupled to one of the guide portion and the accommodating portion and accommodating at least a part of the bearing balls.

12. The camera module of claim 11, wherein the ball cover comprises openings in which the at least three bearing balls are located, respectively.

13. The camera module of claim 12, wherein a first diameter of the openings of the ball cover is smaller than a second diameter of the bearing balls.

14. The camera module of claim 11, wherein the accommodating portion comprises:

a planar portion parallel to a reflection surface of the reflection member, and a curved portion surrounding the planar portion and having a predetermined curvature, the planar portion and the curved portion being located within the guide groove, and wherein a third diameter of the curved portion is larger than a fourth diameter of the ball cover.

15. The camera module of claim 11, wherein a height of the ball cover is larger than the second diameter of the bearing balls.

16. The camera module of claim 3, wherein a reflection center is an intersection between an incident optical axis passing through a center of an incident surface of the reflective member and an emission optical axis passing through the center of an exit surface, and wherein the reflection center corresponds to a rotation center of the reflection member, which is an intersection between the first axis, the second axis, and the third axis.

17. The camera module of claim 1, further comprising:

at least one magnetic flux detection sensor positioned inside the first coil, the second coil or the third coil.

18. The camera module of claim 1, further comprising:

a plurality of metal plates disposed on the camera housing and facing different poles of a second magnetic body, respectively, such that an attractive force acts therebetween.

19. The camera module of claim 1, further comprising:

at least one lens module facing the incident surface of the reflection member.

20. An electronic device including a camera module, the electronic device comprising:

a reflection member;

a carrier including a seating portion on which the reflection member is disposed, and a guide portion extending in a direction away from the reflection member;

a camera housing including an accommodating portion having a guide groove formed thereon such that at least a portion of the guide portion is accommodated therein, the carrier being disposed on the camera housing;

a guide structure having at least three points configured to come into contact with at least one of the guide portion and the guide groove;

a first magnet disposed on a first surface of the carrier;

a second magnet disposed on a second surface perpendicular to the first surface of the carrier;

a first coil disposed on the camera housing and facing the first magnet;

a second coil disposed on the camera housing and facing the second magnet;

a lens structure through which light reflected from the reflection member transmits; and an image sensor which the light having transmitted the lens structure enters.

* * * * *